(12) United States Patent
Buchheim et al.

(10) Patent No.: US 10,417,834 B2
(45) Date of Patent: Sep. 17, 2019

(54) BOOKING AND CANCELLATION METHOD, AND METHOD FOR COLLECTING TOLLS IN A TOLL COLLECTION SYSTEM

(71) Applicant: Toll Collect GmbH, Berlin (DE)

(72) Inventors: Timm Buchheim, Neuenhagen (DE); Hartmut Janssen, Berlin (DE)

(73) Assignee: TOLL COLLECT GMBH, Berlin (DE)

( * ) Notice: Subject to any disclaimer, the term of this patent is extended or adjusted under 35 U.S.C. 154(b) by 1009 days.

(21) Appl. No.: 14/379,472

(22) PCT Filed: Jan. 28, 2013

(86) PCT No.: PCT/EP2013/000289
§ 371 (c)(1),
(2) Date: Aug. 18, 2014

(87) PCT Pub. No.: WO2013/124032
PCT Pub. Date: Aug. 29, 2013

(65) Prior Publication Data
US 2015/0012309 A1     Jan. 8, 2015

(30) Foreign Application Priority Data
Feb. 20, 2012   (DE) .................. 10 2012 003 622

(51) Int. Cl.
*G07B 15/06* (2011.01)
*G07B 15/02* (2011.01)
*G06Q 10/02* (2012.01)

(52) U.S. Cl.
CPC ............. *G07B 15/02* (2013.01); *G06Q 10/02* (2013.01); *G07B 15/063* (2013.01)

(58) Field of Classification Search
CPC ...................................................... G06Q 10/02
See application file for complete search history.

(56) References Cited

U.S. PATENT DOCUMENTS

| 5,864,831 | A | 1/1999 | Schuessler |
| 6,640,097 | B2 | 10/2003 | Corrigan et al. |

(Continued)

FOREIGN PATENT DOCUMENTS

| DE | 4304838 A1 | 8/1994 |
| DE | 4310099 A1 | 9/1994 |

(Continued)

OTHER PUBLICATIONS

Ravi, Nishkam, et al. "Lane reservation for highways (position paper)." 2007 IEEE Intelligent Transportation Systems Conference. IEEE, 2007.*

(Continued)

*Primary Examiner* — Daniel Vetter
*Assistant Examiner* — Scott M Tungate
(74) *Attorney, Agent, or Firm* — Maschoff Brennan

(57) ABSTRACT

Devices, methods, and products are disclosed for collecting tolls for the use of traffic areas which are subject to tolls by a vehicle. To book an authorization for the use of one out of several alternatively usable traffic areas by a vehicle in sufficient time, first position data of the vehicle are associated with alternatively usable traffic areas with regard to the imminent potential use thereof. Use authorizations are booked for the traffic areas. The use of these authorizations can be voided, with the exception of the one that was verifiably used, insofar as second position data of the vehicle are associated with the same traffic areas with respect to a verified non-use.

15 Claims, 20 Drawing Sheets

(56) References Cited

U.S. PATENT DOCUMENTS

| | | | |
|---|---|---|---|
| 7,742,941 B2 | 6/2010 | Yamauchi | |
| 7,835,753 B2 | 11/2010 | Alfert et al. | |
| 7,996,149 B2* | 8/2011 | Maethner | G01C 21/26 701/425 |
| 8,095,311 B2 | 1/2012 | Shimizu | |
| 2011/0047009 A1 | 2/2011 | Deitiker et al. | |
| 2011/0301986 A1* | 12/2011 | Pappas | G06Q 10/02 705/6 |
| 2012/0215594 A1* | 8/2012 | Gravelle | G07B 15/02 705/13 |
| 2013/0090991 A1 | 4/2013 | Underwood | |

FOREIGN PATENT DOCUMENTS

| | | |
|---|---|---|
| DE | 202004004379 U1 | 8/2004 |
| DE | 102005015693 A1 | 10/2006 |
| DE | 102005022702 A1 | 11/2006 |
| DE | 102006027191 A1 | 12/2007 |
| DE | 202010011101 U1 | 3/2011 |
| EP | 0752688 A2 | 1/1997 |
| EP | 0802513 A2 | 10/1997 |
| EP | 1278163 A1 | 1/2003 |
| EP | 1517271 A1 | 3/2005 |
| EP | 1696208 A1 | 8/2006 |
| EP | 1868163 A1 | 12/2007 |
| WO | 200111571 A1 | 2/2001 |
| WO | 200235477 A1 | 5/2002 |
| WO | 2003063088 A2 | 7/2003 |
| WO | 2006105754 A1 | 10/2006 |
| WO | 2011006708 A1 | 1/2011 |
| WO | 2012146475 A2 | 11/2012 |

OTHER PUBLICATIONS

International Application No. PCT/EP2013/000289, International Preliminary Report on Patentability and Written Opinion, dated Aug. 26, 2014, 9 pages.

* cited by examiner

| Point | Booked sections | | Canceled sections |
|---|---|---|---|
| | Provisional | Confirmed | |
| A | | | |
| B | 7901 | | |
| C | 7901 | | |
| D | 7902, 7903 | 7901 | |
| E | 7902, 7903 | 7901 | |
| F | 7904, 7905 | 7901, 7903 | 7902 |

| Point | Booked sections | | Canceled sections |
|---|---|---|---|
| | Provisional | Confirmed | |
| A | | | |
| B | 7901 | | |
| C | 7901 | | |
| D | 7903, 7902 | 7901 | |
| E | 7904, 7905 | 7901, 7903 | 7902 |
| F | 7902, 7903 | 7901, 7903, 7904 | 7902, 7905 |
| G | | 7901, 7903, 7904 | 7902, 7905, 7902, 7903 |

| Point | Booked sections | | Canceled sections |
|---|---|---|---|
| | Provisional | Confirmed | |
| A | | | |
| B | 7902, 7903 | | |
| C | 7902, 7903 | | |
| D | | | 7902, 7903 |

| Point | Booked section | | Canceled sections |
|---|---|---|---|
| | Provisional | Confirmed | |
| A | | | |
| B | 7902, 7903 | | |
| C | 7902, 7903 | | |
| D | 7904, 7905, 7906, 7907, 7908, 7909 | 7903 | 7902 |
| E | 7904, 7905, 7906, 7907, 7908, 7909 | 7903 | 7902 |
| F | | 7903, 7905 | 7902, 7904, 7906, 7907, 7908, 7909 |

| Point | Booked section | | Canceled sections |
|---|---|---|---|
| | Provisional | Confirmed | |
| A | 7902, 7903 | | |
| B | 7904, 7905, 7906, 7907, 7908, 7909 | 7903 | 7902 |
| C | 7910, 7911, 7844, 7845 | 7903, 7095, 7907, 7909 | 7902, 7904, 7906, 7908 |

| Point | Booked sections | | Canceled sections |
|---|---|---|---|
| | Provisional | Confirmed | |
| A | | | |
| B | 7908, 7909 | | |
| C | 7908, 7909 | | |
| D | 7910, 7911, 7844, 7845 | 7909 | 7908 |
| E | 7910, 7911, 7844, 7845 | 7909 | 7908 |
| F | 7843, 7842 | 7909, 7844 | 7908, 7910, 7911, 7845 |

| Point | Booked sections | | Canceled sections |
|---|---|---|---|
| | Provisional | Confirmed | |
| A | | | |
| B | 7846, 7847 | | |
| C | 7846, 7847 | | |
| D | | | 7846, 7847 |

BOOKING AND CANCELLATION METHOD, AND METHOD FOR COLLECTING TOLLS IN A TOLL COLLECTION SYSTEM

CROSS-REFERENCE TO A RELATED APPLICATION

This application is a National Phase Patent Application of International Patent Application Number PCT/EP2013/000289, filed on Jan. 28, 2013, which claims the priority of the German patent application with the file number 10 2012 003 622.1 filed on Feb. 20, 2012.

TECHNICAL FIELD

This disclosure relates to a booking and cancellation methods and more particularly relates to devices, methods, and products for collecting tolls for the use of traffic areas which are subject to tolls by a vehicle.

BACKGROUND

In a toll system as an example of a system for the collection of tolls for the use of traffic areas which are subject to tolls by a vehicle, the problem arises of detecting the use by a vehicle of a traffic area which is subject to tolls and of collecting a traffic-area-specific and vehicle-specific toll for this traffic area which is subject to tolls. No toll is to be incurred for a traffic area which is not used by the vehicle.

Typical traffic areas are sections of roads or sections of routes, in particular those of multi-lane roads—for example freeways—which can be characterized on the access side or at the beginning by an access slip road and on the exit side or at the end by an exit slip road. An alternative characterization is a road section or route section with a defined direction of travel (for example direction of travel to the north or alternatively direction of travel to the south). From the prior art it is known to detect the driving of a vehicle onto a traffic area which is subject to tolls by evaluating position-related data of the vehicle in that it is detected on the basis of the position-related data that the vehicle has to be located on the traffic area which is subject to tolls.

This is possible, for example, by virtue of a vehicle device which is carried along by the vehicle and which comprises a position-determining device, for example a GNSS receiver which receives data from satellites of a global navigation satellite system (GNSS) which are suitable for determining positions—and outputs position-related data. A processor which is included in the vehicle device compares the position-related data with geographic data of geo-objects which represent the traffic areas which are subject to tolls (also referred to as tariff objects), here the route section which is subject to tolls of a road which is subject to tolls. If the comparison reveals an association of the position-related data with a route section which is subject to tolls, for example through the detection that the position-related data correspond to a position of the vehicle inside an area which is spanned by the geographic data of the geo-object of the route section which is subject to tolls—it is considered that the traffic area which is subject to tolls is being used by the vehicle. As a result, a toll relating to the vehicle is collected for the use of the traffic area which is subject to tolls, partially retroactively, and a use authorization is therefore acquired.

SUMMARY

This disclosure describes methods and components with which the specified disadvantages both of the automatic method and of the manual method in an existing toll system are eliminated.

This disclosure describes avoiding, in a toll collection system, the unintentional absence of a use authorization for traffic areas which are used and which are subject to tolls.

In addition, this disclosure describes, in terms of data protection issues, less problematic booking methods and booking components for use authorizations.

In this context it is, in particular, an object of one or more embodiments of the invention to make available a user-friendly booking and cancelation method and corresponding booking and cancelation components in a toll collection system.

Aspects and examples of this disclosure include a booking and cancelation method, a toll collection method, a vehicle device, a mobile radio device, a computer program product, a toll collection system and a data processing device.

The independent product claims represent different categories of products for the inventive solution of the above-mentioned problems. One of these inventive products or one of the developments thereof can include a product for carrying out a method according to some embodiments or one of the developments thereof or can be included therein. Conversely, the use of a claimed inventive product or one of the developments thereof can include the execution of a method according to some embodiments or of one of the developments thereof or can be included therein. The different aspects of one or more embodiments of the invention which are manifested by the numerous claim categories reflect the versatility of one or more embodiments of the invention, which can be applied both for decentralized booking, cancelation and toll collection methods as well as for centralized booking, cancelation and toll collection methods.

In simplified terms, of one or more embodiments of the invention provide, for a system for collecting tolls for the use of traffic areas, methods and products which provide bookings of use authorizations of the traffic areas which are initiated in a decentralized fashion and which precede uses of the traffic areas, and cancelations of the use authorizations, which are initiated in a decentralized fashion and follow non-uses of the traffic areas, in a decentralized vehicle device and/or a central data processing device.

This disclosure describes a plurality of aspects that represent the various categories of one or more embodiments of the invention. Advantages, features and embodiments which are mentioned with respect to one aspect of one or more embodiments of the invention apply here in a transferable fashion to all the other aspects of one or more embodiments of the invention, unless this leads to a contradiction.

BRIEF DESCRIPTION OF THE DRAWINGS

The invention will be explained in more detail below with reference to exemplary embodiments for a road toll system.

FIG. 1a shows a first flowchart for steps in the method of a first embodiment of the invention during the passage through a first route according to the first map illustrated in FIG. 2a.

FIG. 1b shows a second flowchart for steps in the method of a second embodiment of the invention during the passage through a second route according to the second map illustrated in FIG. 2b.

DETAILED DESCRIPTION

Figure 1A:
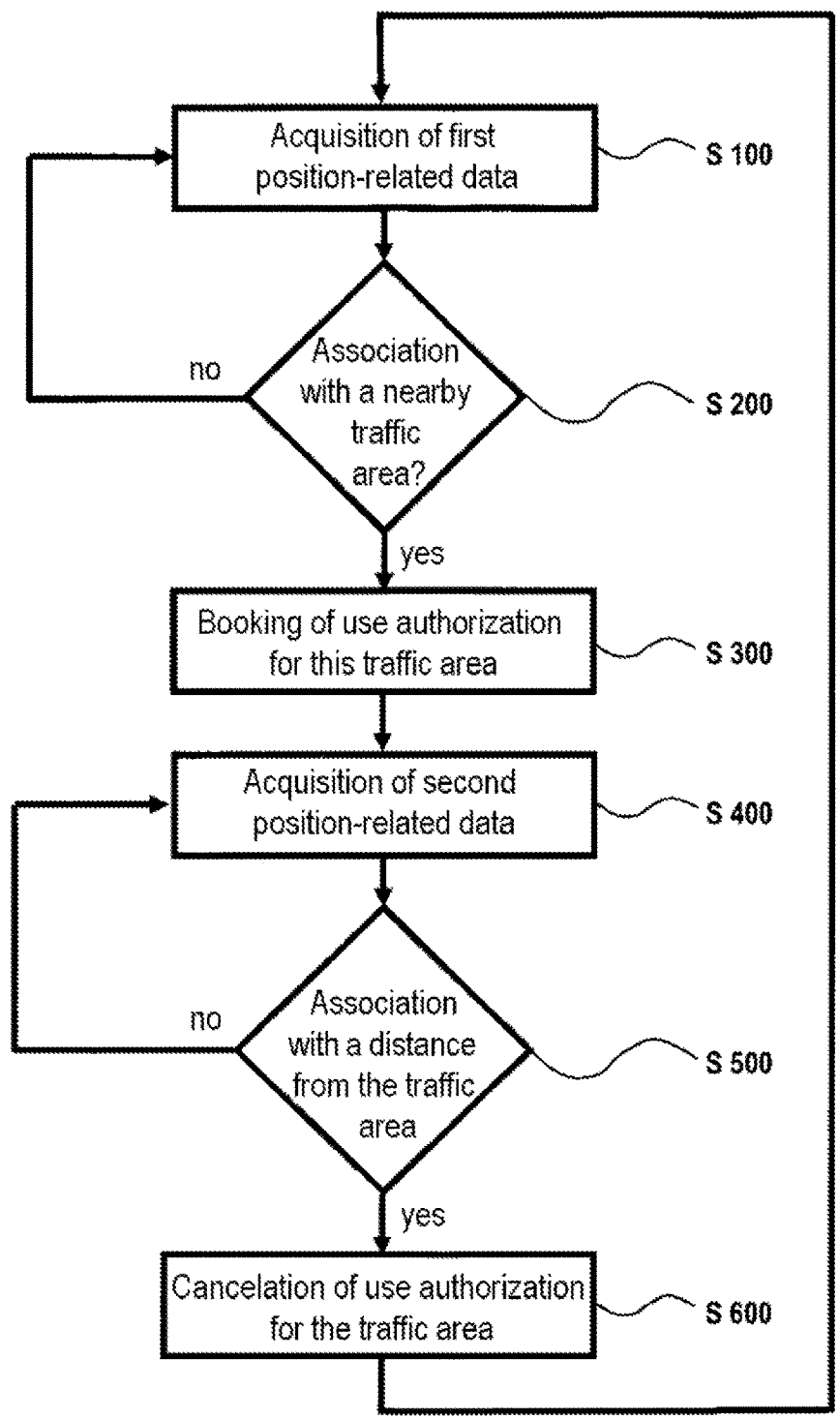
Figure 1:
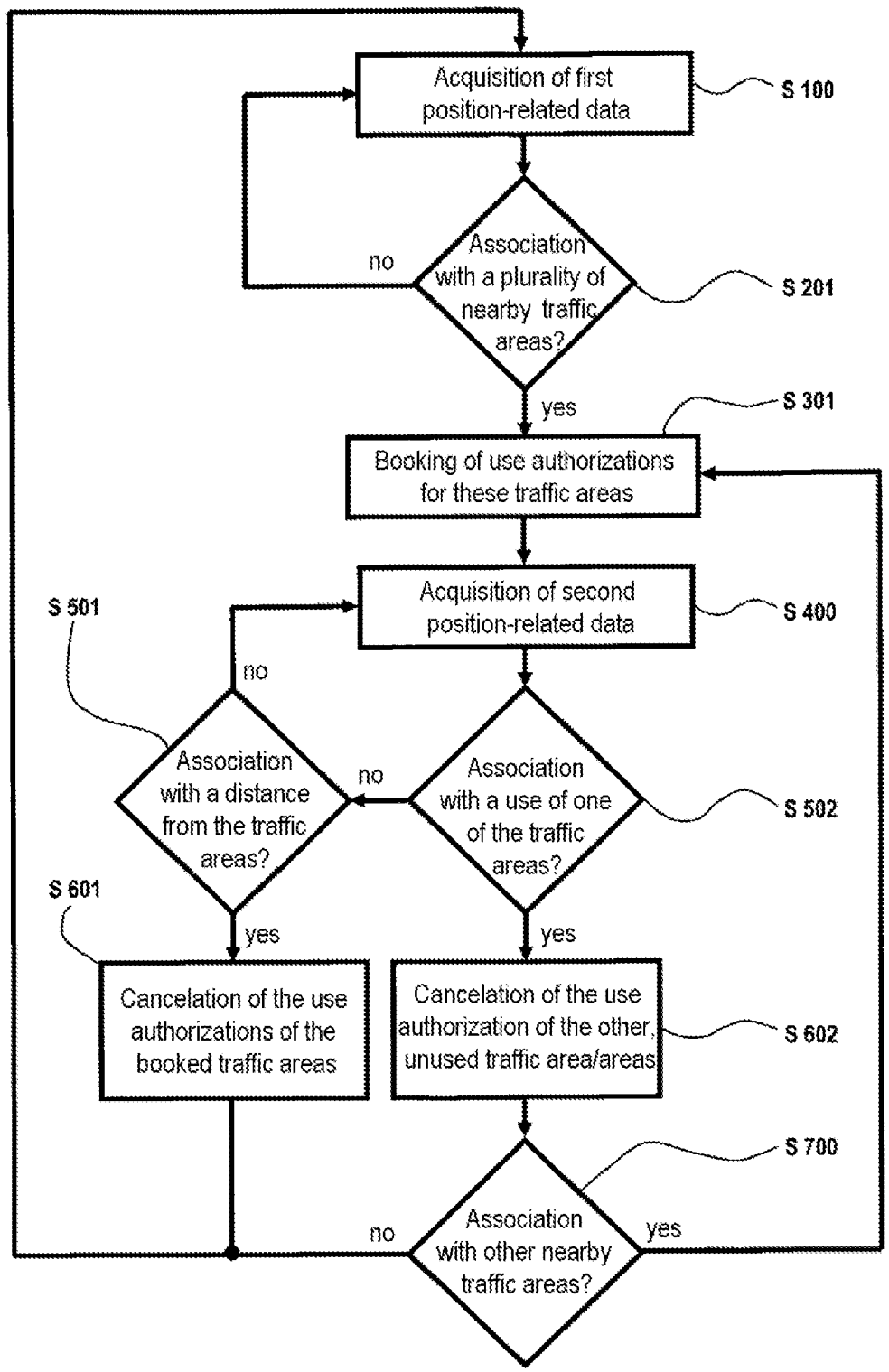
Figure 2:
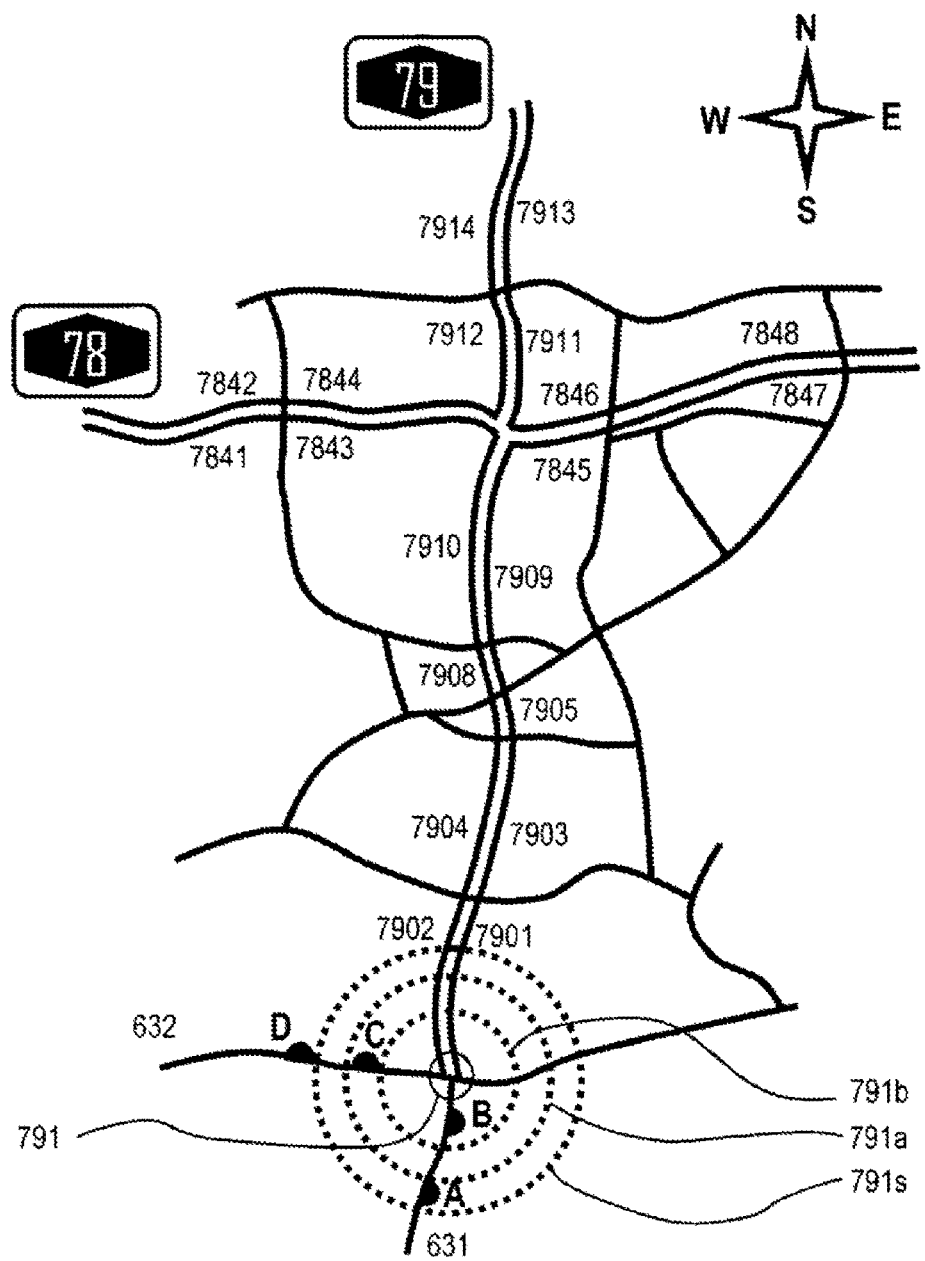
FIG. 2a shows a first map in which the profile of a first route of a vehicle 50 in a first exemplary embodiment is illustrated.
FIG. 2b shows a second map in which the profile of a second route of a vehicle 50 in a second exemplary embodiment is illustrated.
FIG. 2c shows a third map in which the profile of a third route of a vehicle 50 in a third exemplary embodiment is illustrated.
Figure 2:
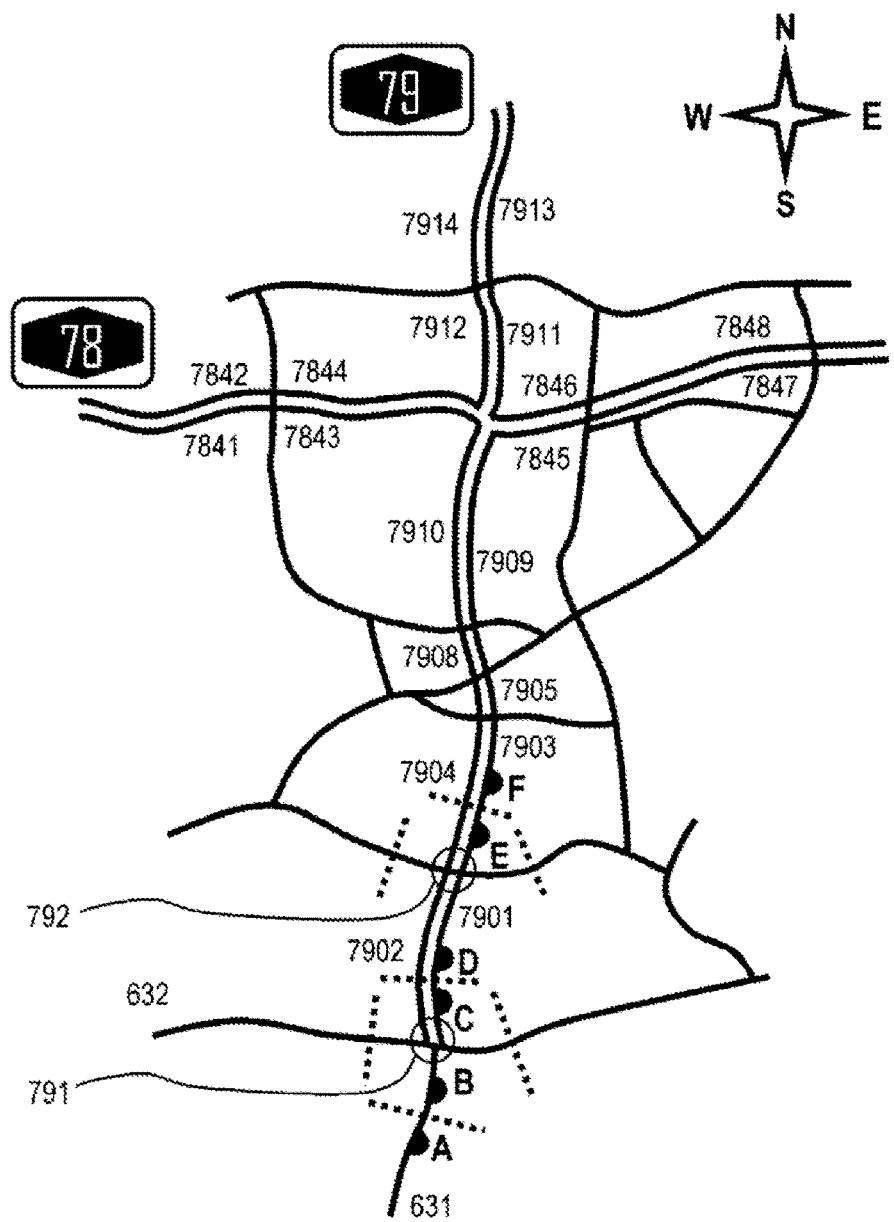
Figure 2:
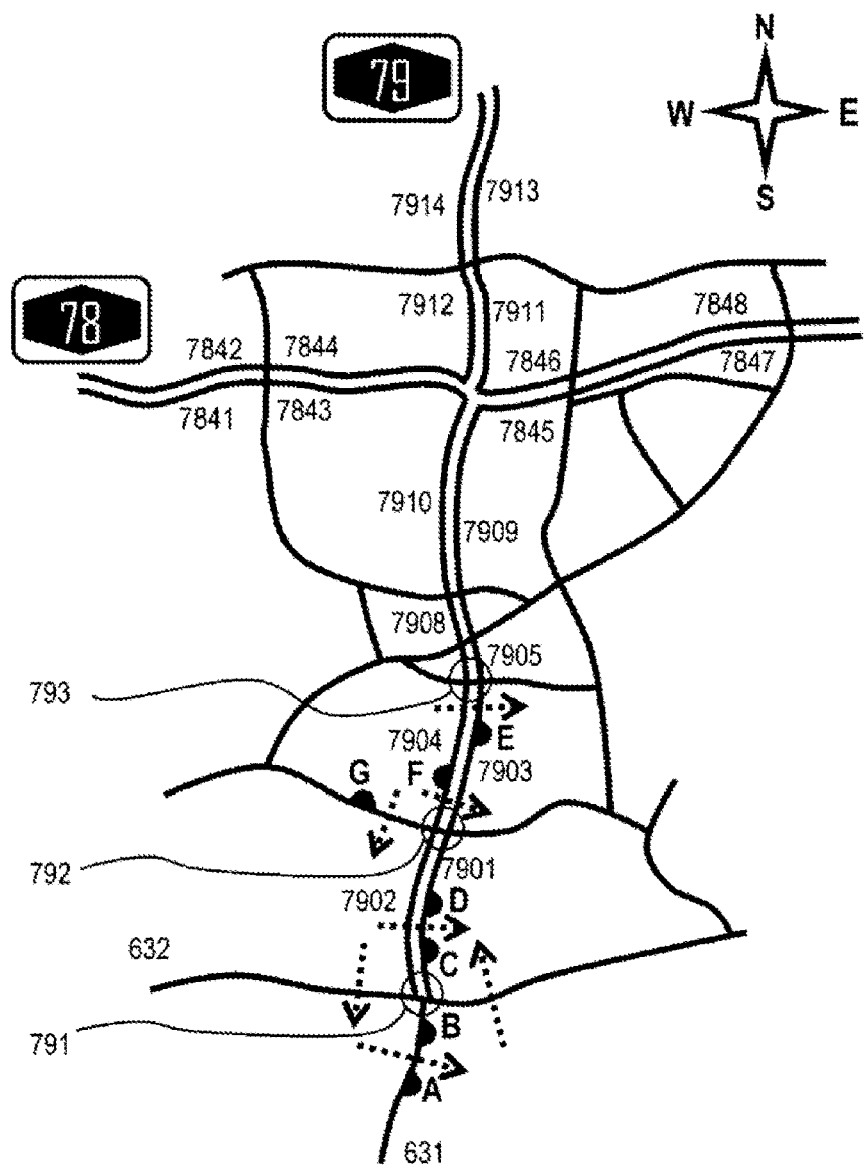
Figure 3:
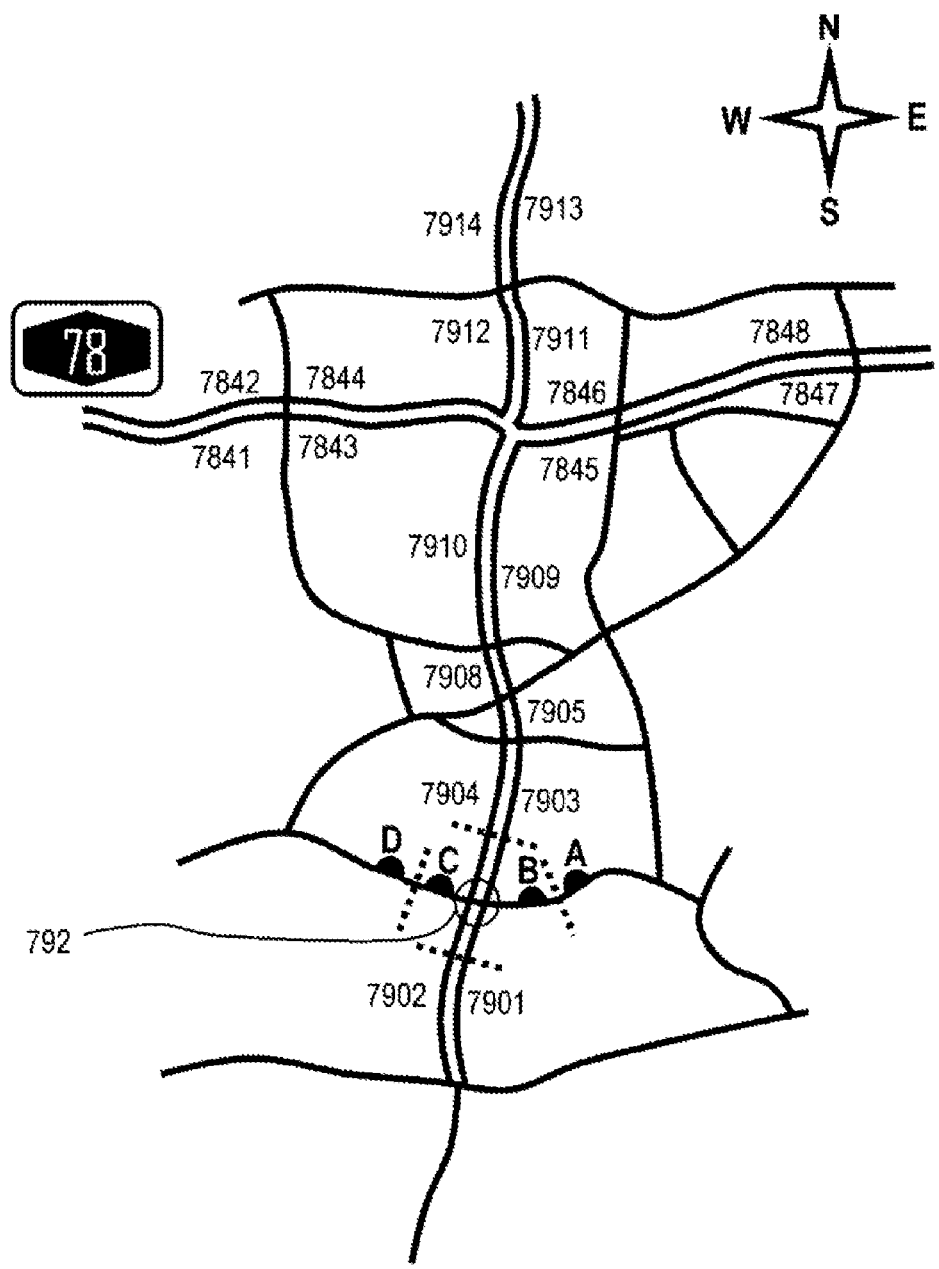
FIG. 3a shows a fourth map in which the profile of a fourth route of a vehicle in a fourth exemplary embodiment is illustrated.
FIG. 3b shows a fifth map in which the profile of a fifth route of a vehicle in a fifth exemplary embodiment is illustrated.
FIG. 3c shows a sixth map in which the profile of a sixth route of a vehicle in a sixth exemplary embodiment is illustrated.
Figure 3:
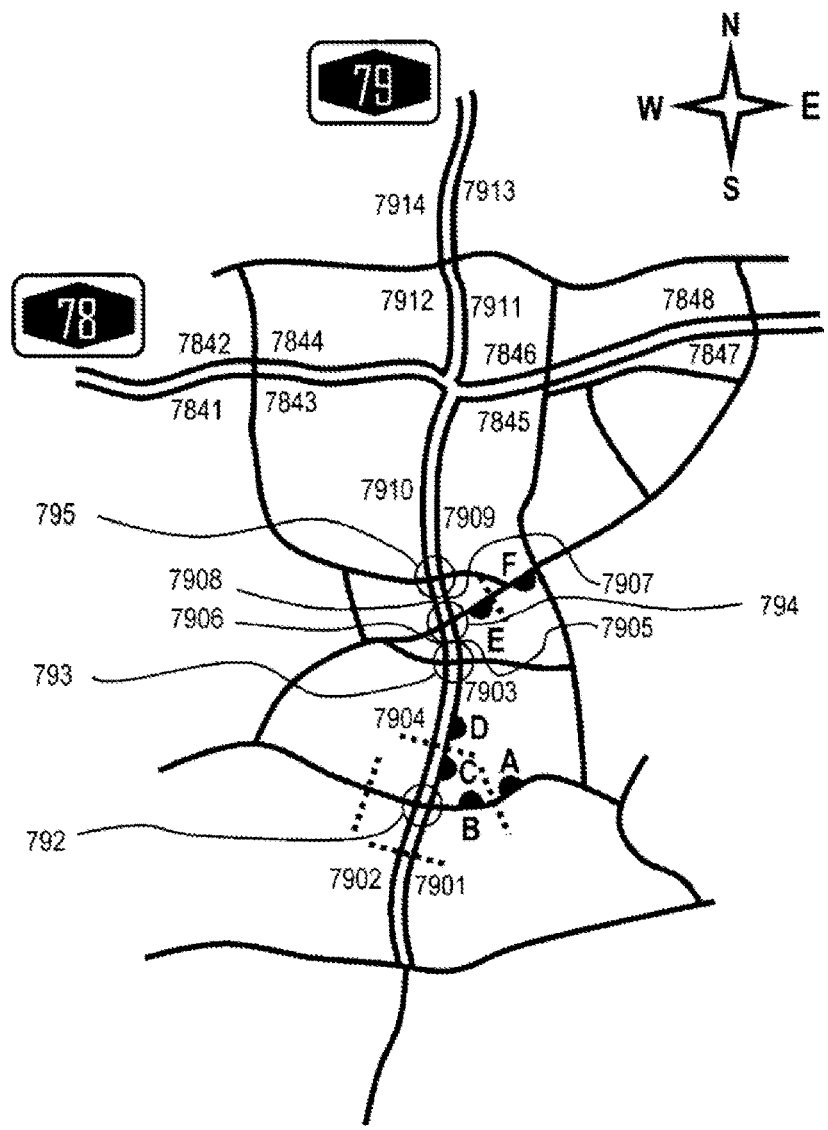
Figure 3:
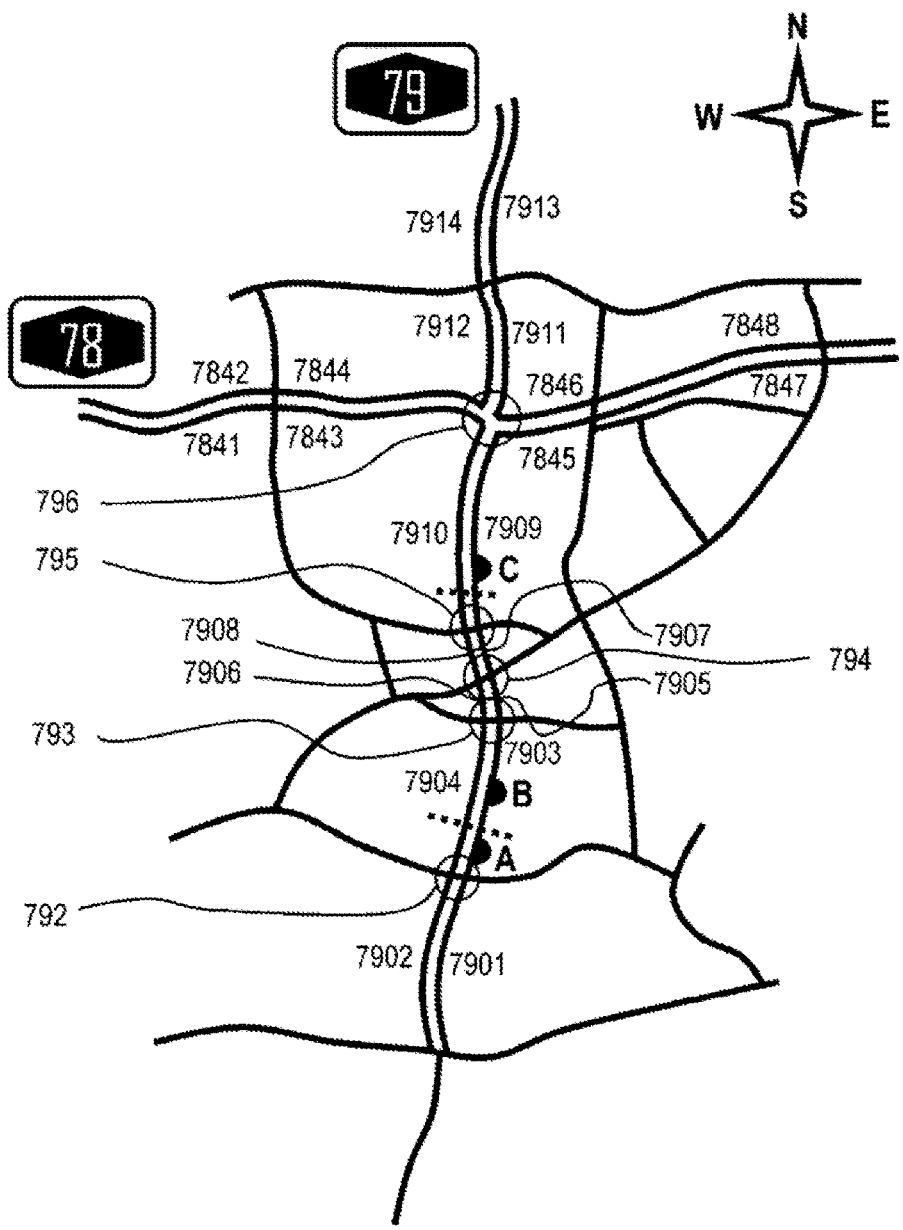

According to a first aspect of one or more embodiments of the invention, a method for booking and canceling use authorizations in a system for collecting tolls for the use of traffic areas which are subject to tolls by a vehicle has the following phases: a) a first data detection phase in which first position-related data of the vehicle are detected, b) a first association phase in which the first position-related data are associated with a possible imminent use of at least a first traffic area which is subject to tolls by the vehicle and with at least one possible use of a second traffic area which is subject to tolls by the vehicle, which is imminent as an alternative to the first traffic area which is subject to tolls, c) a booking phase in which a first use authorization relating to the vehicle is booked for the first traffic area which is subject to tolls and in addition to the first use authorization a second use authorization relating to the vehicle is booked for the second traffic area which is subject to tolls, d) a second data detection phase in which second position-related data of the vehicle are detected, e) a second association phase in which the second position-related data are associated with a confirmed non-use of at least the first traffic area which is subject to tolls by the vehicle, and f) a cancelation phase in which at least the first use authorization for the first traffic area which is subject to tolls is canceled.

Since the cancelation phase also includes a booking process, specifically that which leads in terms of data technology to cancelation, the cancelation phase can also be conceived as a second booking phase, as a result of which the booking phase mentioned above, which leads in terms of data technology to the generation/activation of the use authorizations, can be considered as the first booking phase.

Owing to the alternative use character with which the use of the first traffic area which is subject to tolls is excluded, it is possible, when the second traffic area which is subject to tolls is used, to determine the non-use of the first traffic area implicitly where appropriate by virtue of the fact that the second position-related data are associated with a confirmed use of the second traffic area which is subject to tolls by the vehicle.

In addition, owing to the alternative use character with which the use of the first traffic area which is subject to tolls is excluded, if the second traffic area which is subject to tolls is used, the cancelation of the use authorization in the second booking phase can be implied by virtue of the fact that a toll is collected for the use of the second traffic area which is subject to tolls and which has been confirmed in the second association phase and carried out by the vehicle.

In this sense, the collection of a use toll for the second traffic area which is subject to tolls in the second booking phase counts as cancelation of a toll-free use authorization for the first traffic area which is subject to tolls.

For the entirety of the method steps c) first booking phase, e) (second association phase) and f) (second booking phase) of this inventive booking and cancelation method which can be developed to include the collection of a toll in the case of confirmed use of the second traffic area which is subject to tolls—which is not excluded owing to the purpose involved—to form a toll collection method, there is to be closer consideration of the following three possible combination variants with the abbreviations:

NN1. for the confirmed non-use of the first traffic area which is subject to tolls in the second association phase, N2 for the confirmed use of the second traffic area which is subject to tolls in the second association phase, S1 for the cancelation of the use authorization for the first traffic area which is subject to tolls in the second booking phase, G2 for the collection of a toll for the (possible and/or confirmed) use of the second traffic area which is subject to tolls, in the first or second booking phase as a measure for acquiring a use authorization for the second traffic area which is subject to tolls in the first booking phase or as a measure for paying for the use of the second traffic area which has been proven in the second association phase, G1 for the collection of a toll for the possible use of the first traffic area which is subject to tolls as a measure for acquiring a use authorization for the first traffic area which is subject to tolls in the first booking phase, R1 for booking a toll-free authorization for the use of the first traffic area which is subject to tolls, R2 for booking a toll-free authorization for the use of the second traffic area which is subject to tolls, A2 for the second association phase, B2 for the second booking phase and B1 for the first booking phase in which i) toll-free bookings R1 and R2 of use authorizations for the first and the second traffic areas which are subject to tolls are indicated when a toll collection G2 for the second traffic area which is subject to tolls does not take place until the second booking phase B2 when proof has been provided of the actual use thereof in the second association phase A2 and ii) the collections G1 and G2 of tolls for acquiring an authorization for the possible alternative use of the first traffic area which is subject to tolls and of the second traffic area which is subject to tolls are indicated when no toll collection G2 for the second traffic area which is subject to tolls is provided in the second booking phase B2 even though the use of the second traffic area has been proven in the second association phase:

| Variant | Phase A2 | Phase B2 | Phase B1 |
|---------|----------|----------|----------|
| Variant 1 | NN1 | S1 | R1 + R2 or G1 + G2 |
| Variant 2 | N2→NN1 | G2→S1 | R1 + R2 |
| Variant 3 | N2→NN1 | S1 | G1 + G2 |

In the case of variant 2, on the one hand the confirmed use N2 of the second traffic area which is subject to tolls and the toll collection G2 for this in the second booking phase B2 owing to the Ko use, excluded according to some embodiments, of the first and of the second traffic areas which are subject to tolls implies, on the one hand, the non-use of the first traffic area NN1 which is subject to tolls, resulting in the cancelation S1 of the use authorization for the first traffic area which is subject to tolls solely owing to the toll collection G2 which has taken place, and, on the other hand, the lack of payment of a toll for the booking for the use authorizations R1 and R2 in the first booking phase B1 (a single toll cannot be collected effectively a second time at the end).

In the case of variant 3, in which despite the use, confirmed in the second association phase A2, of the second traffic area which is subject to tolls, in the second booking phase B2, there is no provision for a toll G2 to be collected for the use of the second traffic area which is subject to tolls, the obligation to pay a toll for the first and second traffic areas which are subject to tolls implies the collection of tolls G1 and G2 as a measure for the acquisition of a use authorization in the first booking phase B1 resulting in refunding of the tolls as a cancelation measure for the non-use of the first traffic area which is subject to tolls owing to the Ko use, excluded according to some embodiments, of the first and of the second traffic areas which are subject to tolls.

The method according to some embodiments can, according to variant 1, be restricted in the second association phase A2 to associating the second position-related data with a confirmed non-use NN1 of at least the first traffic area which is subject to tolls by the vehicle, and can be restricted in the second booking phase B2 to a cancelation phase in which at least the first use authorization R1 or G1 for the first traffic area which is subject to tolls is canceled. This is the case, for example, if in the first booking phase B1 the bookings of the use authorizations is already associated with the collection of tolls G1 and G2, of which bookings at least the booking for the first traffic area which is subject to tolls in the second booking phase is canceled by being entirely or partially deleted, credited or paid back or else if generally all the use authorizations R1, R2 etc. which have been booked in the first booking phase for the first, second and, if appropriate, further traffic areas, which can each be used only as alternative to one another, are canceled without collection of a toll for this reason in the second booking phase B2 because in the second association phase A2, the second position-related data are associated by the vehicle with a confirmed non-use NN1, NN2 etc. of all the traffic areas which are subject to tolls and for which a toll-free use authorization was respectively booked in the first booking phase B1.

Without a further feature which explicitly specifies or implies a toll collection G2 for the second traffic area in any of the two booking phases B1 or B2, the variant 1 is the only one which—also entirely in the sense of one or more embodiments of the invention—permits cancelation S1 and S2 of all the traffic areas which are subject to tolls in the second booking phase B2 (cancelation phase here) in the sense of an added feature for the cancelation S2 of the second traffic area which is subject to tolls, for which use authorizations R1, R2 etc. or G1, G2 etc. were booked in the first booking phase.

This, of course, does not exclude the possibility that in the case of proven use of the second traffic area a toll collection G2 occurs for the second traffic area which is always possible in a way supplementary to variant 1 following the first association phase, preferably within the scope of the cancelation phase which applies in a generalized form as a second booking phase.

This variant 1 equally does not exclude tolls for the first and the second which are susceptible to tolls to be able to be already collected in the (first) booking phase if this toll collection is a precondition for the first and second use authorization or corresponds thereto, wherein the collection of at least the toll for the first traffic area which is subject to tolls in the cancelation phase (second booking phase) has to be made ineffective by a corresponding data technology measure.

The variants 1, 2 and 3 equally do not exclude mixed variants which in the first booking phase the collection of partial tolls for the first and second traffic area and in the second booking phase when use N2 is confirmed the collection of a supplementary partial toll for the used second traffic area which is subject to tolls and the refunding of the collected partial toll for the non-used first traffic area for which traffic area which is subject to tolls is provided as a cancelation measure.

The sense of this aspect of one or more embodiments of the invention also covers a method for booking and canceling use authorizations in a system for collecting tolls for the use of traffic areas which are subject to tolls by a vehicle having the following steps: a) detecting first position-related data of the vehicle, b) associating the first position-related data with a possible imminent use of at least a first traffic area which is subject to tolls and with at least a possible use of a second traffic area which is subject to tolls by the vehicle, which is imminent as an alternative to the first traffic area which is subject to tolls, c) booking a first use authorization, relating to the vehicle, for the first traffic area which is subject to tolls and a second use authorization, relating to the vehicle, for the second traffic area which is subject to tolls, d) detecting second position-related data of the vehicle, e) associating the second position-related data with a confirmed non-use of the first traffic area which is subject to tolls by the vehicle, and f) canceling the first non-use for the first traffic area which is subject to tolls.

These steps can occur, for example, according to some embodiments in the previously mentioned phases of the method according to some embodiments.

In this context, the six inventive phases a) to f) are preferably to be carried out chronologically—if appropriate partially but not completely overlapping—in succession in the sequence of their citation. However, this is not compulsory. For example, the second data detection phase can be positioned chronologically before the first association phase if otherwise the sequence is complied with as preferred: a), d), b), c), e), f). However, in particular, the first data detection phase always at least partially precedes the second data detection phase in such a way that first position-related data of the first association step are detected before the second position-related data of the second association step; in particular the booking phase always at least partially precedes the cancelation phase in such a way that the booking step is always carried out before the cancelation step.

The cancelation of a use authorization is understood to be any measure which is suitable for making the use authorization ineffective.

Associating the first position-related data with a possible imminent use of at least a first traffic area which is subject to tolls by the vehicle is equivalent to associating the first position-related data with at least a first traffic area which is subject to tolls in terms of a possible imminent use of this first traffic area which is subject to tolls by the vehicle.

Associating the first position-related data with a possible use of a second traffic area which is subject to tolls by the vehicle, which is imminent as an alternative to the first traffic area which is subject to tolls, is equivalent to associating the first position-related data with at least a second traffic area which is subject to tolls in terms of a possible imminent use of this first traffic area which is subject to tolls by the vehicle in a way which is an alternative to the possible imminent use.

Alternatively usable traffic areas are those which can only be driven to in an alternative way from a specific location. For example, at the branch point of a road junction with a first roads starting from the branch point and a second road starting from the branch point the second roads cannot be used when the first road is used. In this sense, the first road and the second road are alternatively usable traffic areas.

In the same way, the alternative usability of two or more traffic areas indicate that the traffic areas have a common access road from which only either the first or the second traffic area, or in fact only one of the plurality of traffic areas can be traveled on.

A feature of the invention is the equally ranking booking of use authorizations (with or without collection of tolls) for at least two traffic areas which are subject to tolls, and consecutive travel on which is excluded owing to their connection to the same access road, unless this access road is used again: only if the access road to the first and second traffic areas which are subject to tolls is passed a second time can the driver again select between use of the first and of the second traffic areas which are subject to tolls.

Consequently alternatively usable is to be understood as meaning that use is possible exclusively in an alternative fashion—either the first traffic area which is subject to tolls or the second traffic area which is subject to tolls. It also follows from this that detecting the use of the second traffic area which is subject to tolls is equivalent to detecting the non-use of the first traffic area which is subject to tolls. The converse does not apply: the detection of the non-use of the first traffic area which is subject to tolls leaves the question of the use of the second traffic area which is subject to tolls unanswered as long as the non-use or use of the second traffic area which is subject to tolls has not been detected.

For parking areas which are subject to tolls within a town center, this access road can, in the sense of one or more embodiments of the invention, be made available by a—preferably closed—outer town boundary which surrounds the town center and a plurality of—preferably closed—inner boundaries which are surrounded by the outer town boundary and which surround the various parking areas and which can be respectively modeled in the form of geographic coordinates.

For route sections of roads which are subject to tolls this access road can, in the sense of one or more embodiments of the invention, be made available by a—preferably closed—access boundary which surrounds the common access road of the plurality of route sections and can be modeled in the form of geographic coordinates, wherein the access road boundary preferably intersects all the route sections which are subject to tolls and which start from the access road.

In an edge-node model of a road network of route sections which are subject to tolls as traffic areas which are subject to tolls, alternatively usable route sections form edges which proceed from a common node of an access road. In this context, there are two classes of alternatively usable route sections: those which represent a branch to different directions of travel (freeway junction: two alternatively usable route sections, freeway intersection: three alternatively usable route sections) at a node with three edges (freeway junction) or four edges (freeway intersection) and those which represent continued travel in the direction of travel or the return journey counter to the direction of travel at a node with two edges and a possibility of turning the vehicle around. Both classes can occur together at a freeway intersection or freeway junction if the vehicle offers the possibility of not only branching off according to the route but also of performing a turning around maneuver resulting in a return journey counter to the direction from which it was coming. In this mixed form there are three alternatively usable route sections at a freeway junction and four alternatively usable route sections at a freeway intersection.

In terms of information technology, the association of the first position data with a plurality of alternatively usable route sections which are subject to tolls can be represented as follows: all the route sections (all the edges) of a route network which are subject to tolls are assigned in terms of their possible alternative use with respect to their one common connection point (a common source node). For each connection point $Q_i$, all the route sections $K_{i,j}$ which are subject to tolls and which start from the latter and which are linked by data technology as uniquely defined route section identifiers to the uniquely defined connection point identifier of the connection point $Q_i$ are then obtained.

Within the scope of the association of the first position data with the route sections (edges) Ki,j, the connection point (node) Qi which is closest to the first position data geographically or in terms of infrastructure technology is detected on the basis of the first position data and is linked by data technology to all the route sections (edges) Ki,j which are subject to tolls, are assigned to it and start from it. All the route sections Ki,j which are subject to tolls and which start as edges from such a detected common node Qi of the network of route sections which are subject to tolls count as alternatively usable; these are associated with the first position data and the corresponding use authorizations are booked for them.

Therefore, the booking of use authorizations for a plurality of route sections which are subject to tolls, preferably all the route sections which are subject to tolls and are linked to a common connection point (access road or access slip road) is a feature of one or more embodiments of the invention.

With such (positive) association, at least a first traffic area which is subject to tolls or a first group of a plurality of traffic areas which are subject to tolls and which comprise a first traffic area which is subject to tolls and a second traffic area which is subject to tolls, and which can be used as an alternative to the first, can be selected from all the traffic areas which are subject to tolls, for which use authorizations can be booked and which can be used by the vehicle, for booking corresponding use authorizations, wherein the first and the second traffic areas can be traveled on from a first position of the vehicle, represented by the first position-related data, closely compared to the other traffic areas which are subject to tolls and which are not associated.

Associating second position-related data with a confirmed non-use of the first traffic area which is subject to tolls by the vehicle is equivalent to associating the second position-related data with the first traffic area which is subject to tolls with respect to a confirmed non-use of this first traffic area which is subject to tolls by the vehicle.

In addition, the second position-related data can also be associated with a confirmed non-use of the second traffic area which is subject to tolls by the vehicle, specifically when the vehicle has demonstrably not traveled on the two first and second traffic areas. Owing to the alternative use character, use of the second traffic area which is subject to tolls (under certain circumstances even proven use) excludes the use of the first traffic area which is subject to tolls, with the result that the cancelation of the use authorization of the first traffic area which is subject to tolls is obligatory due to a lack of use in terms of toll regulations, in so far as irrevocable collection of tolls is dependent on use.

With such (negative) association, at least the first traffic area which is subject to tolls or a second group of a plurality of traffic areas which are subject to tolls and which comprise the first traffic area which is subject to tolls can be selected from the first group of traffic areas which are subject to tolls, for which a use authorization has been booked and which have not yet been traveled on by the vehicle, for canceling the present use authorization or authorizations, which traffic area or group of a plurality of traffic areas can no longer be traveled on from a second position of the vehicle which is represented by the second position-related data, unless a renewed positive association of new first position-related data occurs with the first traffic area which is subject to tolls with respect to a possible imminent use of this first traffic area which is subject to tolls by the vehicle.

A possible imminent use of a traffic area which is subject to tolls means (a) that the use of this traffic area has not yet taken place, and (b) owing, for example, to the proximity of the vehicle to the traffic area the use of this traffic area cannot be ruled out within a time period of a predefinable length (for example one minute for two kilometers distance of the vehicle from the traffic area).

A possible imminent use either of a first traffic area which is subject to tolls or a second traffic area which is subject to tolls therefore requires according to some embodiments the association of first position-related data with a first traffic area which is subject to tolls and a second traffic area, neither of which is a traffic area on which the vehicle has already been located at the time of the association but is in each case a traffic area in whose proximity the vehicle is located; that is to say the first position-related data are associated with at least a first traffic area which is subject to tolls and a second traffic area which is subject to tolls and whose alternative use is imminent and is classified as possible within the scope of a predefinable time window.

A confirmed non-use of the traffic area which is subject to tolls means (a) that use of this traffic area has actually not taken place and (b) owing, for example, to the large distance of the vehicle from the traffic area the use of this traffic area can be ruled out within a time period of a predefinable length (for example one minute for three kilometers distance of the vehicle from the traffic area).

A confirmed non-use of the first traffic area which is subject to tolls therefore requires according to some embodiments the association of second position-related data with the traffic area which is subject to tolls and which is not a traffic area on which the vehicle has been located since the booking of the use authorization for this first traffic area but instead is a traffic area from which the vehicle is far away; that is to say the second position-related data are associated with the first traffic area which is subject to tolls and whose use has not taken place and is classified as having not occurred within the scope of a predefinable time window.

The second position-related data preferably represent at least partially a different (second) location or a different (second) region which includes geographically at least some of the second position-related data, as the (first) location which is represented by at least some of the first position-related data or the (first) region which geographically includes at least some of the first position-related data.

In principle, all the alternatively usable traffic areas which are subject to tolls and for which use authorizations have been booked but which have demonstrably not been used are inventive first traffic areas which are subject to tolls and whose use authorization is canceled. According to some embodiments, the alternatively usable traffic areas which are subject to tolls can include at maximum one, specifically the second, traffic area which is subject to tolls and whose use can actually take place and whose use excludes the use of the other first traffic areas which are subject to tolls.

However, since at the time of the booking it is generally not possible to predict whether, and if so which, traffic areas which are subject to tolls are used after the booking, the scope of the booking always includes not only one or more first traffic areas which are subject to tolls but also precisely a second traffic area which is subject to tolls and which, if one of the traffic areas which is subject to tolls is used, is defined as the one which is used and for which a toll is irrevocably collected or is retained during use. This does not rule out the possibility of the booking of the second traffic area which is subject to tolls also being canceled if it also was demonstrably not used, like the other first traffic areas which are subject to tolls.

A deviation from the rule of lack of predictability of use or of no use of the second traffic area which is subject to tolls occurs, for example, at the traffic nodes of route sections which are subject to tolls and at which the user cannot leave the route network which is subject to tolls with his vehicle but instead always travels on one of the booked route sections, irrespective of how he decides to carry on his journey at the traffic node. This situation is typical of freeway intersections at which there are generally three first route sections which are subject to tolls (for example to the left, to the right and back in the direction of travel) and a second route section which is subject to tolls (straight ahead in the direction of travel in this case).

In all events, all the first booked traffic areas which are subject to tolls are compulsorily canceled according to some embodiments; however, for the one second booked traffic area which is subject to tolls in the first association phase there is the ambivalence of the possible use and possible non-use up to the actual detection of the use or non-use in the second association phase.

In this respect, it is inherent to one or more embodiments of the invention that when use is detected which of the booked traffic areas which are subject to tolls is a first traffic area and which is the second traffic area only becomes clear in retrospect in the second association phase; when there is no use of the of these traffic areas the division into first and second traffic areas which are subject to tolls is arbitrary.

Moreover, this does not exclude the possibility that in addition to the one second traffic area which is subject to tolls, further second traffic areas which are subject to tolls and which are used just as little as the first area or traffic areas can be booked. The difference between first and second traffic areas is according to some embodiments the fact that first traffic areas which are subject to tolls have to be canceled; second traffic areas which are subject to tolls also have to be canceled with the exception of the last one, but the last one is the one for which use is, under certain circumstances, confirmed, resulting in a toll being collected or retained for the use thereof. The authorization for the one-off use of this (last) second traffic area which is subject to tolls also expires with the authorization of the one-off use of this traffic area which is subject to tolls, which is also equivalent in effect to cancellization—even if it is accompanied by an effective collection of tolls.

Embodiments of the method according to some embodiments provide for the booking phase to include or entail the generation of a booking confirmation signal.

The user can therefore be informed about the success of the booking of a use authorization for the first traffic area before he travels on said area. As long as the booking confirmation fails to occur, he will refrain from traveling illegally on the first or the second traffic area. This measure advantageously prevents him from unwittingly committing an offense.

Embodiments of the method according to some embodiments provide for the cancelation phase to include or entail the generation of a cancelation confirmation signal.

The user can therefore be informed about the success of the cancelation of a use authorization for the first traffic area before he travels on said area. This message confirms to him that no costs have been incurred for the use authorization of the first traffic area and makes it easier for him to understand a later breakdown of the tolls and check their accuracy. In addition, the user is informed that from now on it is necessary to book a renewed use authorization for the first traffic area if he would still like to use said area later.

Technical means which are suitable for carrying out the booking and cancelation method according to the first aspect of one or more embodiments of the invention are a position-determining device which is carried along by the vehicle, a processor which is carried along by the vehicle or arranged outside the vehicle and a data memory which is carried along by the vehicle or arranged outside the vehicle. In this context, the processor is coupled at least temporarily by data technology both to the position-determining device and to the data memory in that it is connected to them, for example at least temporarily, in at least one wire-bound and/or wireless communication connection.

In the first data detection phase, the first position-related data are preferably detected by means of at least one position-determining device which is carried along by the vehicle.

In the second data detection phase, the second position-related data are preferably also detected by means of the position-determining device which is carried along by the vehicle.

For this purpose, the position-determining device preferably has a GNSS receiver which is configured to receive, from satellites of a Global Navigation Satellite System (GNSS), signals which are suitable for position determination at least during the first and preferably also during the second data detection phase, from which signals at least first and preferably also second position-related data are generated by the position-determining device.

If exclusively one mobile device which is carried along by the vehicle is involved in the execution of the method according to some embodiments, a processor which is included in said device and has the purpose of carrying out the method according to some embodiments can execute a computer program product which is characterized by means for executing the following instructions: (a) receiving first position-related data of a position-determining device which is included in a mobile device, (b) associating the first position-related data of the position-determining device with a possible use of at least a first traffic area which is subject to tolls and with a possible use of a second traffic area which is subject to tolls by the vehicle, as alternative to the use of the first traffic area which is subject to tolls, (c) storage of a first use authorization and/or of a first toll for the first traffic area which is subject to tolls and of a second use authorization and/or of a second toll for the second traffic area which is subject to tolls, in a first data memory of the mobile device, (d) receiving second position-related data of the position-determining device, (e) associating the second position-related data of the position-determining device with a non-use of the first traffic area which is subject to tolls by the vehicle, and (f) deleting the first use authorization and/or first toll for the first traffic area which is subject to tolls from the first data memory and/or storing a cancelation of the first use authorization and/or an at least partial credit for the first toll in the first or a second data memory of the mobile device.

In the first association phase, the first position-related data are preferably associated, by means of at least a first processor which processes the position-related data, with a possible imminent use of at least a first traffic area and the imminent use of a second traffic area by the vehicle, which is possible as an alternative to the first traffic area.

The computer program preferably comprises means for accessing a database in which the first and the second alternatively usable traffic areas which are subject to tolls are linked to one another by data technology in a data record. The first and the second alternatively usable traffic areas which are subject to tolls are preferably linked in this database to a primary key which represents a connection point which is common to a traffic area of the first and second traffic areas.

In the second association phase, the second position-related data are preferably associated with a confirmed non-use of the first traffic area by the vehicle by means of the first or a second processor which processes position-related data.

For example, in the first association phase the processor compares the first position-related data with location data which represent traffic areas which are subject to tolls or are linked thereto, in order to detect, as a result of the comparison, whether the first position-related data correspond to an approach to a first traffic area which is subject to tolls, with undershooting of a predefinable minimum distance of the vehicle from the first traffic area which is subject to tolls. If the result turns out in favor of an approach to the first traffic area which is subject to tolls, determined in the course of this comparison, the processor generates a signal which signals the possible use of the identified first traffic area which is subject to tolls.

For example, in the second association phase the processor compares the second position-related data with location data which represent the first traffic areas which are subject to tolls or are linked thereto in order to detect, as a result of the comparison, whether the second position-related data correspond to a distance from the first traffic area which is subject to tolls, with a predefinable maximum distance of the vehicle from the first traffic area which is subject to tolls being exceeded. If the result turns out in favor of a distance, determined in the course of this comparison, from the first traffic area which is subject to tolls, the processor generates a signal which signals the confirmed non-use of the traffic area which is subject to tolls.

Traffic areas which are subject to tolls, in particular their starting areas, connection points, access roads or access slip roads, can be represented by detection objects.

Detection objects are geometric objects which are spanned, formed or defined by location coordinates (specified for example in the form of degrees longitude and degrees latitude) of a geometric point or a plurality of geometric points, if appropriate with the addition of scalar parameters such as distance, length or radius.

A straight line L as a detection object can be provided by two points (x1, y1) and (x2, y2) through which the line passes. The length limitation of the line can be provided by these points also, provided that these points represent the two ends point of the line.

A circle K as a detection object can be provided by a point of origin (x0, y0)—for example at the connection point from where the first and the second traffic areas which are subject to tolls can alternatively be traveled on—in conjunction with a radius r of the circle.

An n-sided polygon P can be provided by n points (x1, y1) . . . (xn, yn) which are to be connected to one another in the predefined sequence in order to form the edges, provided that the last polygon line is formed by connecting the points (xn, yn) and (x1, y1). An example of such a polygon is a rectangle.

For example, a data memory, which a processor accesses in order to associate position-related data with traffic areas which are subject to tolls, can contain traffic area detection data records (V, E, x1, y1, . . . ) which comprise a traffic area data element V for identifying the respective traffic area, a designator E for defining the detection object used for the traffic area and location coordinates and, if appropriate, scalar parameters of the geographic points which describe the detection object.

In this context, there can definitely be a plurality of traffic area data records for one traffic area because there are a plurality of detection objects (for example: lines) for the traffic area.

Alternatively to this, a first data record of the connection point detection object (Q, E, x1, y1, . . . ) type can be present for a connection point Q with a plurality of connected traffic areas Vj which can be traveled on in an alternative way from Q, and by means of which data record the approaching of the vehicle to the connection point Q can be detected as well as a second data record of the network node (Q, V1, V2, . . . ) type, by means of which the first traffic area V1 which is subject to tolls and which can be traveled on in an alternative way from the connection point Q and the second traffic area V2 which is subject to tolls and, if appropriate, one or more further traffic areas which are subject to tolls and for each of which a use authorization is to be booked are represented.

In addition, a differentiation can be made with respect to the same traffic area in terms of the possible use, the confirmed use and the confirmed non-use with traffic area data records which differ from one another in each case as a result of different detection objects and which can be distinguished by a further attribute, the use attribute N (for example N=0 for possible use, N=1 for confirmed use and N=2 for confirmed non-use).

The same detection object can confirm both the use of a second traffic area which is subject to tolls and the non-use of the first traffic area which is subject to tolls, as well as represent the possible imminent use of a third and/or fourth traffic area.

In the first association phase it is possible, for example by means of the processor, to check by data comparison whether the first position-related data correspond to a position (a1, b1), specified in degrees longitude and degrees latitude, of the vehicle, which is located, (a) within a detection object (polygon, circle), (b) on a certain side within a specific distance from the detection object (line) or else whether, (c) the first position-related data correspond to a plurality of positions (a1, b1) . . . (ai, bi) of the vehicle, the interpolation or smoothed movement line of which intersects a detection object from the outside to the inside (circle, polygon) or (d) in a specific direction (line). If such checking is positive, the corresponding first traffic area which is subject to tolls counts, by means of its traffic area data record, as being associated by the position-related data in terms of a possible use.

By means of a linking within the traffic area detection data record, further traffic areas which can be used as an alternative to the first traffic area, including the second traffic area which is subject to tolls, can also be detected in parallel. By means of a linking of the first traffic area with further traffic areas which can be used as an alternative to the first traffic area, including the second traffic area which is subject to the tolls, in a separate data record outside the traffic area detection data record, the further traffic areas which can be used as an alternative to the first traffic area, including the second traffic area which is subject to the tolls, can also be detected in a serial fashion.

In the second association phase it is possible to check, for example by means of the processor, by data comparison whether the second position-related data correspond to a position (c1, d1), specified in degrees longitude and degrees latitude, of the vehicle which lies (a) outside a detection object (polygon, circle), (b) on a specific side outside a specific distance from the detection object (line) or else whether (c) the first position-related data correspond to a plurality of positions (c1, d1) . . . (ci, di) of the vehicle, the interpolation or smoothed movement line of which intersects a detection object from the inside to the outside (circle, polygon) or (d) in a specific direction (line). If such checking is positive, the corresponding first traffic area which is subject to tolls counts, by means of its traffic area data record, as being associated by the position-related data in terms of a confirmed non-use.

The booking of a use authorization is equivalent to registration, application, addition, generation, storage and formation of this use authorization. It can occur through the production of a data element of a data record, comprising a plurality of data elements, with a content corresponding to the use authorization, in a data memory and/or a database.

In the booking phase a first use authorization relating to the vehicle is preferably booked for the first traffic area which is subject to tolls and a second use authorization relating to the vehicle is booked for the second traffic area which is subject to tolls in that a first booking data record which represents the use authorization for the first traffic area which is subject to tolls and a second booking data record which represents the use authorization for the second traffic area which is subject to tolls are stored in at least one data memory. This storage is preferably controlled by the processor by which the first and the second traffic areas which are subject to tolls were determined in the first association phase.

Any such booking data record can comprise, for example, the traffic area data element which identifies the respective traffic area which is subject to tolls, and a time data element which specifies the start of validity of the use authorization according to the date and time of day.

As an alternative to this, a single booking data record can represent the use authorization both for the first traffic area which is subject to tolls and for the second traffic area which is subject to tolls.

Such a different booking data record comprises, for example, for this purpose only the connection point Q as an identifier for all the traffic areas which are subject to tolls and which start from the connection point Q, as a result of which the booking of the first traffic area, of the second traffic area and, if appropriate, of further alternatively usable traffic areas is implied.

If the storage of the first and of the second or of the other booking data records occurs in a data memory which is carried along by the vehicle and is therefore assigned to the vehicle, the use authorization is per se without further ado already related to the vehicle. If the storage of the respective booking data record occurs in a data memory which is arranged outside the vehicle and which is also used for storing use authorizations of other vehicles, the use authorization is related to the vehicle in that the first and the second or the other booking data records have at least one vehicle data element or are linked to such an element which identifies the vehicle.

Cancelation of a use authorization is equivalent to de-registering, withdrawing, removing, destroying, nullifying and deleting this use authorization. It can be done by removing the booked data element or data record with the content corresponding to the use authorization from the data memory and/or the database or by linking an invalidity marker to the booked element or data record of the content corresponding to the use authorization.

In the cancelation phase the first use authorization for the first traffic area which is subject to tolls is preferably canceled in that the first booking data record which is stored in the data memory in the booking phase is deleted or changed. Such changing can consist in the first booking data record being deleted from the data memory or provided with an invalidity marker. An invalidity marker can be generated, for example, by replacing a validity flag 1 included in the first booking data record with an invalidity flag 0.

Alternatively, cancelation occurs by generating a cancelation data record for the first traffic area which is subject to tolls in the first data memory or a second data memory.

The first data memory can be included in a decentralized data processing device of the vehicle or in a central data processing device of a toll collection point.

Likewise, the second data memory can be included in a decentralized data processing device of the vehicle or in a central data processing device of a toll collection point.

The first and the second data memories can be included in various data processing devices.

For the other data record, which contained only the connection element Q for the booking, the use authorization for the unused traffic areas can be deleted when use of the second traffic area which is subject to tolls is detected, in that the connection element Q in the other data record is replaced or supplemented by the traffic area element V2 of the second traffic area. If there is demonstrably no use of any of the traffic areas Vj which are linked to the connection point Q (for example, because the driver has left the network of the route sections which are subject to tolls at an exit road with his vehicle), it is possible to proceed with the other data record, as described above with the data record of the use authorization of the first traffic area which is subject to tolls. In addition, the use authorization for the first traffic area can also be canceled by the elimination of this use authorization, which occurs as a result of the confirmed use of the second traffic area which is subject to tolls and which excludes use of the first traffic area according to some embodiments.

It is possible in principle to provide that the cancelation of the use authorization for the first traffic area which is subject to tolls is initiated by the presence of the vehicle, detected from the second position data, on the second traffic area which is subject to tolls.

In the first data detection phase, the detected first position-related data can comprise at least a first position or at least a first collection of a plurality of first positions of the vehicle which are determined in the first data collection phase by means of a position-determining device which is carried along by the vehicle, and in the first association phase the first position or the first collection of a plurality of first positions are associated with the first and the second traffic areas which are subject to tolls and which can be reached in an alternative way starting from the first position or a last-detected position of the first collection of a plurality of first positions with the vehicle. In particular it is possible to provide that the first and the second traffic areas which are subject to tolls can be reached directly starting from the first position or a last-detected position of the first collection of a plurality of first positions with the vehicle; that is to say they can be reached only via a route which does not have any other traffic area which is subject to tolls and for which there is no use authorization relating to the vehicle or which is provided for association with the first position or a position of the collection of a plurality of first positions. In particular, the first position-related data which are detected in the first data detection phase can be formed by at least a first position or at least a first collection of a plurality of first positions of the vehicle.

In particular, the first data detection phase can be terminated before the vehicle has entered a defined region which comprises the access slip road or the start of the first and the second traffic areas which are subject to tolls or has undershot a certain distance from the access slip road or the start of the first and the second traffic areas which are subject to tolls.

The use authorization can already be booked before the first or the second traffic areas which are subject to tolls are traveled on, and both the possible travel on the first traffic area which is subject to tolls and the alternatively possible travel on the second traffic area which is subject to tolls can be avoided without the corresponding use authorization for said travel.

For this purpose, the preferably the first position or the last-detected position of the first collection of a plurality of first positions of the vehicle is arranged so far away from the access slip road or the start of the first and the second traffic areas which are subject to tolls that the booking time between the detection of the first position-related data which are associated with a possible use of the first and alternatively second traffic areas, which are subject to tolls, and the booking of the use authorization for the first and the second traffic areas which are subject to tolls is shorter than the minimum travel time which the vehicle requires, taking into account the permissible maximum speed or a predefinable maximum speed (for example 300 km/h for a passenger car on German autobahns (freeways)), to cover the distance between the first position or the last-detected position of the first collection of a plurality of first positions of the vehicle and the access slip road or the start of the first and second traffic areas which are subject to tolls.

The booking of the use authorizations can comprise, in particular, the registration, in a database, of the first and second traffic areas which are subject to tolls and which are assigned to the vehicle, in that, for example, data of the vehicle or data which identify the vehicle (for example the serial number of a vehicle device which is carried along by the vehicle and which detects at least the first position-related data)—abbreviated as: vehicle data—are linked with data of the first and second traffic areas which are subject to tolls or data which identify the first and the second traffic areas which are subject to tolls (for example the geographic coordinates of the centroid of the area of the traffic area which is subject to tolls)—abbreviated as: traffic area data—and are stored together in a data memory. In this way, the vehicle data form, together with the traffic area data, a booking data record which can also comprise data of the booking time (date and time of day of the booking) of this booking data record in order to ensure the unambiguity of the booking data record by means of its uniqueness.

Examples of vehicle data are the vehicle license plate number, the insurance number of the vehicle, a customer number of the user, the serial number of the vehicle device which has already been mentioned or the mobile radio number of a mobile radio device of the user. The vehicle data are particularly preferably formed by the vehicle license plate number or linked thereto. This advantageously assists checking which is based on technical image recording of the vehicle license plate number.

With the method according to some embodiments, the presence of a vehicle at a first position is taken as the prompt to book a use authorization for a first traffic area which can be traveled to from the first position and a second traffic area which can be traveled to from the first position; the presence of the vehicle at a second position is taken as a prompt to cancel the use authorization for at least the first traffic area due to a lack of use of the first traffic area. The lack of use of the first traffic area can either through the confirmed non-use of the first traffic area—for example through the the detection of the exiting of the vehicle from a region which is decisive for the possible use of the first traffic area—and/or the confirmed use of the second traffic area—for example through the the detection of the entry of the vehicle into a region which is decisive for the confirmed use of the second traffic area.

With the method according to some embodiments it is possible, in a toll collection system for traffic areas which are subject to tolls, to use the position-dependent automatic booking function to assign the driver or keeper of the vehicle a use authorization for a first and a second traffic area which are subject to tolls and which he has not yet traveled on. The driver can reach in a mutually exclusive fashion both the first and the second traffic areas starting from the first position or the last-detected position of the first collection of a plurality of first positions at which he is located according to the detected first position-related data, for example in a direct fashion without using another traffic area which is subject to tolls. Even before he travels on either the first or the second traffic areas which are subject to tolls he has, according to some embodiments, the use authorization for both traffic areas because these use authorizations are in fact already booked before the first traffic area which is subject to tolls is traveled on. If at the moment when he travels on the second traffic area which is subject to tolls he is checked, in that his use authorization is interrogated by a database for use authorizations, such checking will yield a positive result, even before a position determining-system is at all able to detect position-related data of the vehicle which confirm the travel on the second traffic area which is subject to tolls.

As a result, the method according to some embodiments advantageously excludes the possibility that when there is an equal ranking possibility to select one of a plurality of traffic areas which are subject to tolls, a user can travel on such a traffic area which is subject to tolls without having the use authorization for said traffic area. Therefore, he cannot even unintentionally be considered to be an unauthorized user or toll dodger at a time at which his presence is detected by a check on the traffic area which is subject to tolls.

In contrast to conventional booking methods in which the first position-related data which are detected in the first data detection phase (and the only one with respect to a certain traffic area route section) in the first association phase (and the only one with respect to a certain traffic area) are provided for association with an actual, confirmed use of a specific single traffic area which is currently being used by the vehicle and for which in the booking phase a use authorization—if appropriate in conjunction with a corresponding toll collection—is booked, the booking method according to some embodiments advantageously permits booking of a plurality of use authorizations for a plurality of alternatively usable traffic areas before the possible use of one of them.

If a problem should arise in one of the three phases of the conventional booking method, which leads to no use authorization being booked for the currently used traffic area which is subject to tolls, the user is deemed to be a parking offender, fare evader or toll dodger.

If a problem should arise in one of the three phases of the booking method according to some embodiments, which leads to no use authorization being booked for a traffic area which is subject to tolls and which is about to be used, the user can be informed of this in good time in that he can perceive the possibility of avoiding the unauthorized use of the imminent traffic area, for example by leaving a freeway with route sections which are subject to tolls at an exit slip road before the start of an unbooked route section, or driving off onto a route section which is subject to tolls and for which the presence of a booking is indicated to him.

For this purpose, in a first indication phase which follows the first booking phase and precedes the second data detection phase, at least partially, information is preferably displayed about the booked use authorizations which have not yet expired as a result of actual use of the traffic areas linked to them, and therefore can be canceled.

The booking method according to some embodiments therefore has the advantage over conventional booking methods of providing, the vehicle driver, in the case of a malfunction in the booking method with the possibility of counteracting unauthorized use in good time. The driver is disadvantageously denied this possibility in conventional booking methods.

This does not yet constitute all the advantages of one or more embodiments of the invention, which according to some embodiments also provides for the case of the confirmed non-use of the traffic area which is subject to tolls to be handled adequately:

For this purpose, the second position-related data which are detected in the second data detection phase can comprise at least a second position or at least a second collection of a plurality of second positions of the vehicle which are determined in the second data collection phase by means of a position-determining device which is carried along by the vehicle, and in the second association phase the second position or the second collection of a plurality of second positions is associated with the confirmed non-use of the first traffic area which is subject to tolls—or what is equivalent thereto: the confirmed use of the second traffic area which is subject to tolls.

In particular, the second position-related data which are detected in the second data detection phase can be formed by at least a second position or at least a second collection of a plurality of second positions of the vehicle.

In particular, in this context the first traffic area which is subject to tolls cannot be reachable starting from the second position or a last-detected position of the second collection of a plurality of second positions with the vehicle without third position-related data of the vehicle being detected in a third data detection phase following the second data detection phase, said third position-related data requiring renewed association with the possible use of the first and alternatively second traffic areas which are subject to tolls.

In particular, the first use authorization is not canceled until after the vehicle has exited a defined region which comprises the access slip road or the start of the first traffic area which is subject to tolls, or has exceeded a certain distance from the access slip road or the start of the first traffic area which is subject to tolls. The travel on the first traffic area which is subject to tolls without the corresponding use authorization for said travel can therefore be avoided, for example after a turning maneuver in the proximity of the access slip road or the start of the first traffic area which is subject to tolls, which turning maneuver ends a journey which increases the distance from the access slip road or the start of the first traffic area which is subject to tolls.

For this purpose, the second position or the last-detected position of the second collection of second positions of the vehicle is preferably arranged so far away from the access slip road or the start of the first traffic area which is subject to tolls that a third position or the last-detected position of a third collection of a plurality of third positions of the vehicle, by which third position-related data detected in the third data detection phase can be formed, is arranged so far away from the access slip road or the start of the first traffic area which is subject to tolls that the booking time between the detection of the third position-related data, which are associated with a renewed possible use of the first traffic area which is subject to tolls, and the booking of the renewed use authorization for the first traffic area which is subject to tolls is shorter than the minimum travel time which the vehicle requires, taking into account the permissible maximum speed or a predefinable maximum speed (for example 300 km/h for a passenger car on German autobahns (freeways)) to cover the distance between the first position of the vehicle and the access slip road or the start of the first traffic area which is subject to tolls. In simplified terms, the second position should be at a distance from the start of the first traffic area which is subject to tolls which is longer than the distance required to book the third position at the start of the first traffic area which is subject to tolls, by the length of the distance which is necessary to detect the third position-related data.

For route sections, which are subject to tolls, of a road toll system, the first position-related data are preferably completely or at least partially detected in a first region in which the traffic node lies and from which a plurality of route sections which are offered for use and which are subject to tolls start; correspondingly, the second position-related data are preferably completely or at least partially detected in a second region which is disjunctive with respect to the first region and which surrounds the first region.

On approach to the traffic node, the vehicle travels through the first region which is detected by the acquisition and evaluation of the first position-related data.

When departing from the traffic node, the vehicle travels through the second region which is detected by the acquisition and evaluation of the second position-related data.

In this context, the second region can be divided into sectors which are disjunctive with respect to one another, a first sector of which comprises a part, facing away from the traffic node, of the first route section which is subject to tolls, a second sector comprises a part, facing away from the traffic node, of the second route section which is subject to tolls, and at least a third sector which does not comprise a part of the first and second route sections.

If it is detected by a processor of a toll collection system that the second position-related data are in the second sector, the processor will associate this detection with the use of the second route section which is subject to tolls and the non-use of the first route section which is subject to tolls.

If a processor of a toll collection system detects that the second position-related data are in the third sector, the processor will associate this detection with the non-use both of the first and of the second route sections which are subject to tolls.

Instead of flat regions, a linear border (ellipse, polygon line) of the traffic node can also be used to detect a booking requirement on the basis of first position-related data and to detect a cancelation requirement on the basis of second position-related data if the direction of movement of the vehicle is taken into account when the border is crossed:

If the vehicle crosses the border in the direction of the traffic node, a processor of the toll collection system associates the first position-related data relating to this with a booking requirement for the first and second route sections which are subject to tolls and which are linked to the traffic node.

If the vehicle crosses the border in the direction away from the traffic node, a processor of the toll collection system associates the first position-related data relating to this with a cancelation requirement for at least the first route section which is subject to tolls and which is linked to the traffic node. If the orientation of the line which is formed from the second position-related data in the course of the crossing of the border assumes an orientation and/or if the point of intersection of this line with the border with respect to the traffic node is located in a direction, wherein the orientation and/or the direction corresponds to an orientation and/or direction which is predefined for the use of the second route section which is subject to tolls within the scope of a predefined level of accuracy, the processor of the toll collection system evaluates this as proof of the use of the second route section which is subject to tolls. Otherwise, and given a lack of a functionally identical detection of the use of the first route section, the processor determines the non-use of the first and second route sections with a cancelation requirement for both.

With the method according to some embodiments, it is possible, in a toll collection system for traffic areas which are subject to tolls, to use the position-dependent automatic cancelation function to remove from the driver or keeper of the vehicle a use authorization for a first traffic area which is subject to tolls and which he definitely did not travel on and which he will also not travel on after cancelation of the use authorization, unless the booking and cancelation method according to some embodiments provides him with a renewed use authorization for this first traffic area which is subject to tolls.

If in the course of the further travel it becomes apparent after the booking of the use authorization that the driver/keeper does not require this use authorization at all because he demonstrably has not traveled on the first traffic area which is subject to tolls owing to his presence at a location which corresponds to the second position-related data, the use authorization for this first traffic area which is subject to tolls is automatically canceled. If appropriate, tolls which been incurred in conjunction with the booking of the use authorization, for example use tolls for the first traffic area which is subject to tolls, are then at least partially, preferably completely, refunded or credited to him.

The method according to some embodiments therefore advantageously excludes the possibility of a user retaining a use authorization for a traffic area which is subject to tolls without having ever traveled thereon. He is also not burdened continuously, but rather at most temporarily, with tolls which are incurred under certain circumstances as a result of the use authorization and which he would not have to pay owing to the failure to use the traffic area which is subject to tolls.

In summary, with the invention it is possible for a user of traffic areas which are subject to tolls to be provided automatically, and in good time before the use of a traffic area which is subject to tolls, with a use authorization for all the traffic areas which are subject to tolls and which he can subsequently choose to use as an alternative, and to cancel automatically these use authorizations for non-used traffic areas which are subject to tolls.

Therefore, according to some embodiments there is provision, for the purpose of prompt booking of an authorization for the imminent possible use of one of a plurality of alternatively usable traffic areas by a vehicle, for the first position data of the vehicle to be associated with all the alternatively usable traffic areas in respect of their imminent possible use, and for use authorizations to be booked for all these traffic areas, wherein these use authorizations are canceled, with the exception of at most those for a demonstrably used traffic area, in so far as second position data of the vehicle are associated with the same traffic areas in respect of a confirmed non-use.

According to some embodiments, a traffic node which is actuated or passed by a vehicle in order to travel on at most one of at least two traffic areas, a first and a second traffic area, which are subject to tolls, is linked by data technology to such a first and second traffic area, wherein, for the vehicle approaching this traffic node or during its passage, use authorizations for both the first and the second traffic areas which are subject to tolls are booked, completely irrespective of whether a specific route (for example to a specific destination) of the vehicle is present at the booking device, on condition that at least one of the use authorizations, here the first, is canceled again upon departure of the vehicle from the traffic node without restricting the generality.

In a toll system, electronic toll tickets, for example for route sections with obligatory tolls and/or urban areas with obligatory tolls can be booked and canceled with the invention. In a parking system, electronic tickets for parking for a multistory car park which is subject to tolls and/or a car park which is subject to tolls can therefore be produced and canceled automatically with the invention.

The method according to some embodiments is extremely user-friendly because it relieves the user of the need to perform the booking and the canceling processes and gives him the freedom of a flexible route selection since any individual traffic area can be booked and canceled automatically as a function of the position, said route selection not being burdened by a lack of use authorizations or cancelation processes which have to be carried out manually.

Compared to the methods for booking use authorizations for route sections which follow one another along a predefined route to a predefined destination one or more embodiments of the invention can provide the following:

On the one hand, according to some embodiments it is no longer at all necessary to predefine a destination and therefore a route because of one or more embodiments of the invention provide all possible use authorizations always to be booked "from those in stock", at least one of which use authorizations may be necessary as a function of the position.

On the other hand, a sudden change of a route on the way to a predefined destination (the selection of which is of course not excluded by the invention) onto a route section which is subject to tolls and for which a use authorization has not been booked because, according to the prior art, it was not located on the predefined route, cannot give rise to illegal travel because, of course, according to some embodiments for any point from which a plurality of different route sections which are subject to tolls can be traveled to in an alternative way, a use authorization is present for each of these route sections which are subject to tolls. Also, in the event of the driver having input a route destination into a navigation system, according to some embodiments he is automatically provided, at any point on his route, with all the use authorizations which can be booked for the route sections which are subject to tolls and which can be alternatively traveled to at the next node, so that in the event of him inadvertently deviating from his route onto an unplanned route section which is subject to tolls he can also demonstrate that he has a use authorization for this unplanned route section which is subject to tolls, and he does not become a toll dodger.

A further advantage comes to bear in the event of the booking of the use authorizations for alternatively usable traffic areas being connected to the collection of a toll in the first booking phase for any individual traffic area of these alternative usable traffic areas, and all of these tolls are refunded again in the second booking phase up to a maximum of one. In this case, the risk of misuse and deception is significantly lower than in the case in which a toll is not collected until in the second booking phase.

A user who has paid tolls for a plurality of traffic areas in the first booking phase will ensure that his vehicle device or his mobile phone, which he uses to carry out the method according to some embodiments, is active or remains active also over the second association phase in order to allow the nonuse of all booked traffic areas, up to a maximum of one thereof, to be detected in this second association phase, and to enter the second booking phase in which in all cases refunding of tolls occurs for at least one traffic area, and if appropriate even for all the traffic areas, which he has demonstrably not used.

The user then has no such interest in entering the second association phase if it firstly follows from the processing of the second position data that he must, under certain circumstances, pay a toll for the use of the second traffic area. In this case, he can be tempted to be content with the cost-free receipt of the use authorizations (which, of course, authorize him to use the traffic area) in the first booking phase and to manipulate the vehicle device or the mobile radio device in the course of the second association phase or to switch it off before the second association phase is entered, in order to avoid being charged a use toll which would be collected in the second booking phase for his presence on the second traffic area, in particular if this second traffic area is the last route section which is subject to tolls on his route.

Another possibility provides that even though a use authorization is booked for all the alternatively usable traffic areas in the first booking phase, the collection of a toll in the first booking phase is, however, restricted to a toll amount which is lower than the sum of the tolls for all the alternatively usable traffic areas.

In a first example, this toll amount can correspond to the mean value of the tolls of each of the alternatively usable traffic areas. Depending on the use of a traffic area or non-use of all the traffic areas, up to a maximum of one, which is detected in the second association phase, the user has the toll amount completely refunded in the second booking phase (no use of a traffic area which is subject to tolls), or partially refunded (use of a traffic area which is subject to tolls and for which the toll is lower than the mean value), or the user must pay back tolls (use of a traffic area which is subject to tolls and for which the toll is higher than the mean value).

In a first example, this toll amount can correspond to the maximum value of tolls of all the tolls for alternatively usable traffic areas. Depending on the use of a traffic area or non-use of all of the traffic areas up to a maximum of one, detected in the second association phase, the user receives the toll amount back completely in the second booking phase (no use of a traffic area which is subject to tolls) or back partially (use of a traffic area which is subject to tolls whose toll is smaller than the maximum value). At any rate, the user does not have to pay back any tolls because the use of the most expensive of the booked traffic areas which are subject to tolls has already been paid for with the toll collection in the first booking phase.

Embodiments of the method according to some embodiments provide that with the booking of the first use authorization a first toll is collected for the first traffic area which is subject to tolls, and with the the cancelation of the first use authorization the at least partial refunding or nullification of the collected first toll occurs. Embodiments of one or more embodiments of the invention provide in a development that the booking of the first use authorization occurs as a result of the collection of a first toll for the first traffic area which is subject to tolls and the cancelation of the first use authorization occurs as a result of the at least partial refunding or nullification of the collected first toll. In both cases, the collection of a toll in conjunction with the booking of the use authorization confirms the use authorization, which advantageously means increased security for the collection point which is responsible for the collection of tolls for the use of traffic areas which are subject to tolls, in respect of a payment of the toll in the case of actual use of the traffic area which is subject to tolls.

In particular, in the second association phase the second position-related data can be associated with a confirmed use of the second traffic area which is subject to tolls by the vehicle, wherein because of the alternative possibility of use of the first and second traffic areas which are subject to tolls with the confirmed use of the second traffic area which is subject to tolls, the confirmed non-use of the first traffic area which is subject to tolls occurs.

The booking can, for example, be initiated by transmission of at least one first traffic area data element representing the first traffic area which is subject to tolls, and at least one second traffic area data element representing the second traffic area which is subject to tolls to at least a first central data processing device with the request to carry out the booking of a first use authorization for the first traffic area which is subject to tolls and of a second use authorization for the second traffic area which is subject to tolls.

The cancelation of the use authorization for the first traffic area which is subject to tolls can be initiated, for example, by the transmission of at least one second traffic area data element representing the second traffic area which is subject to tolls to the first central data processing device or a second central data processing device with the request to register the confirmed use of the second traffic area which is subject to tolls. The registration of a use confirmation for the used second traffic area which is subject to tolls corresponds preferably to the registration of a deletion prohibition for the use authorization of this used second traffic area which is subject to tolls. The cancelation method according to some embodiments can provide in this respect a request for the registration of the confirmed use of the second traffic area which is subject to tolls to be interpreted as being a request for cancelation of the use authorization of the first traffic area which is subject to tolls, a first traffic area data element of which has been present, linked to the second traffic area data element, in the central data processing device since the booking, and to cancel the first use authorization for the first traffic area which is subject to tolls as well as, if appropriate, further use authorizations for further traffic areas which are subject to tolls and which are also booked together with the second use authorization for the second traffic area which is subject to tolls.

Numerous variants are conceivable for embodiments of the method according to some embodiments:

Initially, the invention will be considered in a toll system for freeways and/or freeway-like federal highways which are characterized by two directional roadways which are separate from one another and which have route sections which are subject to tolls and which follow one another in two opposite directions of travel (segment toll):

In this context, a first scenario—the continued travel scenario—is conceivable, in which the second use authorization is booked on an initial route section for a second route section lying ahead in the direction of travel (following the initial route section in the direction of travel) as a second traffic area which is subject to tolls, and the first use authorization is booked for a first route section which is anti-parallel in the opposite direction to the direction of travel with respect to the initial route section (opposing roadway of the initial route section) as a first traffic area which is subject to tolls. At the end of the initial route section, the driver of the vehicle which is obliged to pay a toll is able to select whether he travels on in the direction of travel of the second route section, which adjoins the initial route section in the direction of travel, or travels onto the first route section anti-parallel with respect to the initial route section, in the opposite direction to the direction of travel. The latter means a turning around maneuver which comprises leaving the roadway and driving onto the opposing roadway. The driver can decide only on one of the two routes: if he travels on in the direction of travel, he travels onto the second route section and not the first route section; if he turns around, he therefore travels onto the first route section and not the second route section. The first and the second route sections at the time when the driver is located on the initial route section are therefore two freely selectable alternatives which exclude one another. In the context of the claim formulation, the driver selects the second route section in the direction of travel to drive along, instead of turning onto the first route section in the opposite direction. As a result, the second position-related data of the vehicle which are detected in the second data detection phase are associated with a non-use of the first route section because the second position-related data of the vehicle which are detected in the second data detection phase are associated with a confirmed use of the first route section. As a result, the use authorization of the first route section is canceled according to some embodiments.

In a second scenario—the turning around scenario—the first use authorization is booked on an initial route section for a second route section lying ahead in the direction of travel as a first traffic area which is subject to tolls, and the second use authorization is booked for a second route section (opposing roadway of the initial route section) which is anti-parallel with respect to the initial route section and in the opposite direction to the direction of travel, as a first traffic area which is subject to tolls. In the context of the claim formulation, the driver selects the second route section in the opposite direction to the direction of travel on the opposing roadway adjacent to the initial route section to drive along in that he turns around, instead of traveling along the first route section in the original direction of travel. As a result, the second position-related data of the vehicle which are detected in the second data detection phase are associated with a non-use of the first route section because the second position-related data of the vehicle which are detected in the second data detection phase are associated with a confirmed use of the first route section. As a result, the use authorization of the first route section is canceled according to some embodiments.

Both scenarios, turning around or continued travel, are therefore encompassed by the invention. Which of the traffic areas is the first traffic area whose use authorization is canceled is determined by selection of the second traffic area which is used. In each of the two scenarios there is at least one first traffic area whose use authorization is canceled according to some embodiments.

A third possibility for route selection—which will also be noted for the sake of completeness—comprises, of course, a third scenario—the exit scenario—in which the road with obligatory tolls is exited. In this case, none of the booked first and second route sections are traveled on. As soon as the vehicle has traveled away from the exit at the end of the initial route section to such an extent that second position-related data which are detected in the second data detection phase can be associated with a non-use of the first and of the second route sections, both the first and the second use authorizations are canceled.

In a fourth scenario—the access slip road scenario—the driver is not located with his vehicle on a road with obligatory tolls. However, he approaches, on a road without an obligatory toll a connection point of a freeway for which a toll is obligatory and from which he can travel along the freeway either on its first roadway in a first direction of travel, by entering a first route section of the freeway or on its second roadway, running in the opposite direction to the first roadway, in a second direction of travel which is opposed to the first direction of travel in that he drives onto a second road section. According to some embodiments, the first position-related data which are detected in the first data detection phase are associated with a possible use of the first and of the second route sections by the vehicle, and a use authorization is booked for the first route section and the second route section. If the vehicle drives onto the second route section, which is detected by association of the second position-related data, detected in the second data detection phase, with a confirmed use of the second route section, only the first route section is canceled according to some embodiments.

If, in a fifth scenario—the travel-through or crossing scenario—the vehicle does not drive onto the freeway at the connection point, which is detected with association of the second position-related data, detected in the second data detection phase, with a confirmed non-use of the first and of the second route sections, the use authorizations for the first route section and the second route section are canceled.

In a sixth scenario—the branching scenario—the first use authorization is booked on an initial route section for a first route section lying ahead in the direction of travel (following the initial route section in the direction of travel) and the second use authorization is booked for a second route section also lying ahead in the direction of travel (also following the initial route section in the direction of travel), as a second traffic area which is subject to tolls. Such a scenario arises wherever a road with an obligatory toll branches or forks, for example at a freeway junction or at a freeway intersection. If the car driver decides according to some embodiments on further travel on the second route section, which is detected by association of the second position-related data, detected in the second data detection phase, with a confirmed use of the second route section, only the first route section is canceled according to some embodiments.

Mixed variants occur in accordance with the design of connection points and branches: a freeway intersection generally provides, for example, a continued travel possibility, two turning off possibilities and a turning around possibility, which gives rise to the booking of four alternative route sections, of which the three which were not traveled on after the selection made by the driver by traveling on a specific route section of the four route sections are canceled again.

The invention will now be considered in a toll system for areas in which tolls become due when the areas are traveled on. Such an area which is subject to tolls and is referred to as a toll area constitutes a traffic area according to some embodiments because it can only be traveled on via a traffic area and corresponding traffic areas have to be available for it to be used.

Toll areas can be areas for which a toll becomes due whenever the area is traveled on again (for example, cordon toll) or which are based on a sticker system with time-limited flat rate use authorization, for example a daily sticker, weekly sticker, monthly sticker and/or yearly sticker. A city toll can have various ring-shaped areas with different ring tariffs around a central city center area with a central charge rate for one-off use and/or repeated use.

If the driver is demonstrably located with his vehicle in, for example, an initial toll area in the vicinity of a toll area junction at a location from which he can reach both a first toll area and a second toll area from the initial toll area, according to some embodiments a use authorization for the first toll area is booked in the form of a first electronic sticker and a use authorization for the second toll area is booked in the form of an electronic sticker. For example, both stickers are daily stickers which, from the moment on at which they were booked, initially have continuous validity and their validity is limited to a further 24 hours from the moment at which travel in the corresponding area was detected. If the driver decides on traveling in the second toll area, this decision is detected according to some embodiments by the association of second position-related data of the second data detection phase with the second toll area and is linked to the confirmed non-use of the first toll area. The first electronic sticker for the first toll area is consequently canceled according to some embodiments.

Mixed variants of different toll objects are also conceivable. One example will be explained here for the combination of the "locality bypass" and "city toll" toll objects: on approaching a locality in which a city toll of, for example, 3 euros is collected for traveling through the locality and which has a locality bypass for whose use a road toll of 2 euros is due, both possibilities of use (travel through the locality or locality bypass) are possible for the driver. According to some embodiments, first position-related data of the vehicle which are detected a sufficient distance before the branch to travel through the locality and to the bypass of the locality in the first data detection phase are associated with the possible use of the two toll objects, and in each case a use authorization is booked for each of the two toll objects. After the branch has been passed through, the car driver is tied, through his route selection, for example to the locality bypass. A position of the vehicle which corresponds to the locality bypass is detected in the second data detection phase on the basis of the detected second position-related data of the vehicle and associated with a confirmed use of the locality bypass, which means a confirmed non-use of the travel through the locality. The use authorization of the travel through the locality is correspondingly canceled according to some embodiments and a city toll which has possibly been collected is refunded.

Finally, the invention is considered in a parking system with a plurality of multi-storey car parks and/or parking areas which have a plurality of car parks which are subject to tolls.

If a car driver approaches a city center area with his passenger car (Pkw), there are, for example, three multistory car parks and two parking areas available to him for the selection of a parking space. A parking authorization is to be already available here when he travels to one of the multi-story car parks or one of the parking areas, but is to be available at the latest at the moment at which the driver has parked his passenger car in a parking space.

According to some embodiments, on approach to the city center area five parking authorizations are booked for the five parking facilities. Only two of the five parking facilities are possible for the driver, for example, owing to his desired destination (unknown to the toll collection system). In the case of the first he has to find that all the parking spaces are occupied. At the second he can obtain a free parking space. As a result of the driver deciding on one of these parking facilities (the second mentioned above), which can be tracked on the basis of the detected second position-related data, the parking authorizations for the other four parking facilities (the first, third, fourth and fifth) are canceled again according to some embodiments.

According to some embodiments, at the moment when the parking facility is traveled to a use authorization for this parking facility is always available. A checking process, which is tied to the vehicle license plate number, can verify this on the basis of a corresponding interrogation of a use authorization database in which the use authorizations are stored, linked to the vehicle data. In the case of a positive result, the checking process can enable access to a parking space for the parking facility, for example by raising a barrier.

When the parking facility is exited, which is detected according to some embodiments by the vehicle passing through a boundary, surrounding the parking space, of geographic coordinates which are assigned to the parking space by a line or curve, in the course of a new first association phase, the driver is provided once more with the possibility of driving to a plurality of parking facilities which are subject to tolls. This fact is allowed for in a renewed first booking phase with the booking of use authorizations for all five parking facilities.

If the car driver leaves the city center area—detected in a renewed second association phase—without using one of the five parking facilities again, all five use authorizations are canceled in a renewed second booking phase.

These embodiments for the method according to some embodiments, which, in addition to the booking of a first use authorization for the first traffic area, provide the booking of a second use authorization for the second traffic area which is subject to tolls, have the advantage that, irrespective of which of the two or more driving alternatives the driver decides on, he always has a use authorization for the traffic area which he is traveling on and the use authorization for the traffic area which he is not traveling on is canceled; all the use authorizations which are possibly shortly necessary are booked in advance, and all which are ultimately not required are subsequently canceled. The user is therefore always flexible in his route selection without having to worry about the correct booking in advance and a cancelation subsequently. Such a method is extremely user-friendly and will increase the acceptance amongst users of a toll collection method which comprises such a booking and cancelation method according to some embodiments.

Thus, in the first association phase, the correspondence with the conditions for the detection object of the first traffic area which is subject to tolls can extend to further traffic areas which are subject to tolls, in particular a second traffic area which is subject to tolls and the use of which is possible as an alternative to the first traffic area which is subject to tolls.

In the second association phase it is then possible, for example by means of the processor, to check by means of data comparison whether the second position-related data correspond to a position (a1, b1) of the vehicle which lies (a) within a detection object (polygon, circle), (b) on a specific side within a specific distance from the detection object (line) or else whether, (c) the first position-related data correspond to a plurality of positions (a1, b1) . . . (ai, bi) of the vehicle, the interpolation or smoothed movement line of which intersects a detection object from the outside to the inside (circle, polygon) or (d) in a specific direction (line). If such checking is positive, the corresponding second traffic area which is subject to tolls counts, by means of its traffic area data record, as being associated by means of the position-related data in terms of a confirmed use, and therefore the first traffic area which is subject to tolls and which can be used as an alternative to the second traffic area which is subject to tolls counts, by means of this traffic area data record, as being associated by the position-related data in terms of a confirmed non-use.

Other embodiments provide that in the first association phase, in addition to the possible imminent use of the first traffic area which is subject to tolls, the first position-related data is associated with at least one possible imminent use of a third traffic area which is subject to tolls by the vehicle and which precedes the vehicle on the way to a use of the first traffic area which is subject to tolls and/or in addition to the possible imminent use of the second traffic area which is subject to tolls, the first position-related data is associated with at least one possible imminent use of a fourth traffic area which is subject to tolls by the vehicle (50), which precedes the vehicle on the way to a use of the second traffic area which is subject to tolls, and in the first booking phase, in addition to the first use authorization for the first traffic area which is subject to tolls and whose possible use is consecutive with respect to the possible use of the third traffic area which is subject to tolls, a third use authorization, relating to the vehicle, for the third traffic area which is subject to tolls, and/or in addition to the second use authorization for the second traffic area which is subject to tolls and whose possible use is consecutive with respect to the possible use of the fourth traffic area which is subject to tolls, a fourth use authorization, relating to the vehicle, is booked for the fourth traffic area which is subject to tolls.

Such embodiments of the method according to some embodiments are particularly suitable in a system for collecting tolls for the use of successive freeway sections (segment toll or section toll): if the third freeway section which is subject to tolls and which follows an initial route section which is subject to tolls in the course of the roadway is too short to detect its use in the course of a second data detection phase, the second data detection phase must extend to areas which lie beyond the third route section which is subject to tolls, for example on a first route section which in the course of the roadway follows the third route section which is subject to tolls. For example, a position-determining device which is carried along by the vehicle which is subject to tolls supplies position-related data of the vehicle once per second. For a vehicle which is traveling at a speed of 130 km/h, this means position information of the vehicle at intervals of 36 m. If, for example, at least seven successive position information items are required for the reliable detection of the presence of the vehicle on a route section which is subject to tolls, the vehicle is located 217 m behind in the time required for this. If the route section which is subject to tolls is shorter than 217 m in this case, presence of the vehicle on this route section cannot be confirmed with certainty. Nor is it possible to derive therefrom a position which proceeds the travel on the next (first) section which is subject to tolls, without even considering whether there is sufficient time left for a booking, before the first route section which is subject to tolls is traveled on. Consequently, the booking of a third use authorization for the third route section which is subject to tolls and which precedes the first route section which is subject to tolls in the direction of travel must already occur before the third route section which is subject to tolls is traveled on, preferably together with the booking of the first use authorization for the first route section which is subject to tolls. This occurs according to some embodiments as a result of a first data detection phase in which the vehicle is either located, as in this case, on the initial route section or on a road for which tolls are not obligatory, on an approach to an entry to the third route section which is subject to tolls. The same applies analogously on a route via a fourth and second route section, which is an alternative to the route of the third and first route sections: the booking of a fourth use authorization for the fourth route section which is subject to tolls and which precedes the second route section which is subject to tolls in the direction of travel can already occur preferably together with the booking of the second use authorization for the second route section which is subject to tolls before the fourth route section which is subject to tolls is traveled on. This occurs according to some embodiments as a result of a first data detection phase in which the vehicle is either located, as in this case, on the initial route section or on a road for which tolls are not obligatory, on an approach to an entry to the fourth route section which is subject to tolls and whose use is an alternative to the third route section.

Sufficient second position-related data which allow it to be concluded whether the driver a) has not traveled on any of the booked route sections, b) has traveled only on the fourth route section which is subject to tolls and, possibly c) in addition to this has also traveled on the second route section which is subject to tolls, are available in the second data detection phase only after a sufficient distance from the fourth route section which is subject to tolls has been reached.

In the case c), the travel on the second route section which is subject to tolls is detected, and given a lack of alternative detections, b) and a) are interpreted as use of the fourth route section which is subject to tolls. Consequently neither the first nor the fourth route section which is subject to tolls is canceled. The invention also permits the alternative cases a) and b): in the case b), the exiting from the freeway at the connection point between the fourth and second route sections which are subject to tolls is detected. As a result of this in accordance with one or more embodiments of the invention, the use authorization is canceled not only for the first route section which is subject to tolls and whose use was consecutive to the third and in any case already an alternative to the second, but also the use authorization for the second route section itself which is subject to tolls.

In the case a), the exiting from the freeway at the connection point is detected between the initial route section and the fourth route section which is subject to tolls. Consequently, in accordance with one or more embodiments of the invention, the use authorization for the fourth and the second route sections which are subject to tolls is canceled in addition to the cancelations of the alternatives of the third and first route sections which have not been used according to some embodiments and have already taken place in any case.

With this development of one or more embodiments of the invention, the occurrence of a gap in a chain of consecutive, required use authorizations, which could occur as a result of a duration of the data detection phase which is not sufficient or is sufficient only under certain circumstances (for example traffic jams) is advantageously avoided.

It is to be noted that third and fourth route sections can proceed in opposing directions from a common first access road, and the first and the second route sections are each oriented anti-parallel to the third and fourth route sections, wherein the first and second route sections comprise, as a common exit, the first access road to the third and fourth route sections. If in this case the first and the second route sections do not proceed directly from a common access road, they do this, however, indirectly via the detour of the third and fourth route sections for which, in this case, use authorizations are also booked, which is entirely according to some embodiments.

The advantages of these embodiments of one or more embodiments of the invention are even more clearly apparent in the case of the common booking of use authorizations of a plurality of route sections, following one another in the direction of travel, for route sections which run underground and/or in tunnels and on which no position determination is possible due to a lack of reception of GNSS satellite signals. An example of a freeway with such route sections is the city tunnel in Brussels which has a plurality of route sections which follow one another and from which city tunnel it is possible to exit the freeway at any interfaces between two route sections which follow one another directly or it is possible to enter said route sections at such an interface. Before the entry into the tunnel, according to some embodiments a use authorization is booked here for all the route sections in the tunnel (for example ten route sections) and the first route section outside the tunnel, which follow one another at least in a direction of travel. If the vehicle driver exits the freeway, for example after the fifth route section, he leaves the tunnel and comes back to the surface at a predictable point where second position-related data of the vehicle can be detected by means of a GNSS receiver which is carried along by the vehicle, which data are typical of exiting of the freeway between the fifth and sixth route sections and which are associated as such with a non-use of the sixth route section and of the route sections which follow the sixth route section and are also booked.

The use authorizations for the sixth to tenth route sections of the tunnel as well as for the first route section which follows in the original direction of travel are consequently canceled, and tolls collected for these route sections are, if appropriate, refunded or credited.

An analogous procedure is to be adopted if for a vehicle driver in the city center traffic arrives in the region of the tunnel entry at the interface between the fifth and the sixth route sections. The correspondingly detected first position-related data are then associated with a possible use of the first to fifth route sections in the tunnel and of a route section outside the tunnel which precedes the first route section in the opposite direction to the first possible direction of travel, and with a possible use of the sixth to tenth route sections in the tunnel and of a route section outside the tunnel which follows the tenth route section in the second possible direction of travel. Use authorizations are booked for these twelve route sections. Those use authorizations of those route sections whose non-use can be associated with correspondingly detected second position-related data are subsequently canceled.

The invention therefore provides, for a toll collection system without road-side transmitting or receiving devices, an advantageous method for booking use authorizations even for route sections on which the presence of vehicles which are subject to tolls cannot be immediately detected owing to a lack of GNSS satellite signal reception.

For a booking and cancelation method according to the first aspect of one or more embodiments of the invention, which is, according to some embodiments, characterized in that in the first association phase, in addition to the first traffic area which is subject to tolls, the first position-related data are associated with at least one possible use of a second traffic area which is subject to tolls by the vehicle, as an alternative to the first traffic area which is subject to tolls, and in the booking phase, in addition to the first use authorization, a second use authorization, relating to the vehicle, is booked for the second traffic area which is subject to tolls, embodiments of one or more embodiments of the invention also provide a method for the collection of tolls in which in the second association phase, the second position-related data are associated with a confirmed use of the second traffic area which is subject to tolls by the vehicle, wherein the confirmed non-use of the first traffic area which is subject to tolls results owing to the alternative possibility of use of the first and second traffic areas which are subject to tolls with the confirmed use of the second traffic area which is subject to tolls, and the collection of a toll for the use of the second traffic area which is subject to tolls occurs after the first association phase.

For example, the collection of a toll for the use of the second traffic area which is subject to tolls can occur in the booking phase together with the booking of the second use authorization for the second traffic area which is subject to tolls.

In addition, the collection of a toll for the possible use of the first traffic area which is subject to tolls can occur in the booking phase together with the booking of the first use authorization for the first traffic area which is subject to tolls. This toll for the first traffic area which is subject to tolls can be partially refunded or nullified with the cancelation of the use authorization for the first traffic area which is subject to tolls, in the cancelation phase or in a refunding phase which follows the second association phase.

However, collection of tolls in the first booking phase is not compulsory. Finally, the collection of the toll for the use of the second traffic area which is subject to tolls can instead occur in a collection phase which follows the second association phase and which is subsequent to the second booking phase or is included in the second booking phase. In this case, the collection of a toll for the use of the first traffic area which is subject to tolls does not take place in any of the phases of the method according to some embodiments, the non-use of which traffic area was, of course, detected in the second association phase.

With the toll collection method according to some embodiments it is advantageously possible to collect a toll for the traffic area which is also actually used. If appropriate, unnecessary collected tolls for non-used traffic areas can be refunded without additional expenditure for the user.

For a booking and cancelation method according to the first aspect of one or more embodiments of the invention, which is additionally characterized in that in the first association phase, in addition to the possible imminent use of the first traffic area which is subject to tolls, the first position-related data are associated with at least one possible imminent use of a third traffic area which is subject to tolls by the vehicle, which traffic area precedes the vehicle on the way to use of the first traffic area which is subject to tolls, and in the booking phase in addition to the first use authorization for the first traffic area which is subject to tolls and whose possible use is consecutive to the possible use of the third traffic area which is subject to tolls, a third use authorization relating to the vehicle is booked for the third traffic area which is subject to tolls; the invention also provides a method for collecting tolls, in in the first association phase the first position-related data are associated, in addition to the possible imminent uses of the third and of the first traffic area which is subject to tolls, consecutive to the third, the first position-related data are associated with the possible imminent use of the second traffic area which is subject to tolls by the vehicle, which use follows the possible use of the third traffic area which is subject to tolls and is an alternative to the possible use of the first traffic area which is subject to tolls, wherein in the booking phase, in addition to the first and second use authorizations, a third use authorization relating to the vehicle is booked for the third traffic area which is subject to tolls, in the second association phase the second position-related data are associated with a confirmed use of the second traffic area which is subject to tolls by the vehicle, and the confirmed use of the second traffic area which is subject to tolls is interpreted as confirmed use also of the third traffic area which is subject to tolls by the vehicle owing to the possibility of use, consecutive with respect to the third traffic area which is subject to tolls, of the second traffic area which is subject to tolls, and wherein the method also provides the collection of a toll for the use of the second traffic area which is subject to tolls and the collection of a further toll for the use of the third traffic area which is subject to tolls, after the first association phase.

For example, collection of a toll for the use of the first, second and third traffic areas which are subject to tolls can already occur in the first booking phase together with the booking of the first, second and third use authorizations for the second and third traffic areas which are subject to tolls.

The toll for the first traffic area which is subject to tolls can be partially refunded or nullified with the cancelation of the use authorization for the first traffic area which is subject to tolls, in the cancelation phase or in a refunding phase which follows the second association phase, in each case within the scope of the second booking phase.

In addition, instead the collection of the toll for the use of the second and third traffic areas which are subject to tolls can occur in a collection phase, following the second association phase, of the second booking phase. In this case, the collection of a toll for the use of the first traffic area which is subject to tolls and whose non-use has, of course, been detected by the second association phase does not take place in any of the phases of the method according to some embodiments.

With the toll collection method according to some embodiments, it is advantageously possible to collect a toll for two actually used traffic areas. If appropriate, unnecessarily collected tolls for non-used traffic areas can be refunded without additional expenditure for the user.

Embodiments of both toll collection methods according to some embodiments provide that the second position-related data which are detected in the second data collection phase comprise data which identify those second and/or third traffic areas which are subject to tolls and are received and/or transmitted by at least one device for short-range communication or close-range communication. For example, a radio beacon which is arranged at the side of the road can be designed to transmit information on the currently traveled-on route section on which it is arranged to a vehicle device which is carried along by a vehicle traveling past. This information is, according to some embodiments, interpreted by the vehicle device as a use authorization for the current route section and as confirmation of the non-use of the alternative route section, the use authorization of which is consequently canceled. As a result, in areas in which no reception of satellite data of a global navigation satellite system (GNSS) is possible by a GNSS position determining-system which is included with the vehicle device, for example in tunnels or between high-rise buildings, information for the confirmation of the use of the booked traffic area can advantageously still be obtained.

In embodiments of one or more embodiments of the invention, inventive booking and cancelation methods and/or toll collection methods can be supplemented with use authorizations which respectively comprise vehicle data derived from the vehicle license plate number in order to form a method for operating a toll collection system, with a checking method which provides a) a recording of an image of a vehicle of a checking area which is assigned to a traffic area which is subject to tolls, b) an evaluation of the vehicle image in order to determine the vehicle license plate number and derive vehicle data, corresponding to this vehicle license plate number, from the vehicle license plate number, and c) a comparison of the vehicle data acquired from the image recording with vehicle data which are included in the present use authorizations for the traffic area which is subject to tolls and from which said image recording originates. This vehicle data comparison can have a negative result which indicates that no equivalent vehicle data to the vehicle data acquired from the image recording are contained in the collection of the present use authorizations for the traffic area which is subject to tolls and from which said image recording originates. In this case, the toll collection system detects that the vehicle is illegally using the traffic area which is subject to tolls and from which said image recording originates.

This vehicle data comparison can, however, also have a positive result which indicates that equivalent vehicle data to the vehicle data acquired from the image recording are contained in the collection of the present use authorizations for the traffic area which is subject to tolls and from which said image recording originates. In this case, the toll collection system detects that the vehicle is using the traffic area which is subject to tolls, and from which said image recording originates, according to regulations.

With such a checking method it is advantageously possible to check whether the booking of the use authorization and/or the collection of the toll of a specific vehicle is properly present for the use of a specific traffic area which is subject to tolls.

In this case, the recording of the vehicle image preferably occurs in the checking area of a traffic area which is subject to tolls and whose use authorization has not been canceled.

The checking area is preferably located beyond the traffic area which is subject to tolls, in an access road area leading to the traffic area which is subject to tolls. It is therefore advantageously possible and appropriate to generate, in the case of a positive result of the vehicle data comparison, a confirmation signal and to transmit it to the vehicle, for example to an electronic device which is carried along with the vehicle in order to carry out the booking and cancelation method according to some embodiments, and/or to generate a fault signal in the case of a negative result of the vehicle data comparison and therefore to transmit it promptly to the vehicle in such a way that the driver of the vehicle can, being aware of the fault signal, take measures with which he can avoid his vehicle illegally traveling onto the traffic area which is subject to tolls, for example by using a turning loop.

Nevertheless, the checking area can be arranged directly at the start of the traffic area which is subject to tolls or in the further course of the traffic area which is subject to tolls, in particular for the cases in which the traffic areas which are subject to tolls are route sections of a road toll system.

Booking and cancelation methods according to some embodiments and/or toll collection methods according to some embodiments can be carried out either exclusively by means of mobile, decentralized data processing devices which are carried along by the vehicles or else by means of fixed, central data processing devices which are arranged at a distance from traffic areas which are subject to tolls and which have position-related data transmitted to them from the vehicles. In addition, booking and cancelation methods according to some embodiments and/or toll collection methods according to some embodiments can be carried out partially by means of mobile, decentralized data processing devices which are carried along by the vehicles, and are partially carried out by means of fixed, central data processing devices which are arranged at a distance from traffic areas which are subject to tolls and have traffic areas which are subject to tolls and which are associated with the position-related data of the vehicles transmitted to them by the mobile, decentralized data processing devices of the vehicles.

Finally, booking and cancelation methods according to some embodiments and/or toll collection methods according to some embodiments can also be carried out partially by first fixed central data processing devices which are arranged at a distance from traffic areas which are subject to tolls and receive position-related data from the vehicles and partially by second fixed control data processing devices which are arranged at a distance from traffic areas which are subject to tolls have traffic areas which are subject to tolls and are associated with the position-related data of the vehicle transmitted to them by the first fixed central data processing devices.

According to a second aspect of one or more embodiments of the invention, a vehicle device has at least one position-determining device, at least one processor for receiving and for processing position data of the position-determining device and at least a first data memory, and is characterized in that the processor is designed to receive and to process the first position data determined by the position-determining device in a first position-determining phase, in that said processor associates the received first position data with the possible use of at least a first traffic area which is subject to tolls and the possible use of a second traffic area which is subject to tolls as an alternative to the use of the first traffic area which is subject to tolls, and registers both a first use authorization for the first traffic area which is subject to tolls by storing a first use authorization data record in the first data memory and a second use authorization for the second traffic area which is subject to tolls by storing a second use authorization data record in the first data memory or a second data memory, and to receive and to process the second position data which are determined by the position-determining device in a second position-determining phase following the first position-determining phase, in that said processor associates the received second position data with a non-use of the first traffic area which is subject to tolls and cancels the first use authorization by deleting the first use authorization data record from the first data memory, by linking the first use authorization data record with an invalidity marker or by storing a first cancelation data record for the first traffic area which is subject to tolls. Other measures which are also suitable for making the first use authorization ineffective by means of corresponding data processing processes are included in the scope of protection of the vehicle device according to some embodiments.

In this case, the processor can be designed to associate the non-use of the first traffic area on the basis of the association of the second position data with a confirmed use of the second traffic area. Such an interpretation is justified by the character of the exclusively alternative use of the first and second traffic areas which are subject to tolls.

In addition, the processor can be designed to generate an implicit invalidity marker for the first use authorization data record with a use confirmation marker for the second use authorization data record. Such a technical data solution corresponds to the character of the exclusively alternative usability of the first and second traffic areas which are subject to tolls. In this sense, the processor can be designed to debit a toll for the use of the second traffic area which is subject to tolls from a toll credit which is carried along on the vehicle device.

For this purpose, data records of groups of alternatively usable traffic areas which are subject to tolls on the basis of their respective identifiers with a group identifier which is common to them are preferably stored in a database of the vehicle device. An association of first position data with a first traffic area which is subject to tolls is interpreted by the processor after a database interrogation as association with the whole group of traffic areas which encompasses the first traffic area which is subject to tolls, including the second. Alternatively, the processor interprets an association of first position data with a group identifier after a database interrogation as association with all the traffic areas which are included in the group of traffic areas with the group identifier which is determined as a function of position.

With such a vehicle device according to some embodiments, the traffic areas which are subject to tolls and for which a possible alternative use by the vehicle which carries along the vehicle device with it is imminent, can be reliably and promptly detected before the use, in order to preventively produce a use authorization for each of these traffic areas which are subject to tolls. Furthermore, with such a vehicle device according to some embodiments, the non-use of those traffic areas which the vehicle has not traveled on and from which it has, for example, moved away over a predetermined distance in each case in order to curatively nullify the corresponding use authorizations which were not required can be reliably detected.

Embodiments of the vehicle device according to some embodiments provide that the position-determining device has a GNSS receiver whose satellite reception data are converted into the first and second position data by the position-determining device.

Embodiments of the vehicle device according to some embodiments provide that the processor is configured to associate the received first position data with the possible use of a first traffic area which is subject to tolls and of a second traffic area which is subject to tolls and to register a first use authorization for the first traffic area which is subject to tolls by storing a first use authorization data record, and a second use authorization for the second traffic area which is subject to tolls by storing a second use authorization data record in the first data memory. The uses of the first and of the second traffic areas exclude one another according to some embodiments because an alternative use of the first and of the second traffic areas is provided. Uses of the first traffic area and of a third traffic area can determine one another if consecutive use of the first traffic area after the third traffic area is provided. Uses of the second traffic area and of a fourth traffic area can determine one another if consecutive use of the second traffic area after the fourth traffic area is provided.

Embodiments of the vehicle device according to some embodiments provide that the processor is configured to associate the received second position data with a non-use of at least one first traffic area of the plurality of traffic areas which are subject to tolls in the case of a plurality of present use authorizations for a plurality of traffic areas which are subject to tolls, and to cancel, of the use authorizations which are present, those of the first traffic area which is subject to tolls by deleting the use authorization data record of this first traffic area which is subject to tolls from the first data memory or by linking the first use authorization data record with an invalidity marker.

Embodiments of the vehicle device according to some embodiments provide that the processor is configured to associate, in the case of a plurality of use authorizations which are present for a plurality of traffic areas which are subject to tolls, the received second position data with the actual use of at least a second of the plurality of traffic areas which are subject to tolls, consequently to associate the use of the second traffic area which is subject to tolls with a non-use of at least a first of the other traffic areas which are subject to tolls and to cancel said use, from the use authorizations which are present, by deleting at least a first use authorization data record of the first traffic area which is subject to tolls from the first data memory or by linking the first use authorization data record with an invalidity marker.

Embodiments of the vehicle device according to some embodiments provide that the use authorization data record of a traffic area which is subject to tolls has a traffic area data element which represents the traffic area which is subject to tolls, a booking time data element which represents the time (date, time of day) at which the use authorization data record was produced and/or a data record data element which identifies unambiguously the use authorization data record, for example a primary key in the form a serial number.

Embodiments of the vehicle device according to some embodiments have a display device which is configured to display information about the booked use authorizations in that, for example, said display device lists in text form, for a freeway with obligatory tolls, route sections which have not yet been used and which are subject to tolls and for which a use authorization is present, together with the currently used road section which is subject to tolls. The list can be supplemented with symbols which characterize in more detail the road sections which are subject to tolls, for example with respect to their position in relation to the vehicle.

Embodiments of the vehicle device according to some embodiments are embodied as a navigation device which has a display device for graphically displaying the current position of the vehicle and for graphically displaying traffic areas which are subject to tolls, as well as means for characterizing the displayed traffic areas which are subject to tolls in relation to use authorizations which are present.

For this purpose, a booking message which contains booking information for route sections which are subject to tolls and which lie ahead as alternatives and, if appropriate, also route sections which are subject to tolls and which can be driven on consecutively can be received or generated by the vehicle device.

As a result, information about the booked use authorizations can be advantageously displayed to the user, for example as data on a display device of the vehicle device or else as route sections which are correspondingly colored or correspondingly characterized by additional elements in the graphic display of a digital map in the navigation device (for example green for sections lying ahead with corresponding use authorization, blue for a section which is currently being traveled on with the booked use authorization, red for sections without use authorization, no coloring for sections which cannot be traveled on adjacently).

The vehicle device can be embodied as a vehicle module which is permanently installed in the vehicle or have a vehicle module which is permanently installed in the vehicle.

The vehicle device can also be embodied as a mobile vehicle device which is intended to be carried along in the vehicle or comprise a mobile vehicle device which is provided to be carried along in the vehicle.

The navigation device can be embodied as a navigation module which is permanently installed in the vehicle or have a navigation module which is permanently installed in the vehicle.

The navigation device can also be embodied as a mobile navigation device which is intended to be carried along in the vehicle or comprise a mobile navigation device which is provided to be carried along in the vehicle.

According to a third aspect of one or more embodiments of the invention which is an alternative to the second aspect of one or more embodiments of the invention, a mobile radio device is equipped with at least one processor and at least one position-determining device which provides the processor with first position data in a first data detection phase and with second position data in a second data detection phase, wherein the processor is designed to detect, on the basis of the first position data, the possible use of at least a first traffic area which is subject to tolls and the possible use of a second traffic area which is subject to tolls, as an alternative to the use of the first traffic area which is subject to tolls, to call a first web service and/or another web service via a communication interface of the mobile radio device, and to make a request for the booking of a first use authorization and/or for the collection of a first toll for the first traffic area which is subject to tolls to the first web service, and to make a request for the booking of a second use authorization and/or for the collection of a second toll for the second traffic area which is subject to tolls to the first or to the other web service, and to detect, on the basis of the second position data, a non-use of the first traffic area which is subject to tolls and to call the first web service or a second web service via the communication interface of the mobile radio device and to make a request for the cancelation of the first use authorization and/or for the at least partial refunding of the first toll for the first traffic area which is subject to tolls to the at least one first web service or the second web service.

With such a mobile radio device it is possible for the user to book use authorizations for traffic areas without a vehicle device (for example one according to the second aspect of one or more embodiments of the invention) having to be provided to him for this purpose by the toll collection point. Chronological uncertainties during the use of an electronic device for booking use authorizations, for whose function the toll collection point is not responsible, can advantageously be allowed for by means of the preventative booking of use authorizations of traffic areas which are available to be driven on, with the possibility of cancelation thereof in the event of them not being required.

Such a mobile radio device can be embodied, for example, as a mobile phone.

The processor is, for example, then embodied or configured according to some embodiments, if it is configured, for example by the loading of a computer program which is intended to execute the measures according to some embodiments into a main memory of the mobile radio device to which the processor has access, to carry out the measures according to some embodiments.

The first web service and/or the other web service preferably provide means for receiving information for identifying the first traffic area which is subject to tolls and/or means for receiving information for identifying the second traffic area which is subject to tolls, and means for receiving information for identifying the vehicle to which the use authorization to be booked for the first and the second traffic areas which are subject to tolls relates.

Information for identifying the first traffic area which is subject to tolls can be provided by the first position data; said information can, however, also be provided by a first traffic area data element which represents the first traffic area which is subject to tolls.

Information for identifying the second traffic area which is subject to tolls can be provided by the first position data; said information can, however, also be provided by a second traffic area data element which represents the second traffic area which is subject to tolls.

Information for identifying the vehicle can be provided by the vehicle license plate number which can be represented by a vehicle data element; however, the information can also be provided by a user identifier, for example the mobile radio call number of the mobile radio device which is stored as a call number data element in conjunction with the vehicle data element as a user data record in a data memory which is included in the web service or has at least at certain times a technical data connection to the web service.

The processor of the mobile radio device is preferably designed to transmit information for identifying the first traffic area which is subject to tolls and information for identifying the vehicle when or after the request is made to the first web service via a communication interface of the mobile radio device to the first web service.

The use of a second web service for cancelation purposes makes it possible to concentrate data communication capacities, data processing capacities and data storage capacities on the booking process in the first web service, which is to be categorized as having priority with respect to the cancelation process.

Embodiments of mobile radio device according to some embodiments are characterized in that the processor is designed to determine, on the basis of the first position data, at least one information item for identifying the first web service and/or the other web service and to use said information item to call the first web service and/or the other web service via the communication interface of the mobile radio device.

Embodiments of the mobile radio device according to some embodiments are characterized in that the processor is designed to determine, on the basis of the first position data, an information item for identifying another web service of a second toll collection point for booking a second use authorization of the second traffic area which is subject to tolls and which is associated with the first position data, and to use the latter to call the other web service via the communication interface of the mobile radio device, and to make a request for the booking of the second use authorization and/or for the collection of the second toll for the second traffic area which is subject to tolls to the other web service, wherein the processor is designed to make the request for the booking of the first use authorization and/or for the collection of the first toll for the first traffic area which is subject to tolls to the first web service of a first toll collection point.

With these embodiments it becomes advantageously possible to take into account different types of traffic areas (city center areas for city toll, route sections for bypass toll) or different owners of different traffic areas (operator A of a first freeway A 79, operator B of a second freeway A 78), by making the request for the booking of a use authorization for the respective traffic area, for which the respective toll collection point, which offers the respective web service, has the collection authority, to various web services which are operated by different operators for the respective type of traffic areas and/or by different owners of various traffic areas of, under certain circumstances, the same type.

The processor can optionally be designed to derive a non-use of the first traffic area which is subject to tolls from use, detected on the basis of the second position data, of the second traffic area which is subject to tolls.

According to a fourth aspect of one or more embodiments of the invention, a computer program product is characterized by means of executing the following instructions: (a) receiving first position-related data of a mobile radio device, (b) associating the first position-related data of the mobile radio device with a possible use of at least a first traffic area which is subject to tolls and for with a possible use of a second traffic area which is subject to tolls, as an alternative to the use of the first traffic area which is subject to tolls, (c) transmitting at least one to book a first use authorization and/or collect a first toll for the first traffic area which is subject to tolls, and to book a second use authorization and/or collect a second toll for the second traffic area which is subject to tolls to at least a first central data processing device, (d) receiving second position-related data of the mobile radio device, (e) associating the second position-related data of the mobile radio device with a non-use of the first traffic area which is subject to tolls, and (f) transmitting at least one request for the cancelation of the first use authorization and/or at least partial refunding of the first toll for the first traffic area which is subject to tolls to the first central data processing device or a second central data processing device.

With such a computer program product it is advantageously possible for a user of traffic areas which are subject to tolls to receive in good time a use authorization for any traffic area which is available for use, without having to maintain said use authorization if it is not required.

With such a computer program product it is advantageously possible for a toll collection point to offer in good time a use authorization to a user of traffic areas which are subject to tolls for any traffic area which is available for the use thereof, with the result that the checking measures of the toll collection point or of the owner of the traffic areas are not limited to just one part of the traffic area which is subject to tolls but rather can extend over the entire traffic area which is subject to tolls because the use authorization is already available before the actual use and is not booked only when use is detected, which, owing to the period required for the detection of route sections can lead, in particular on relatively short route sections, to a situation in which a use authorization is not present until the route section which is subject to tolls is exited, if it has not been preventatively booked in advance.

Such a computer program product can be provided, for example, by an application which is executed on a mobile phone according to the third aspect of one or more embodiments of the invention and which carries out a booking and cancelation method according to the first aspect of one or more embodiments of the invention.

For example, transmission of a request for the booking of a first use authorization and/or collection of a first toll for the first traffic area which is subject to tolls to at least a first central data processing device can occur by transmitting a text message in the form of a booking SMS from the mobile radio device to the first central data processing device, which preferably comprises information for identifying the first traffic area which is subject to tolls and information for identifying the vehicle, as well as information on the nature of the message (booking or cancelation).

In addition, the transmission of a request for the booking a second use authorization and/or collection of a second toll for the second traffic area which is subject to tolls can occur together with the request for the booking of the first use authorization and/or collection of the first toll for the first traffic area which is subject to tolls to the first central data processing device or independently of the request for the booking of the first use authorization and/or collection of the first toll for the first traffic area which is subject to tolls to another central data processing means by transmitting a text message in the form of a booking SMS from the mobile radio device to the first or to the other central data processing device, which preferably comprises information for identifying the second traffic area which is subject to tolls and information for identifying the vehicle as well as information on the nature of the message (booking or cancelation).

Providing a second central data processing device solely for cancelation has the advantage that technical data bottlenecks during the time-critical booking can be avoided because the less time-critical cancelations are received by a central data processing device other than that which is used for the bookings.

Embodiments of the computer program product according to some embodiments provide that the computer program product for transmitting the booking request or cancelation request has means for calling a first web service which is provided by the first central data processing device or connected to the first central data processing device. The transmission of the request for the booking of the first use authorization and/or collection of the first toll for the first traffic area which is subject to tolls and for the booking of the second use authorization and/or collection of the second toll for the second traffic area which is subject to tolls occurs by making a request for the booking of the first use authorization and/or collection of a first toll for the first traffic area which is subject to tolls and for the booking of the second use authorization and/or collection of a second toll for the second traffic area which is subject to tolls to the web service, the computer program product for transmitting the cancelation request or refunding request has means for calling the first web service or a of a second web service which is provided by the first central data processing device or is connected to the first central data processing device, and the transmission of the request for the cancelation of the first use authorization and/or at least partial refunding of the first toll for the first traffic area which is subject to tolls occurs by making a request for the cancelation of the first use authorization and/or at least partial refunding of the first toll and/or collection of a first toll for the first traffic area which is subject to tolls to the first or the second web service.

Providing a web service as an interface between the central data processing device, which manages the use authorizations and/or the toll collections by storing the corresponding data records in a data memory of the central data processing device, provides the user with a convenient means for carrying out bookings and/or cancelations which can be easily used via the Internet according to customary protocols (for example WAP) which are available for mobile radio devices.

Providing a second web service solely for the cancelation has the advantage that technical data bottlenecks during the time-critical booking can be avoided because the less time-critical cancelations are processed via a web service other than that which is used for the bookings.

Embodiments of the computer program product according to some embodiments also provide that the reception of the first and second position-related data of the mobile radio device occurs by means of the reception of the first and second position-related data by a position-determining device which is included in the mobile radio device and the transmission of the request for the booking of the first use authorization and/or collection of the first toll for the first traffic area which is subject to tolls and for the booking of the second use authorization and/or collection of the second toll for the second traffic area which is subject to tolls occurs via a communication interface of the mobile radio device. For this purpose, the means for receiving the first and second position-related data of the mobile radio device can be designed to receive the first and second position-related data from a position-determining device which is included in the mobile radio device, and the means for transmitting the request for the booking of the first use authorization and/or collection of the first toll for the first traffic area which is subject to tolls as well as for the booking of the second use authorization and/or collection of the second toll for the second traffic area which is subject to tolls can be designed to use a communication interface of the mobile radio device for the transmission.

With such a computer program it becomes possible for the user to be able to make, independently and immediately, requests for bookings and cancelations of use authorizations to the central data processing device by means of his mobile radio device, since the position-related data are already associated at the mobile radio device with a corresponding traffic area which is subject to tolls, for which purpose the corresponding means are present in the computer program product according to some embodiments.

According to these embodiments, the computer program product is executed on a mobile radio device. Such a computer program product can be made available, for example, by a EETS provider (EETS=European Electronic toll service according to Guideline 2004/52/EG).

A mobile radio device which is designed to associate position-related data with traffic areas which are subject to tolls is also referred to as a "thick client" because a large amount of computing power and a large quantity of traffic-area-related data are required to carry out this task.

Embodiments of the computer program product according to some embodiments alternatively provide for the first position-related data of the mobile radio device to be received by the reception of a first message, transmitted by the mobile radio device into a mobile radio network to a switching central data processing device, which message contains the first position-related data, and the reception of the second position-related data of the mobile radio device by the reception of a second message, transmitted by the mobile radio device into the mobile radio network to a switching central data processing device, which second message contains the second position-related data, and the transmission of the request for the booking of the first use authorization and/or collection of the first toll for the first traffic area which is subject to tolls and for the booking of the second use authorization and/or collecting of the second toll for the second traffic area which is subject to tolls via a communication interface of the switching central data processing device.

For this purpose, the means for receiving the first position-related data of the mobile radio device can be designed to receive a first message, which is transmitted by the mobile radio device into a mobile radio network to a switching central data processing device and which contains the first position-related data, the means for receiving the second position-related data of the mobile radio device can be designed to receive a second message, transmitted by the mobile radio device into the mobile radio network to the switching central data processing device, which contains the second position-related data, and the means for transmitting the request for the booking of the first use authorization and/or collection of the first toll for the first traffic area which is subject to tolls and for the booking of the second use authorization and/or collection of the second toll for the second traffic area which is subject to tolls can be designed to use a communication interface of the switching central data processing device. With such a computer program it becomes possible for the user to use his mobile radio device to be able to make requests for bookings and cancelations of use authorizations indirectly through a switching central data processing device, and once the position-related data have been associated, on the central data processing device, with the corresponding traffic areas which are subject to tolls and which are linked to one another under the attribute and/or the stipulation of an alternative use, for which purpose the corresponding means are present in the computer program product according to some embodiments.

According to these embodiments, the computer program product is executed on a switching central data processing device, for example that of a toll switching station whose central task, for a large number of users of corresponding mobile radio devices, is to associate the position-related data with a group, which can be assigned to the position-related data, of alternatively usable traffic areas which are subject to tolls and which are distinguished by a common starting point. The requests for the booking and for the cancelation are directed by the switching central data processing device (for example that of an EETS provider) to said first and/or second central data processing device (for example that of a toll operator). A mobile radio device which is not equipped to associate position-related data with traffic areas which are subject to tolls is also referred to as a "thin client" because associating, which requires a large amount of computing power and a large quantity of traffic-area-related data is not carried out by the mobile radio device itself but rather by a central data processing device which receives the necessary position-related data from the mobile radio device.

According to a fifth aspect of one or more embodiments of the invention, a system for the collection of tolls for the use of traffic areas which are subject to tolls by a vehicle has at least a central data processing device which has at least a first central processor and at least a first central data memory, and at least an electronic device which is carried along by the vehicle and which has at least one position-determining device, at least one decentralized processor for receiving and for processing the position data of the position-determining device and at least one decentralized communication device which is designed to carry out at least partial wireless communication with the central data processing device, wherein the decentralized processor is designed to receive the first position data, determined in a first position-determining phase by the position-determining device, and to process said data, in that said decentralized processor provides the decentralized communication device with at least some second data of the second position data or some second data derived from the second position data, together with a user identifier, for transmission to the central data processing device and to receive and to process the second position data, which are determined in a second position-determining phase by the position-determining device, in that said decentralized processor provides the decentralized communication device at least with some of the first data of the first position data or some of the first data derived from the first position data together with a user identifier, for transmission to the central data processing device, and wherein the first central processor is designed to receive and to process the first data, transmitted by the electronic device to the central data processing device, and the user identifier in that said first central processor registers a first use authorization, assigned to the user identifier, for a first traffic area which is subject to tolls and which can be associated or identified from the first data, by storing a first use authorization data record in the first central data memory, and registers a second use authorization, assigned to the user identifier, for a second traffic area which is subject to tolls, which can be used as an alternative to the first traffic area which is subject to tolls and can be associated or identified from the first data, by storing a second use authorization data record in the first central data memory, and wherein the first central processor or a second central processor of the central data processing device is designed to receive and to process the second data, transmitted by the electronic device to the central data processing device, and the user identifier in that said central processor cancels the first use authorization, assigned to the user identifier, for the first traffic area, which can be associated or identified from the second data, by deleting the first use authorization data record from the first data memory or by linking the first use authorization data record with an invalidity marker, or else by storing a first cancelation data record for the first traffic area in the first central data memory or a second central data memory of the second data processing device marked as invalid.

Other measures which are also suitable for making the first use authorization ineffective by means of corresponding data processing processes are included in the scope of protection of the system for the collection of tolls according to some embodiments.

For example, the second data can therefore comprise or imply a use confirmation for the second traffic area which is subject to tolls and which prompts the first or second central processor to collect a toll, relating to the user identifier, for the second traffic area which is subject to tolls, which implies invalidation/nullification of the use authorization for the first traffic area which is subject to tolls owing to the alternative use character of the first and second traffic areas which are subject to tolls.

The confirmed use of the second traffic area which is subject to tolls confirms the non-use of the first traffic area which is subject to tolls.

The storage of the first use authorization data record preferably includes the collection of a first toll or is supplemented by such collection, and the storage of the second use authorization data record includes the collection of a second toll or is supplemented by such collection, wherein the first use authorization becomes ineffective as a result of the refunding or nullification of the first toll and, if appropriate, in the case of non-use also of the second traffic area which is subject to tolls, the second use authorization becomes ineffective as a result of the refunding or nullification of the second toll.

Such a system provides the users of traffic areas which are subject to tolls with the advantageous possibility of obtaining, in good time before the use of a traffic area which is subject to tolls, a use authorization for said traffic area and all the further traffic areas which are subject to tolls and which can be used at the same time in an alternative fashion without said use authorizations continuing to exist in the case of non-use of the traffic area which is subject to tolls and continuously resulting in costs for the user to book, in so far as the use of a traffic area which is subject to tolls is not confirmed.

Such a system provides, for a toll collection service which is responsible for checking the authorized use of the traffic areas which are subject to tolls, the advantageous possibility of expanding this checking to the entire traffic area which is subject to tolls instead of being restricted to a partial region of the traffic area which is subject to tolls due to the later timing of the use, owing to a lack of prompt booking of the use authorization during the checking.

For the system according to some embodiments, two types of electronic devices are possible: a) the thin client and b) the thick client.

In this context, the electronic device can, in the case of both types, be embodied as a fixed or as a mobile vehicle device, in particular in case b) as a navigation device or, in particular, in the case a) as a mobile radio device. In particular, can the electronic device can be embodied as a fixed or as a mobile vehicle device or as a navigation device according to the second aspect of one or more embodiments of the invention or as a mobile radio device according to the third aspect of one or more embodiments of the invention.

In the case a) the first central processor of the central data processing device is designed to receive and to process the first data, transmitted by the electronic device to the central data processing device, and the use authorization, in that said central processor associates the received first data with the possible use of at least a first and a second traffic area which is subject to tolls, and the first or the second central processor of the central data processing device is designed to receive and to process the second data, transmitted by the electronic device to the central data processing device, and the user identifier in that said central processor associates the received second data with the non-use of at least the first traffic area which is subject to tolls. The computationally intensive and data-intensive determination of the first and second traffic area which are subject to tolls and which match the first data and of the first and/or second traffic area which are subject to tolls and which match the second data is consequently performed by a processor of the central data processing device.

In the case b) the decentralized processor of the electronic device is designed to receive and to process the first position data, determined in a first position-determining phase by the position-determining device in that said decentralized processor associates the received first position data with the possible alternative use of at least a first and a second traffic area which is subject to tolls and provides the decentralized communication device with first traffic area data, which identify at least the first traffic area which is subject to tolls, as first data together with a user identifier for transmission to the central data processing device, wherein the first central processor of the central data processing device is designed to identify, from the first data, the first traffic area which is subject to tolls and second traffic area which is subject to tolls and which can be used as an alternative thereto and for which the first and the second use authorizations are to be booked; in addition, the decentralized processor of the electronic device is designed to receive and to process the second position data, which are determined in a second position-determining phase by the position-determining device, in that said decentralized processor associates the received second data with the non-use of at least the first traffic area which is subject to tolls and provides the decentralized communication device with first traffic area data, which identify at least the first traffic area which is subject to tolls, as second data together with a user identifier—and for example a cancelation marker—for transmission to the central data processing device, wherein the first or second central processor of the central data processing device is designed to identify, from the second data, the first traffic area which is subject to tolls and for which the first use authorization is to be canceled; and alternatively the decentralized processor of the electronic device is designed to receive and to process the second position data, which are determined in a second position-determining phase by the position-determining device, in that said decentralized processor associates the received second data with the use of the second traffic area which is subject to tolls and provides the decentralized communication device with second traffic area data, which identify at least the second traffic area which is subject to tolls, as second data together with a user identifier—and for example a use marker—for transmission to the central data processing device, wherein the first or second central processor of the central data processing device is designed to identify, from the second data, the second traffic area which is subject to tolls and for which a toll is to be collected, with the result that the first use authorization expires.

The computationally intensive and data-intensive determination of the first traffic area which is subject to tolls and which matches the first data and the second data are consequently performed by the (decentralized) processor of the electronic device.

In the cases in which only a single (the first) central processor is provided to receive both the first data and the second data, the decentralized processor is preferably designed to provide the decentralized communication device with the first data together with a booking request for the transmission to the central data processing device and to provide the second data together with a cancelation request (in the case of the non-use of the first traffic area which is subject to tolls or of none of the traffic areas which are subject to tolls) or together with a toll collection request/use confirmation (in the case of the detected use of the second traffic area which is subject to tolls) to the central data processing device, and the first (only) central processor is designed to receive the first data and the booking request and to process them for the registration of the first use authorization and to receive the second data and the cancelation request and to process them for the cancelation of the first use authorization, or to receive the second data and the toll collection request/use confirmation and to process them for the collection of a toll for the use of the second traffic area which is subject to tolls.

Preferably in the cases in which only the first central processor is provided exclusively for receiving the first data and the second central processor is provided exclusively for receiving the second data, the transmission of a separate booking request and cancelation request or toll collection request is dispensed with because the type of request is already apparent from the first or second central processor which is selected at the electronic device. For example, the central data processing device can have, for receiving booking requests of the electronic devices, a booking server which comprises the first central processor, and a cancelation server for receiving cancelation requests which comprises the second central processor.

However, this is not compulsory; instead, booking requests and cancelation requests or toll collection requests can be processed by the same service providing server. However, it is advantageous to provide a separate server for each request type because this easily provides the possibility of prioritizing a first request type (bookings) over a second request type (cancelations or toll collections). Bookings are more time-critical than cancelations, owing to their reference to the real-time travel on the traffic area and the right of use which is necessary for said travel, and should therefore be handled with priority.

The booking server can be designed to provide, assist or execute a first web service for receiving booking requests; and the cancelation server can be designed to provide, assist or execute a second web service for receiving cancelation requests and/or toll collection requests.

Such a central data processing device corresponds to a sixth aspect of one or more embodiments of the invention according to which a data processing device is characterized by (a) a first web service for receiving at least one booking request, transmitted by a mobile device, for at least one first and second traffic area which is subject to tolls and which is determined by the mobile device as a function of position and which can be used as an alternative, in that said traffic areas have a common access road from which just one of the traffic areas which are subject to tolls can be traveled on and which is linked to at least a first user identifier, and (b) at least a second web service for receiving at least one cancelation request, transmitted by the mobile device and made under the first user identifier, for at least the first traffic area which is subject to tolls, or a use confirmation, made under the first user identifier, for the second traffic area which is subject to tolls.

The mobile device can be formed by a vehicle or by an electronic device which is carried along by a vehicle, for example by an electronic device according to the fifth aspect of one or more embodiments of the invention.

The first user identifier can be generated here on the basis of the booking request by a processor of the data processing device, which processor provides or assists the first web service or is connected thereto, and said first user identifier can be transmitted back to the mobile device as a cancelation code by the first web service. Illegal cancelation requests by the mobile device are therefore made more difficult.

The first web service is preferably connected to a first data memory or a first memory area of a central data memory at least at certain times with a data connection, in which memory area use authorizations, for example in the form of use authorization data records, which comprise the user identifier (or a user data element which relates to the user identifier) and at least a first traffic area data element which identifies the first traffic area which is subject to tolls as well as a second traffic area data element which identifies the second traffic area which is subject to tolls can be stored, wherein the central data processing device is designed to store such use authorizations in the first data memory or the second memory area.

In this context, the alternative possibility of using the first and the second traffic areas which are subject to tolls is advantageously registered by virtue of the fact that the first and the second traffic area data elements are included in the common use authorization data record and are in this respect linked to one another.

The second web service preferably has at least at certain times a data connection to a second data memory or a second memory area of a central data memory, in which memory area cancelation requests, for example in the form of cancelation data records which comprise the user identifier (or a user data element which is related to the user identifier) and at least a first traffic area data element which identifies the first traffic area, can be stored, wherein the central data processing device is designed to store said cancelation request in the first data memory or the first memory area.

The data processing device according to some embodiments preferably comprises at least one processor, for example a central processor, which is designed to compare use authorization data records and cancelation data records with one another and, in the case of sufficient correspondence of data elements of these data records, to delete completely or partially the corresponding use authorization data records and the corresponding cancelation data records concurrently.

It is also possible to consolidate the use authorization data records and the corresponding cancelation data records in a third data memory or a third memory area of the central data memory, by which means the use authorization data records in the first data memory or in the first memory area and the corresponding cancelation data records in the second data memory or in the second memory area can remain untouched and can be archived for documentation purposes.

The data processing device according to some embodiments is preferably designed, in the case of a cancelation request being present for the first traffic area which is subject to tolls and given a lack of a cancelation request for the second traffic area which is subject to tolls, to convert the use authorization data record for the second traffic area which is subject to tolls into a toll collection data record which represents a toll for the use of the second traffic area which is subject to tolls, or to add such a toll collection data record. The data processing device according to some embodiments can also be designed, given the presence of a use confirmation for the second traffic area which is subject to tolls, to convert the use authorization data record for the second traffic area which is subject to tolls into a toll collection data record which represents a toll for the use of the second traffic area which is subject to tolls, or to add such a toll collection data record.

The use authorization data records can per se already be or comprise toll data records for first and second tolls, collected in order to ensure the use authorizations of the first and second traffic areas which are subject to tolls, for the possible alternative use of the first or second traffic area which is subject to tolls. The central data processing device is in this case designed to implement the cancelation request for at least the first traffic area which is subject to tolls or the use confirmation for the second traffic area which is subject to tolls in that it refunds the collected first toll for the first traffic area which is subject to tolls, characterizes it as ineffectively collected or carries out an equivalent technical data measures which corresponds to the objective of the ultimate non-collection of the first toll.

Embodiments of the data processing device according to some embodiments provide (c) at least a first data memory, wherein (a) the first web service is designed to receive at least one booking request, transmitted by the mobile device, for at least one second traffic area which is subject to tolls, which is determined by the mobile device as a function of position, which can be used as an alternative to the first traffic area which is subject to tolls and is linked, together with the first traffic area which is subject to tolls to the first user identifier, and (c) at least some of the data elements, received by the first web service for booking and the second web service for cancelation, are identical to or related to data elements which are included in a toll data record, which can be stored in the first data memory, for at least the second traffic area which is subject to tolls.

In this context, the second web service can be designed to permit cancelation requests only for the entirety of all the traffic areas which are subject to tolls of a preceding booking request, and to permit cancelation of a subset of the entirety of all the traffic areas which are subject to tolls of a preceding booking request only in conjunction with the transmission of a use confirmation for at least one traffic area which is subject to tolls and which is not part of the subset which is to be canceled.

Alternatively, the second web service can be designed to permit cancelation requests a first subset of first traffic areas which are subject to tolls of the entirety of all the traffic areas which are subject to tolls of a preceding booking request, and to evaluate absent cancelation requests for second traffic areas which are subject to tolls and which are not contained in the first subset of the first traffic areas which are subject to tolls and which are to be canceled, for these second traffic areas which are subject to tolls as a use confirmation which excludes a later cancelation of the use authorizations for the second traffic areas which are subject to tolls.

Embodiments of the data processing device according to some embodiments provide (d) a third web service and (c) at least a first data memory, wherein (a) the first web service is designed to receive at least one booking request, transmitted by the mobile device, for at least one second traffic area which is subject to tolls and which is determined by the mobile device as a function of position, and can be used as an alternative to the first traffic area which is subject to tolls and is linked, together with the first traffic area which is subject to tolls, to the first user identifier, and (d) the third web service is designed to receive at least one use confirmation, which is transmitted under the first user identifier or under a vehicle identifier which can be linked to the first user identifier, for the second traffic area which is subject to tolls, and (c) at least some of the data elements, which are received by the first web service for booking and the second web service for cancelation or the third web service for confirmation of use, are identical to or are related to data elements which are included in a toll data record which is stored in the first data memory, for at least the second traffic area which is subject to tolls.

In this context, can the use confirmation be sent both by the mobile device on the basis of a position of the mobile device which is determined by the mobile device and which corresponds to the presence of the mobile device on the second traffic area which is subject to tolls, to the third web service, and by a separate checking device (which can be arranged, for example, outside the vehicle which forms or has the mobile device) which is present in the region of the second traffic area which is subject to tolls.

The registration of a use confirmation for the used second traffic area which is subject to tolls by the data processing device can be equivalent to the registration of a deletion prohibition for the use authorization of this used second traffic area which is subject to tolls, while said registration initiates deletion of the use authorization for the first traffic area which is subject to tolls.

The provision of three different web services for three different registration tasks makes the booking of use authorizations, cancelations and use confirmations more efficient and additionally advantageously permits a booking process to be easily prioritized over another process in that said booking process is allocated the maximum storage/processor and/or data transmission capacity. In this way, the booking process for the use authorizations is preferably prioritized over the booking process for the use confirmations, and the latter over the booking process for the cancelations.

Embodiments of the toll collection system according to the fifth aspect of one or more embodiments of the invention have a checking device which is provided at or on a traffic area which is subject to tolls and has an image recording and evaluating device for recording and evaluating images of vehicles which use the traffic area and for acquiring vehicle data for identifying these vehicles from these images, wherein the use authorization data records of the central data processing device comprise vehicle data, and wherein at least at certain times a communication link is present between the checking device and the central data processing device for transmitting vehicle data from the central data processing device to the checking device and/or for transmitting vehicle data from the checking device to the central data processing device. The checking device or the central data processing device is preferably designed to check the vehicle data for linking to a use authorization data record which is assigned to the traffic area and to generate at least one signal which is dependent on whether the checking of the vehicle data for linking to a use authorization data record which is assigned to the traffic area yields a positive or negative result. This does not exclude the possibility of both the checking device and the central data processing device being designed to carry out such data processing and signal generation.

Such a checking device supplements the toll collection system with a possibility of checking whether, for a vehicle which has arrived on a specific traffic area which is subject to tolls, an authorization for the use of this specific traffic area which is subject to tolls has been booked. This advantageously closes the cycle of successful toll collection, which cycle is formed by the entities of (A) detection in the vehicle, (B) booking in the control center and (C) checking at the traffic area.

Each of the FIGS. 2a, 2b, 2c, 3a, 3b, 3c, 4 and 5, which contains a map in which the profile of a vehicle route is illustrated on the basis or locations A, B, C, . . . of a vehicle (of a vehicle 50 in the case of FIGS. 2a, 2b and 2c), additionally contains a list of the provisionally booked, confirmed and canceled route sections at each indicated location on the respective route of the vehicle.

Generally, all the FIGS. 2a, 2b, 2c, 3a, 3b, 3c, 4 and 5 show the same detail of the map on which a freeway A 79 which runs in the north-south direction is illustrated, said freeway intersecting the freeway A 78 which runs in the east-west direction. Both freeways have four lanes in that they have directional roadways with two lanes each, which are separated from one another in the two directions of travel. All the sections of the freeway A 79 which are denoted in the northerly direction of travel by 7901, 7903, 7905, 7907, 7909, 7911, 7913 and in the southerly direction of travel by 7914, 7912, 7910, 7908, 7906, 7904, 7902 have obligatory tolls. Likewise, all the sections of the freeway A 78 which are denoted in the easterly direction by 7841, 7843, 7845, 7847 and in the westerly direction by 7848, 7846, 7844, 7842 have obligatory tolls.

The toll is dependent on the type of vehicle, its number of axles and the pollutant class of its engine as well as on the length of the respective freeway section.

First Exemplary Embodiment

The first exemplary embodiment illustrates the suitability of products according to some embodiments for cases in which there is not a plurality of alternatively usable route sections which are subject to tolls at the access road to a first route section which is subject to tolls but instead only this first route section which is subject to tolls and which can either be traveled on or not traveled on, without there being the possibility of a second route section which is subject to tolls being traveled on in its place.

FIGS. 1a, 2a, 6a, 6b, 6c and 7a serve to explain the first exemplary embodiment.

Figure 7:
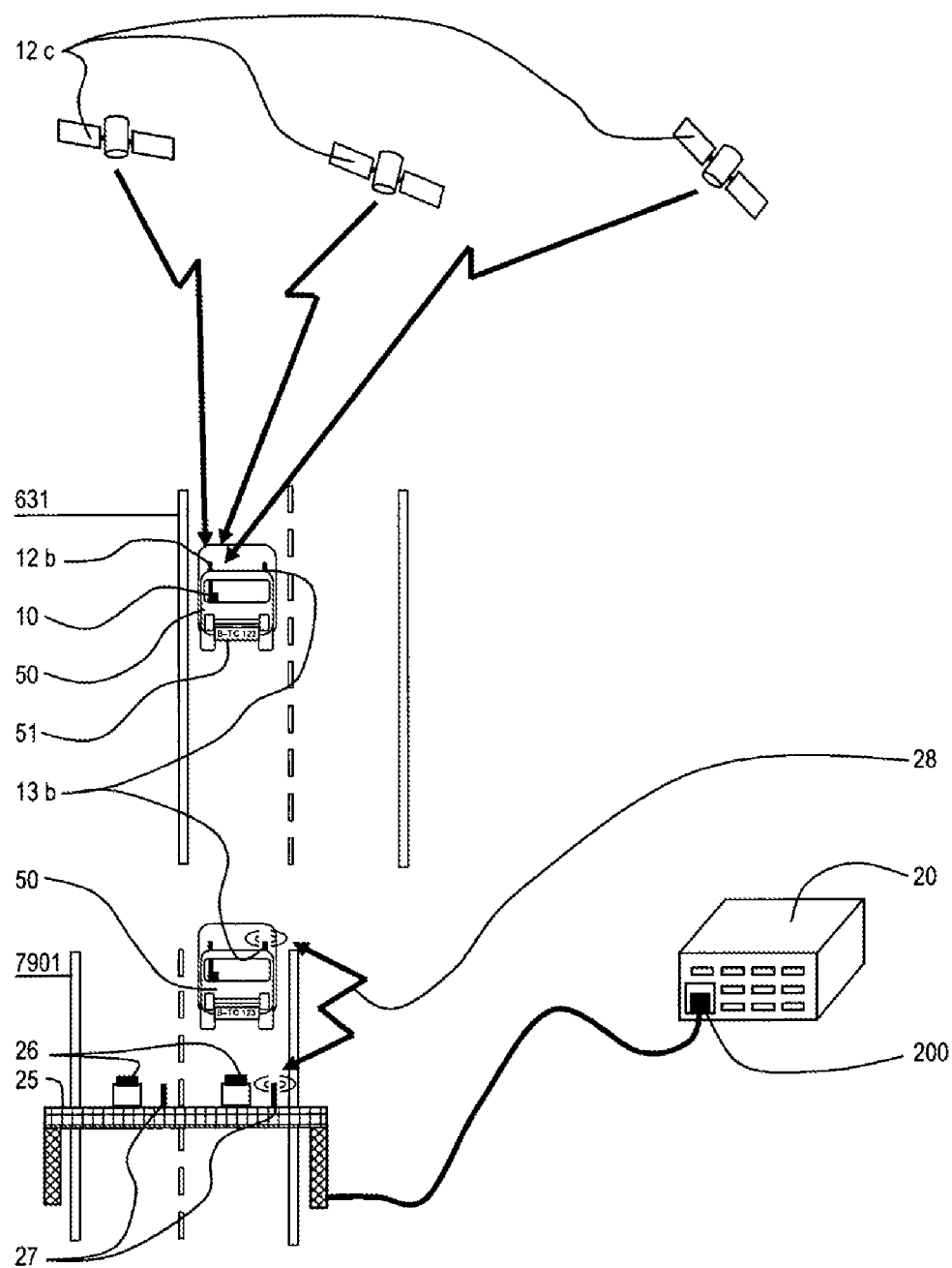
FIG. 7a shows the schematic illustration of a first toll collection system in the first exemplary embodiment.
FIG. 7b shows the schematic illustration of a second toll collection system according to some embodiments in the second exemplary embodiment.
FIG. 7c shows the schematic illustration of a third toll collection system according to some embodiments in the third exemplary embodiment.
Figure 7:
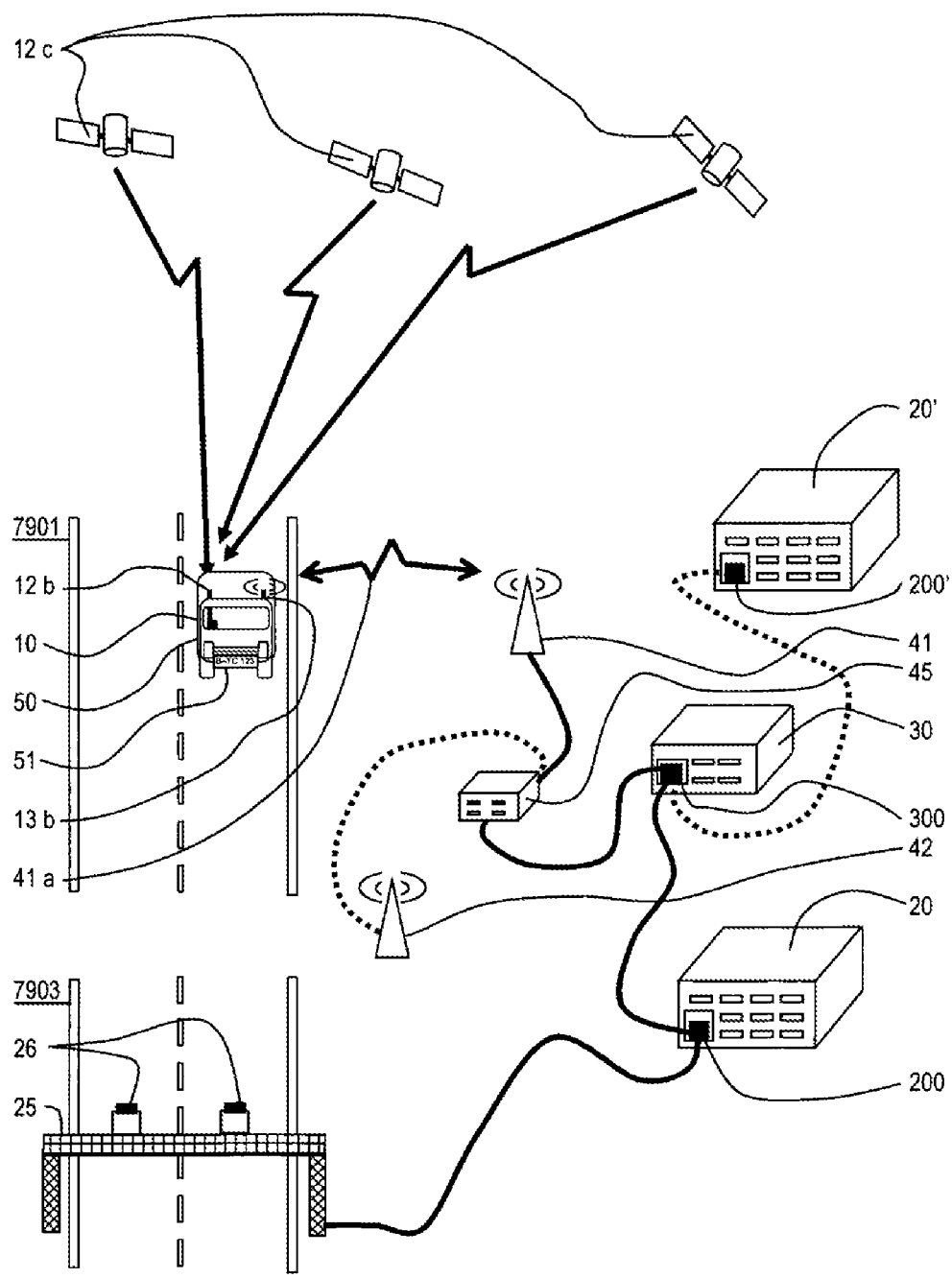
Figure 7:
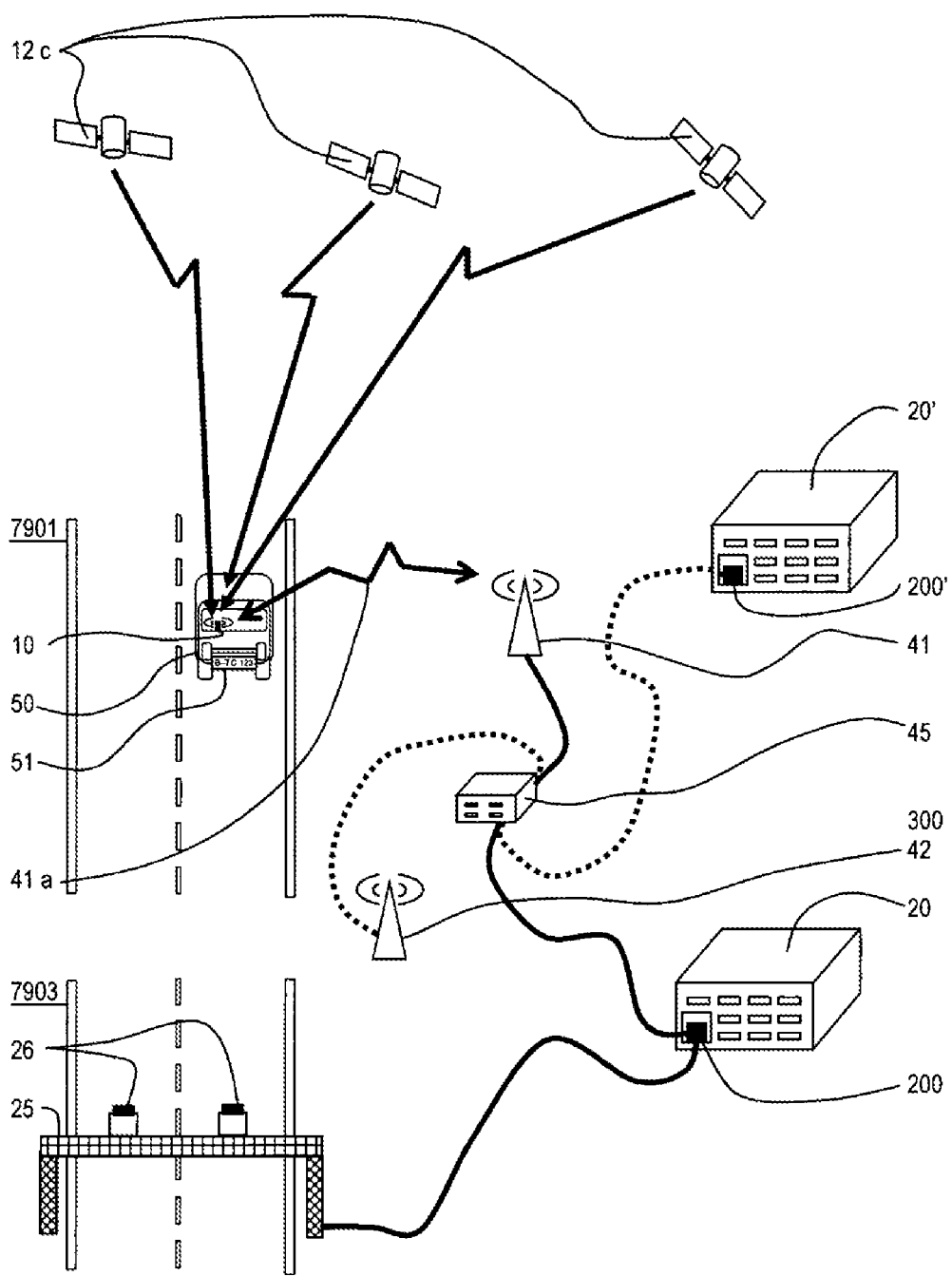

According to the route of the first exemplary embodiment (FIG. 2a), a driver approaches the start of the four-lane freeway A 79 from the south on the two-lane federal highway B 631, with his vehicle 50 (FIG. 7a).

At the connection point 791, the federal highway B 631 merges in the northerly direction with the section 7901 of the freeway A 79. In the opposite direction, the section 7902 of the freeway 79 merges with the federal highway. At the connection point 791 there is for the driver the possibility of turning off the freeway A 79 in the westerly or in the easterly direction via traveling on the B 632.

Figure 6:
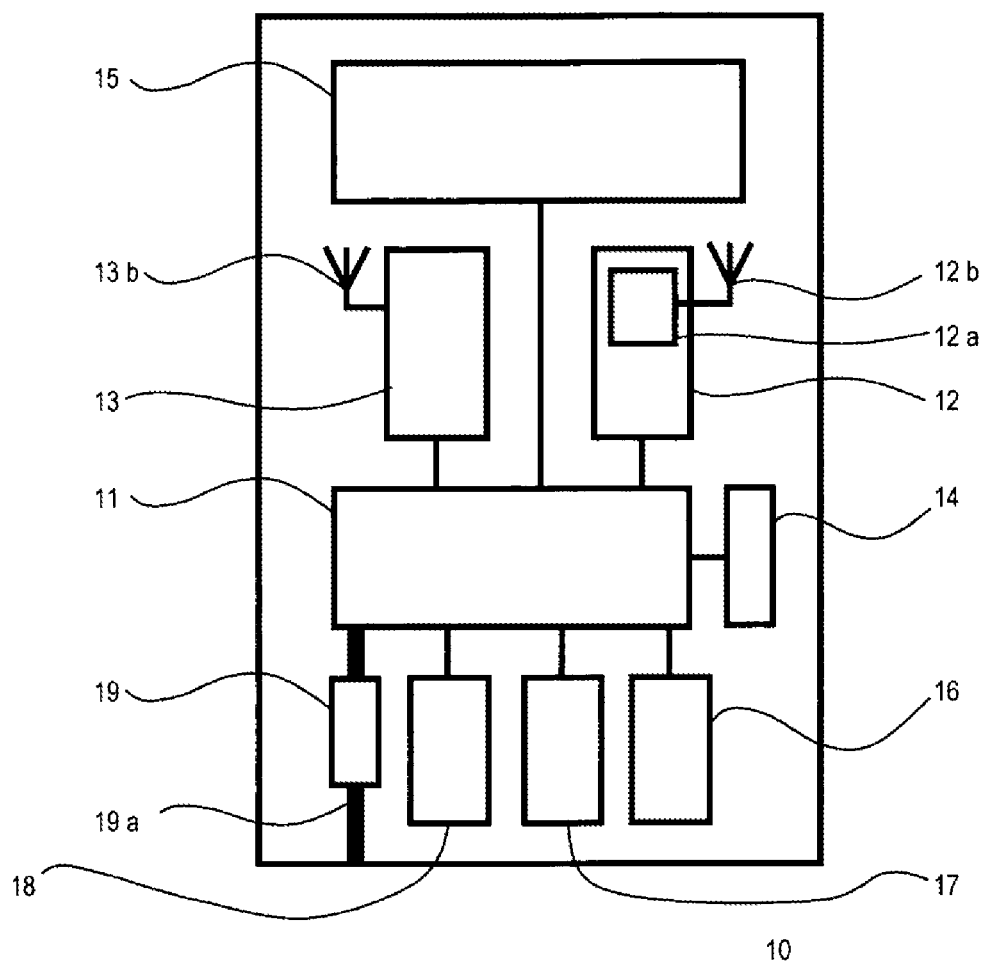
FIG. 6a shows a schematic illustration of a mobile device 10 according to some embodiments which is used in all the exemplary embodiments.
FIG. 6b shows the plan view of a toll collection device 10 according to some embodiments as a first embodiment of the mobile device 10 for the first exemplary embodiment in a usual operating state.
FIG. 6c shows the plan view of the toll collection device 10 according to some embodiments as a first embodiment of the mobile device 10 for the first exemplary embodiment in an unusual operating state.
FIG. 6d shows the plan view of a navigation device 10 according to some embodiments as a second embodiment of the mobile device 10 for the second exemplary embodiment.
FIG. 6e shows the plan view of a mobile phone 10 according to some embodiments as a third embodiment of the mobile device 10 for the third exemplary embodiment.
Figure 6:
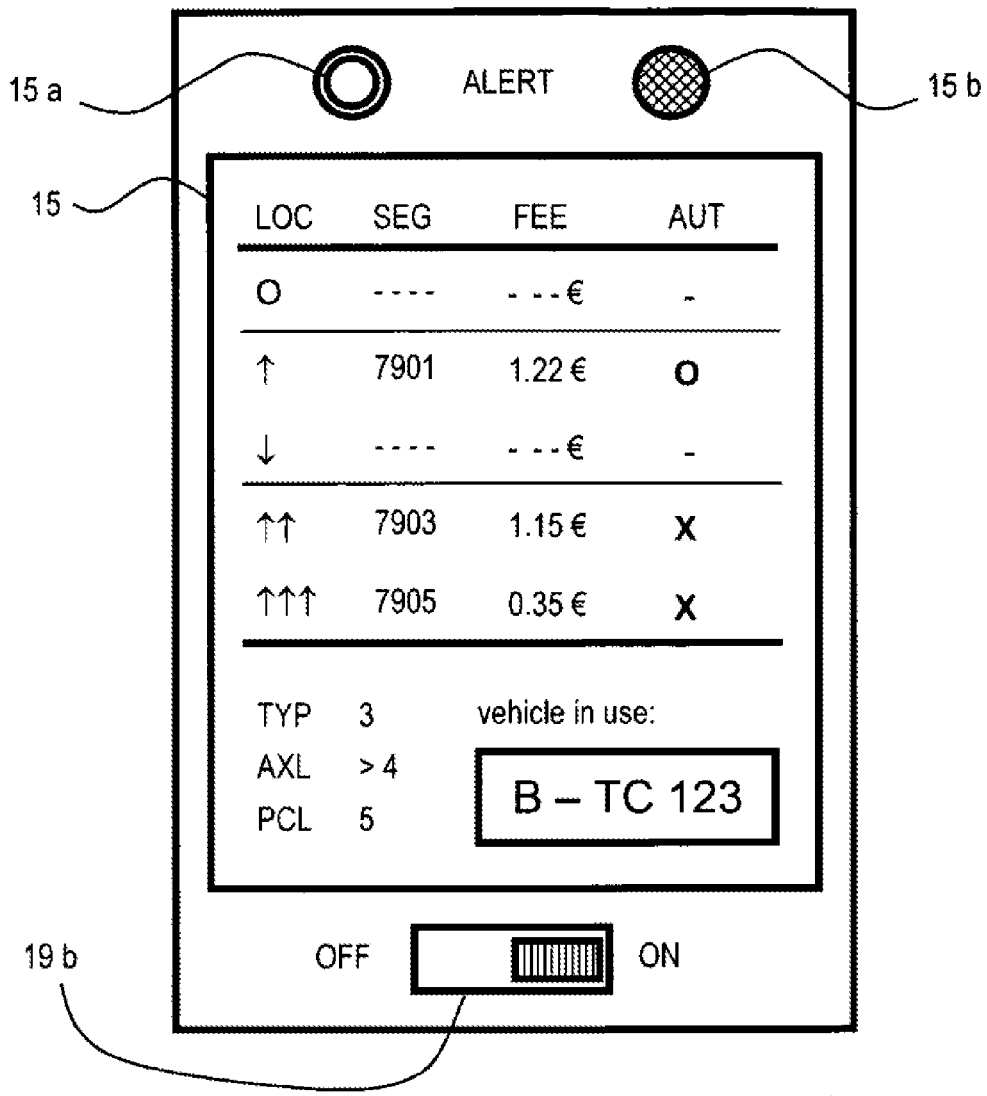
Figure 6:
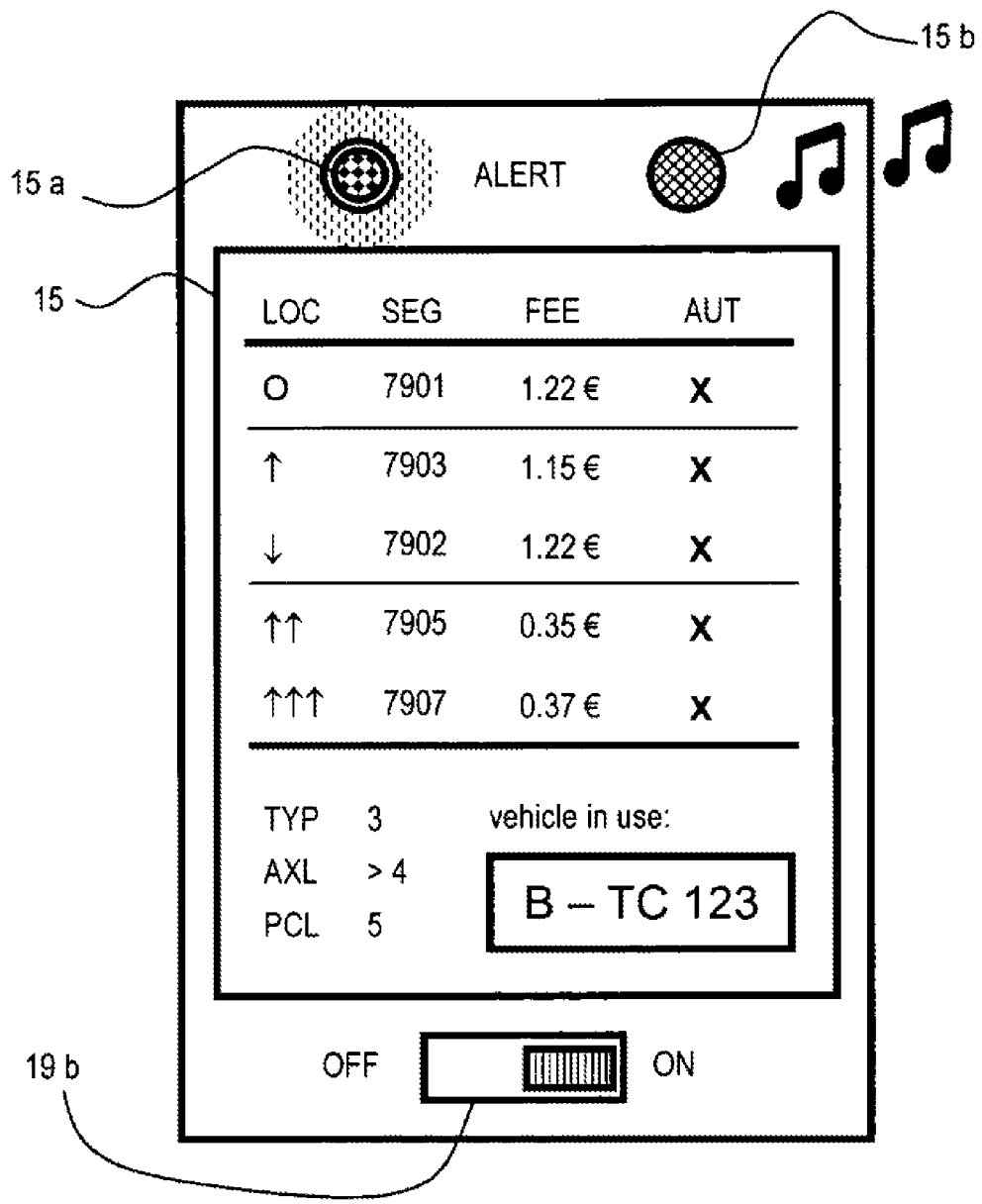
Figure 6:
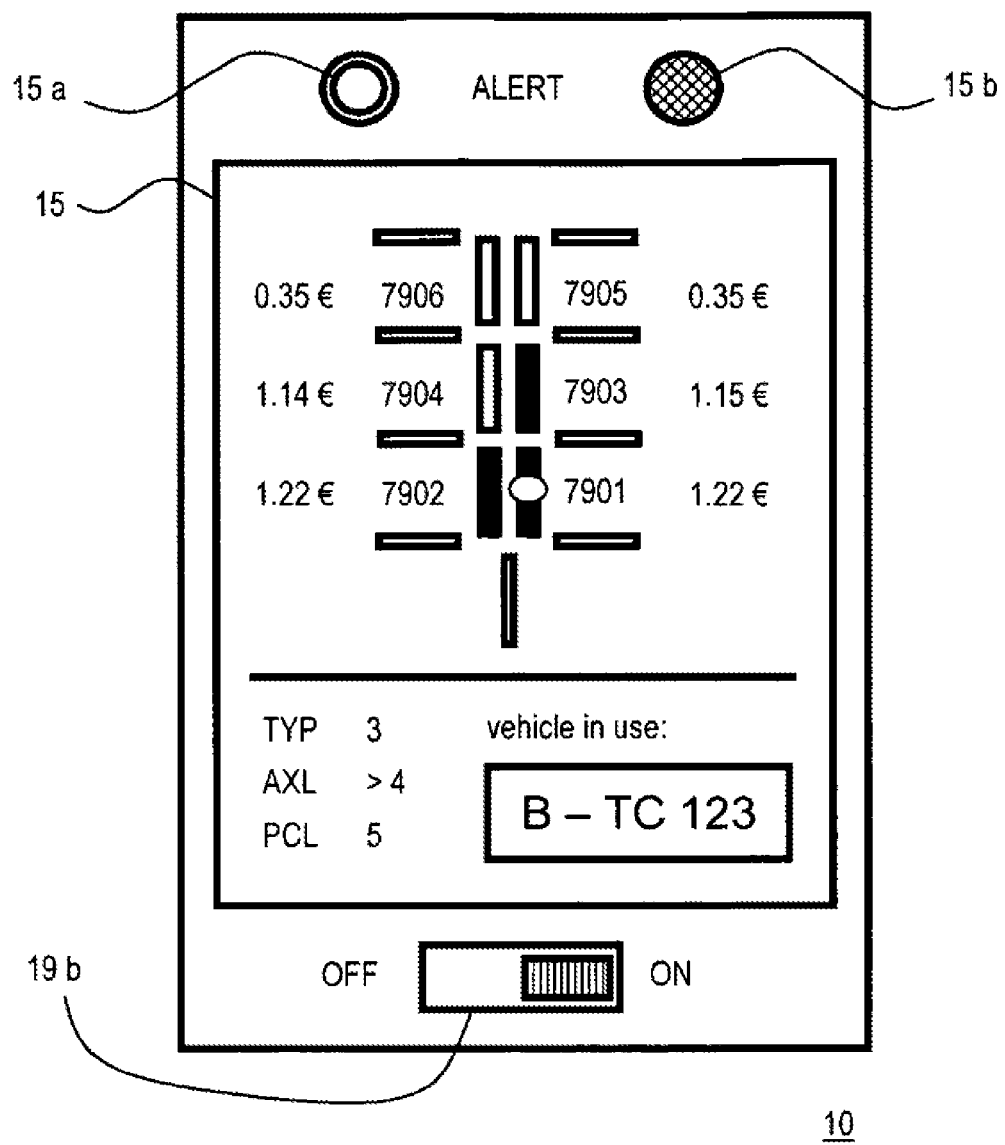
Figure 6:
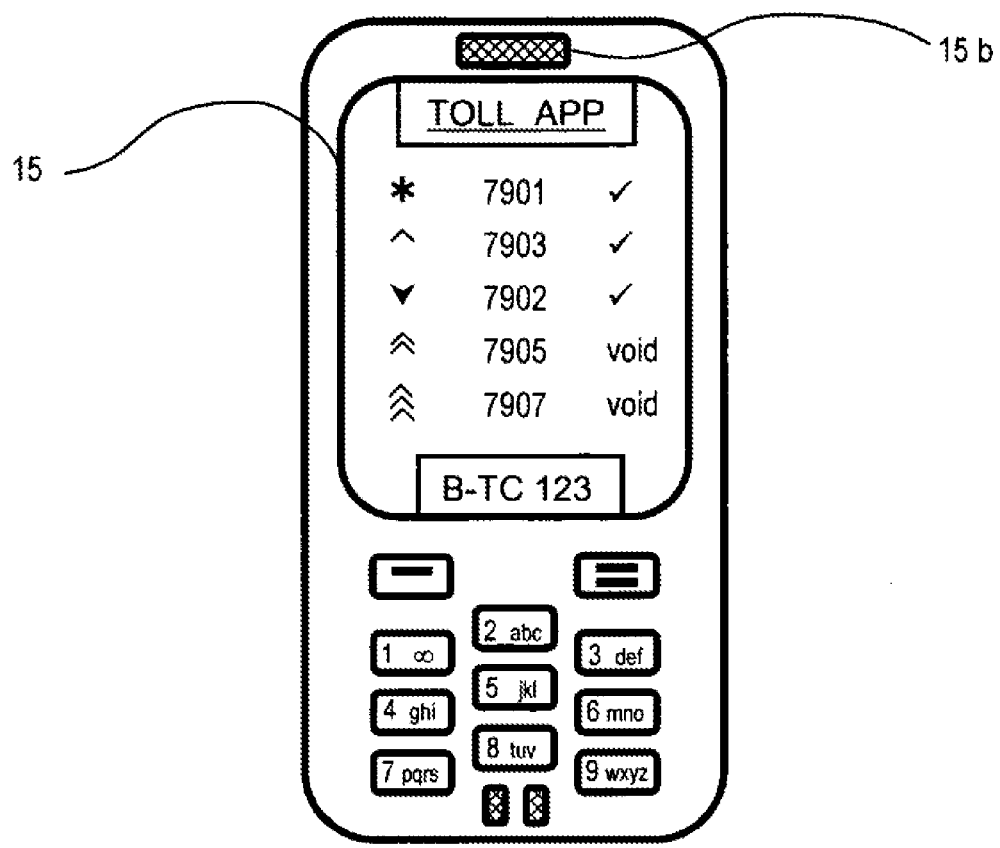

For the collection of tolls the driver carries a mobile device 10 with him, the general design of which is illustrated schematically in FIG. 6a. Said mobile device 10 comprises a processor 11, various data memories 16, 17 and 18, a display device 15, a rechargeable battery 19, which has a power supply connection 19a for recharging and supplying components of the mobile vehicle device which require power, a position-determining device 12, which comprises a GNSS receiver 12a with a GNSS receiving antenna 12b for receiving data of a global navigation satellite system (GNSS) and a mobile radio transceiver 13 with a mobile radio transceiver antenna 13b.

The data memory 16 is a read-only memory 16, for example a ROM, EEPROM and/or a flash memory and serves to store a computer program product according to some embodiments for booking and canceling use authorizations for freeway sections which have an obligatory toll (toll software) in addition to the data records which describe the freeway sections on the basis of their detection objects for each possible use status (possible imminent use, confirmed use, confirmed non-use) (operating data). The toll software or one of its updates can be input into the read-only memory 16 via corresponding communication interfaces of the mobile device 10, for example via the mobile radio transceiver 13.

The data memory 17 is a read-write memory, for example a RAM, and serves for temporarily recording at least the toll software during the operation of the mobile device. For this purpose, the processor 11 loads the toll software from the read-only memory 16 into the read-write memory 17 in the starting phase of the mobile device 10. In addition, the read-write memory 17 serves during the execution of the toll software temporarily for recording position-related data which are received by the position-determining device 12 from the processor 11.

The data memory 18 is a cryptographic data memory 18, for example a ROM, EEPROM and/or RAM. The cryptographic data memory 18 can be included in a security module with a stand-alone processor (not illustrated). An example of such a security module is a smart card, for example the SIM card of a mobile radio device. The data memory 18 serves to record booking data records of use authorizations for the possible use of available freeway sections.

Instead of the mobile radio transceiver 13 or in addition thereto, in this first exemplary embodiment a vehicle-side DSRC transceiver 13 is provided with a DSRC transceiver antenna 13b in order to carry out (FIG. 7a) a short-range (DSRC=dedicated short-range communication) wireless communication 28 with road-side DSRC transceivers 27 of road-side checking devices 25 instead of or in addition to the long-range wireless communication via the mobile radio network. In this context, none of the specified antennas 12b and 13b has to be integrated in the mobile vehicle device 10. In order to improve the communication and/or the reception, they can also be arranged outside the mobile vehicle device 10, and can be mounted, for example, on the inside of the front windshield or on the outside of the vehicle 50, as illustrated in FIG. 7a.

The GNSS receiver 12 serves as a position-determining device according to some embodiments. It is implemented as a GPS receiver 12 which receives signals which can be used for determining positions, from GPS satellites 12c of a global position-determining system (Global Positioning System, GPS) (FIGS. 7a, 7b, 7c).

The plan view of a vehicle device 10 as a mobile device is illustrated in FIG. 6b. Such a vehicle device can be portable in that, so that it can be taken out of a holder again, it is fastened in a holder on the windshield of the vehicle 50 too. It can alternatively be permanently installed in the vehicle 50. Before the vehicle starts, the driver of the vehicle has switched on by activating the switch 19b from the OFF position into the ON position. The vehicle data with respect to which the vehicle device 10 was initialized are displayed on the LCD screen 15: the vehicle type TYP=3 (truck) the number of axles AXL which is greater than 4, the pollutant class PCL=5 and in addition the vehicle license plate number B-TC 123 are displayed as an identification feature of the vehicle 50 which the vehicle carries with it, visibly from the outside, on its license plate 51 (FIG. 7a).

In the position A on the B 631 (FIG. 2a), the display of the vehicle device 10 is still empty, with the exception of the caption of the first (upper) line and the symbols of the first (left-hand) column. Owing to the great distance of the vehicle from the A 79, the vehicle device has still not detected any route sections with obligatory tolls. It is typical of one or more embodiments of the invention that in a first data detection phase, first position-related data of the vehicle are detected by the processor 11 of the vehicle device 10 in that the processor 11 receives current first position data of the vehicle 50 from the GPS module 12 every second (S 100 in FIG. 1a). For this purpose, the processor 11 executes the toll software which contains an instruction to receive the first position data. The toll software also has all the means which enable the processor 11 to execute the further steps.

As a result of a comparison of the first position data with the operating data of the route section with obligatory tolls, the processor 11 checks whether one or more of the received first position data are related to one or more route sections with respect to a possible imminent use (S200). In a negative case, the detection of first position-related data according to S 100 is continued, followed by a renewed association attempt S 200. An association attempt S 200 leads, in a first association phase, to success if the first position data of the vehicle are below a specific distance from the access slip road 791 to the A 79 (FIG. 2a). The association of the first position data with the possible imminent use of the freeway section 7901 by the vehicle 50 occurs using position data of the vehicle 50 which is moving toward the connection point 791, which position data lie, on the one hand, outside the detection circle 791*a* and, on the other hand, inside the detection circle 791*a* for the possible imminent use of the freeway section 7901. By means of comparison of a smoothed driving line of the vehicle 50, formed from the first position data, with the location coordinates of the detection circle 791*a*, the processor 11 detects that the driving line of the vehicle 50 intersects the detection circle 791*a* from the outside to the inside. This result is associated by the processor 11 with a possible imminent use of the freeway section 7901 by the vehicle 50. Given a lack of first position data outside the detection circle 791*a*, for example because the vehicle 50 has been towed into the area within the detection circle 791*a* with the vehicle device switched off, the processor can also associate an individual location information item of the vehicle within the detection circle 791*a* with the possible imminent use of the freeway section 7901 by the vehicle 50. Owing to this association, the processor 11 generates a booking data record which contains a time signal, received from the clock 14, in the form of a booking time data element, the initialized vehicle license plate number B-TC 123 in the form of a vehicle data element and the freeway section 7901 in the form of a route section data element and the toll in the form of a toll data element. In addition, the toll-relevant vehicle parameters can be contained in the booking data record for immediate checking purposes, as well as a booking status data element which represents the fact that the booking is provisional. This booking data record is stored by the processor 11 in an encrypted form in the cryptographic data memory 18. As a result, a use authorization, relating to the vehicle 50, for the associated route section 7901 has been booked (S 300 in FIG. 1*a*).

The booking phase is therefore terminated at a sufficient distance from the connection point 791 at the position B of the vehicle. Correspondingly, a toll of 1.22 euros is displayed on the display device 15 of the vehicle device 10 (FIG. 6*b*) for the freeway segment 7901 which is characterized by a simple upwardly directed arrow and lies ahead in the direction of travel, and the booked use authorization is confirmed by a circle in the AUT column (authorization). There is no use authorization necessary at the current position on line 1 after the header of the table (characterized by the circle in the column LOC (location)) because of the freedom from tolls, with the result that neither tolls nor authorization occur. The tolls are already displayed on lines 4 and 5 for further segments 7903 and 7905 which lie ahead after the segment 7901 in the direction of travel, associated with the indication, characterized by a circle, that a use authorization for these segments is not yet present. In the read-only memory 16 there are for this purpose corresponding following segments for each segment in the direction of travel and the corresponding opposing segment in the opposite direction. There is currently no obligatory toll in the opposite direction from the current position, characterized by a downwardly directed arrow on line 3; this line therefore remains empty. This information is displayed by a vehicle device 10 at the vehicle position B in a usual operating state.

FIG. 6*c* shows the vehicle device at the vehicle position B in an unusual operating state. In this context, in the course of the detection of first position-related data it has been stated that the vehicle has crossed an inner detection circle 791*b* while approaching the connection point 791 for the freeway 79, without a booked use authorization being present in the cryptographic data memory. This malfunction can have a number of causes: temporary loss of GPS reception, the incorrect use of non-updated operating data or else the fact that the residual toll credit which has been paid in advance and which is carried along on a smart card in the vehicle device 10 fails to cover the toll in question. At the vehicle position B, the vehicle device 10 already assumes in advance at the following vehicle positions according to its display 15 that the vehicle is already located at the section 7901 of the freeway A 79. Since the processor 11 cannot determine a presence of a use authorization for this section, it triggers an alarm signal which causes an LED 15*a* to light up and a loudspeaker 15*b* to emit a warning sound. The warning should preferably be given in such good time that the driver still has the possibility of avoiding traveling on the section 7901 and the connection point 791.

Owing to the assumed correct booking, from now on second position-related data of the vehicle are detected in a second data detection phase by the processor 11 of the vehicle device 10 in that the processor 11 receives current section position data of the vehicle 50 from the GPS module 12 every second (S 400 in FIG. 1*a*). By means of a comparison of the second position data with the operating data of the route sections with obligatory tolls, the processor 11 checks whether one or more of the received first position data are related to the booked route section 7091 with respect to a confirmed use (this case is explained in more detail in the second exemplary embodiment) or a confirmed non-use of a (S 500). In the negative case, for example at the position C of the vehicle 50 in FIG. 2*a*, the detection of first position-related data according to S 400 is continued, followed by a renewed association attempt S 500. An association attempt S 500 then leads in a second association phase to success if the second position data of the vehicle are above a specific distance from the access slip road 791 to the A 79 (FIG. 2*a*). The association of the second position data with the confirmed non-use of the freeway section 7901 by the vehicle 50 occurs using position data of the vehicle 50 which is moving away from the connection point 791, which position data lie, on the one hand, within the detection circle 791*s* and, on the other hand, outside the detection circle 791*s* for the confirmed non-use of the freeway section 7901. By comparing a smoothed driving line, formed from the first position data, of the vehicle 50 with the location coordinates of the easterly quadrant of the detection circle 7901, the processor 11 detects that the driving line of the vehicle 50 intersects the detection circle 791*s* in its easterly quadrant from the inside to the outside (position D of the vehicle 50 in FIG. 2*a*). This result is associated by the processor 11 with a confirmed non-use of the freeway section 7901 by the vehicle 50. Given a lack of second position data within the detection circle 791*s*—for example because the vehicle 50 was towed, with the vehicle device switched off, into the area composed of the detection circle 791*s* outside the detection circle 791*s*, the processor can also associate an individual location information item of the vehicle outside the detection circle 791*a* with the confirmed non-use of the freeway section 7901 by the vehicle 50 as long as the vehicle position here is not too far from the easterly quadrant of the detection circle 791*s*. Owing to this association, the processor 11 generates a cancelation data record which contains a time signal, received by the clock 14, in the form of a cancelation time data element, the initialized vehicle license plate number B-TC 123 in the form of vehicle data element and the freeway section 7901 in the form of a road section data element and the toll in the form of a toll data element. This cancelation data record is stored by the processor 11 in encrypted form in the cryptographic data memory 18. A use authorization, relating to the vehicle 50, for the associated route section 7901 has therefore been canceled (S 600 in FIG. 1a). An alternative or cumulative possibility of cancelation is simply to delete the booking data record for the route section 7901.

If cancelation of the booking does not occur until the booking of a subsequent route section, the provisional status of the preceding booking is deleted with the following booking, and the use authorization counts as having been taken up and the booked route as used. If there is no booking status present in the booking data record, the cancelation of the earlier booking data record is excluded with the recording of a later booking data record and the use authorization counts as having been taken up, and the booked route as used. On the other hand, as a rule the association of the second position-related data with a confirmed use of the booked freeway section causes the provisional status of the booking to be deleted and/or replaced by a definitive status. For bookings which are confirmed in this way, the cryptographic data memory 18 can have a separate toll set memory area into which toll data records of confirmed bookings are transferred. When a specific number of toll data records or a specific toll volume is reached or after a specific time period since the last transmission is exceeded, these toll data records can be transmitted to a toll control center for billing via a mobile radio interface of the vehicle device. Alternatively or cumulatively, the toll fees of confirmed bookings can be debited from a smart card which is held in the vehicle device and which contains a toll credit which is paid out at a flat rate. Unconfirmed bookings can also lead to debiting of the corresponding tolls from the smart card if the cancelation of the corresponding route section ensures a corresponding credit on the smart card.

FIG. 7a shows how the vehicle 50 travels on the section 7901 of the freeway as an alternative to the route illustrated in FIG. 2a. The corresponding use authorization for this is present in the cryptographic memory 18 of its vehicle device 10. An image of the license plate 51 of the vehicle 50 is recorded by means of an image recording and evaluating device 26 at a checking bridge 25, and said image is evaluated in order to acquire the vehicle license plate number B-TC 123 by means of a license plate number recognition program. In addition, a signal for setting up a communication link 28 to the vehicle device 10 via the vehicle-side DSRC transceiver device 13 thereof is transmitted by a road-side DSRC transceiver device 27 which is mounted on the checking bridge 25. Within the scope of this communication link 28, the image recording and evaluating device 26 interrogates the vehicle device 10 to determine whether a use authorization is present in it for the detected vehicle license plate number. For this purpose, the processor 11 of the vehicle device 10 reads the booking data record from the cryptographic memory 18 and transmits it to the vehicle-side DSRC transceiver device 13 for transmission to the road-side image recording and evaluating device 26. If a processor of the image recording and evaluating device 26 detects correspondence, by means of a comparison of the recorded vehicle data and the transmitted vehicle data in conjunction with the transmitted route sections data, correspondence for the checked route section 7901, the control counts as successful. As a result, the image recorded by the vehicle, the determined license plate number and the protocol of the DSRC data communication 28 are deleted from the data memory of the image recording and evaluating device 26.

In the event of a negative checking result, there is a data link from the checking bridge 25 to a central data processing device 200 of a toll operator 20, which data link receives the image of the vehicle of the toll dodger from the image recording and evaluating device 26 in order to initiate proceedings regarding the committing of an offense.

Second Exemplary Embodiment

The second and the following exemplary embodiments illustrate both the suitability of the products according to some embodiments for carrying out the method according to some embodiments and the methods according to some embodiments in various embodiments.

FIGS. 1b, 2b, 6a, 6d, 7b and 8a serve to explain the second exemplary embodiment.

According to the route of the second exemplary embodiment (FIG. 2b), a driver approaches, as in the first exemplary embodiment, the start of the four-lane freeway A 79 from the south on the two-lane federal highway B 631, with his vehicle 50 (FIG. 7b).

In order to determine positions, the driver carries a navigation device 10 (FIG. 6d) with him, the principle design of which is illustrated schematically in FIG. 6a and has already been explained in the first exemplary embodiment. As a result of the presence of a mobile radio transceiver 13, the navigation device 10 is embodied as a mobile radio device. The processor 11 of the navigation device 10 executes position detection and transmission software which is designed to receive position-related data, updated periodically every second, from the GPS receiver 12 and to transmit it to the mobile radio transceiver 13 for transmission every second of position data of the navigation device 10 to the switching central data processing device 300 of a toll switching point 30. In this respect, the navigation device is embodied as a thin client because it lacks the means for associating the position data with a traffic area which is subject to tolls. This is left to the switching central data processing device 300 of the toll switching point 30.

For the reception of the position data of the navigation device 10, the switching central data processing device 300 enters into communication with a switching point 45 of a mobile radio network which itself makes available that base station of the base stations 41 and/or 42 to build up and to maintain a communication link, at least for a certain time, between the navigation device 10 and the switching central data processing device 300, which permits the qualitatively most high value radio link 41a to the navigation device 10 in the cell zones assigned to the base stations 41 and 42.

A toll switching program according to some embodiments is executed at the switching central data processing device 300 of the toll switching point 30, which toll switching program instructs a processor 311 of a toll switching server 310 of the central data processing device 300 (a) to receive and detect every second first position-related data of the navigation device 10 by receiving a first message which is transmitted from the navigation device into a mobile radio network to the switching central data processing device and which contains the first position-related data (S 100 in FIGS. 1a) and (b) to check the first position-related data of the navigation device 10 with respect to association with a possible imminent use of at least a first freeway section which is subject to tolls (S 200 in FIG. 1a). As long as association with a first freeway section which is subject to tolls is not possible, the reception of first position data of the navigation device 10 is continued.

Detection lines which, in a specific distance region from the connection point of the freeway section, intersect in each case each road which leads toward or away from the connection point, also the freeway section itself, are used by the switching central data processing device 300 as detection objects which switch the association of position data with one or more freeway sections. These detection lines have a first pair of location coordinates as a first end point of the detection line and a second pair of location coordinates as a second end point of the detection line and are stored as such together with the freeway sections to which they are assigned, in the data memory 312 of the toll switching server 310. The detection lines are conceived as in each case a straight line between their two end points. They are indicated as dotted lines in FIG. 2*b*-FIG. 5 and can be conceived as a virtual registration gate across the access roads of the respective connection point.

If the switching central data processing device 300 can determine an intersection point with one of the detection lines for a smoothed driving line of the vehicle 50 which is formed from a plurality of successive first positions of the navigation device 10, and therefore also of the vehicle 50, the freeway section which is linked to the detection line counts as being associated successfully with the first position data of the vehicle 50. This happens if the vehicle 50 crosses the detection line lying between the positions A and B on the federal highway B 631 (FIG. 2*b*).

In this successful case, the toll switching program instructs (c) the processor 311 of the switching central data processing device 300 to carry out the transmission of at least one request for booking a first use authorization and/or collecting a first toll for the freeway section 7901 to a first central data processing device 200 which is made available by a first toll control center 20. If the switching central data processing device 300 were to detect that the associated traffic area or one of the associated traffic areas is allocated to another toll control center 20' for the collection of tolls, for example because a plurality of associated traffic areas lie in two or more different operator areas, the computer program would instruct the processor of the switching central data processing device 300 to carry out the transmission of at least one request for booking a first use authorization and/or collecting a first toll for the first traffic area which is subject to tolls to a second central data processing device 200' which is provided by the other, second toll control center 20'. The first central data processing device 200 or the second data processing device 200' are configured to receive a booking request or toll collection request for the first traffic area which is subject to tolls from the switching central data processing device 300.

Having arrived at the position B, a use authorization for the freeway section 7901 is registered for the vehicle 50 in the first central data processing device 200 (FIG. 2*c*, S 300 in FIG. 1*a*). By means of the registration which has taken place, the first central data processing device 200 transmits a booking confirmation message to the switching central data processing device 300, which booking confirmation message passes on the switching central data processing device 300 to the navigation device 10 via the mobile radio link 41*a*. This booking confirmation communicates to the driver that satisfactory use of the freeway section 7901 is possible. He then drives with his vehicle 50 to the connection point 791 to the route section 7901 of the freeway 79. His navigation device 10 periodically transmits second position data to the switching central data processing device 300 since the reception of the booking confirmation.

The toll switching program continues to be executed in order to instruct the processor 311 of a toll switching server 310 of the central data processing device 300 to receive every second (d) the second position-related data of the navigation device 10 by the reception of a second message, which is transmitted by the navigation device 10 into the mobile radio network to the switching central data processing device 300, which message contains the second position-related data. (S 400 in FIGS. 1*a*) and (*e*) to check the first position-related data of the navigation device 10 with respect to association with a non-use of the booked freeway section 7901 (S 500 in FIG. 1*a*). However, since the vehicle has entered this freeway section, such position data do not occur. The process according to FIG. 1*a* is therefore aborted in step S500 and therefore counts as not according to some embodiments for the booked freeway section 7901 which is not canceled.

Instead, the toll switching program evaluates the transmitted second position data of the first process also as first position data of a second process, following the first process, for the booking of a further use authorization for the next freeway section. A flowchart of this second process is represented in FIG. 1*b* and shows with S 100 in FIG. 1*b* the detection of the first position-related data by the switching central data processing device 300 which it receives from the navigation device 10 which is traveling with the vehicle on the route section 7901 of the freeway 79 (position C in FIG. 2*b*).

If the vehicle 50 is already traveling toward a checking bridge 25 at the position C (FIG. 7*b*), an image is taken of the license plate number 51 of the vehicle 50 by means of an image recording and evaluating device 26 of the checking bridge and is evaluated in order to acquire the vehicle license plate number B-TC 123 by means of a license plate recognition program. The vehicle license plate number is combined as a vehicle identification data element together with the freeway section 7903 as a traffic area data element to form a checking data record with which the image recording and evaluating device 26 makes a booking enquiry to the booking server 210 of the toll control center 20. This enquiry can be taken up by the booking web service. A checking program of the first central data processing device can determine, by means of a comparison of the checking data with the booking data in the booking data memory area, whether the use authorization is present for the vehicle 50 for the section 7903. In both the positive and negative cases the booking server transmits back a corresponding message to the image recording and evaluating device 26 of the checking bridge 25. In the case of a use authorization (positive checking result) being present, the image which is recorded by the vehicle, the determined license plate number and the protocol of the DSRC data communication 28 are deleted from the data memory for the image recording and evaluating device 26.

For the case of a lack of use authorization (negative checking result), there is a data link from the checking bridge 25 to the central data processing device 200 of the toll control center 20 which receives, from the image recording and evaluating device 26, the image of the vehicle of the toll dodger for the initialization of proceedings with respect to the committing of an offense.

For first position data, which correspond to two positions of the vehicle 50 on opposite sides of the detection line between the positions C and D, the toll switching program determines two freeway sections which are available for possible use, specifically the freeway section 7903 which directly follows the freeway section 7901 in the direction of travel, and the freeway section 7902 which forms the opposite roadway of the freeway section 7901 which is being used (S 201 in FIG. 1*b*). Both freeway sections 7902 and 7903 can be traveled on directly from the connection point 792, toward which the vehicle moves on the freeway section 7901. For both freeway sections 7902 and 7903, the toll switching program brings about the transmission of a booking request from the switching central processing device 300 to the first central data processing device 200.

Figure 8:
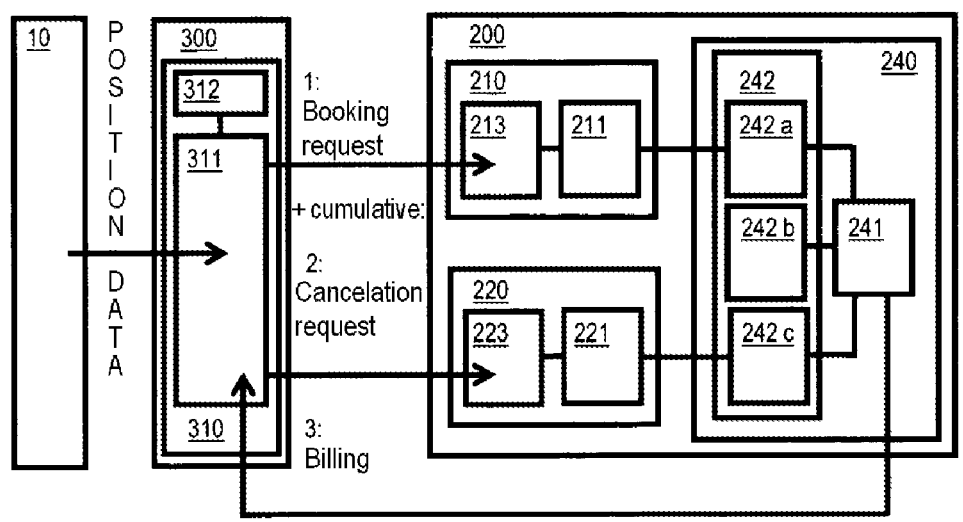
FIG. 8a shows the schematic illustration of a first data processing device 200 according to some embodiments, of a first control center 20 in the toll collection system of the second exemplary embodiment.
FIG. 8b shows the schematic illustration of a second data processing device 200 according to some embodiments, of a first control center 20 in the toll collection system of the third exemplary embodiment.
FIG. 8c shows the schematic illustration of a variant of the second data processing device 200 according to some embodiments, of a first control center 20 in a variant of the toll collection system of the third exemplary embodiment.
Figure 8:
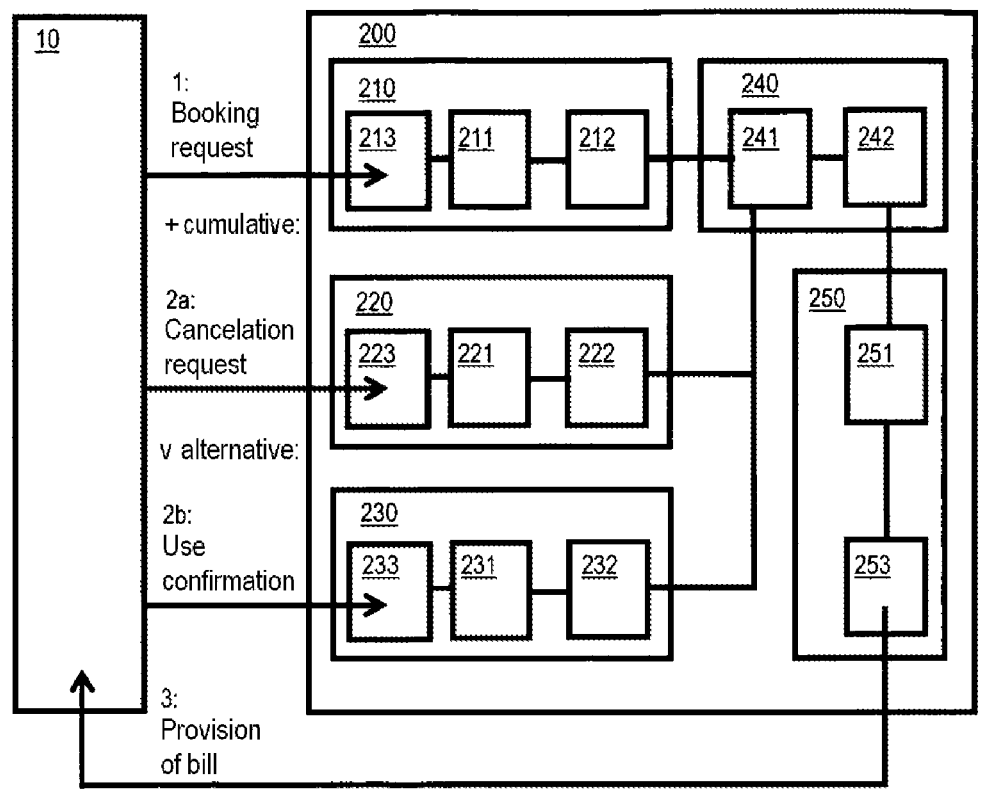
Figure 8:
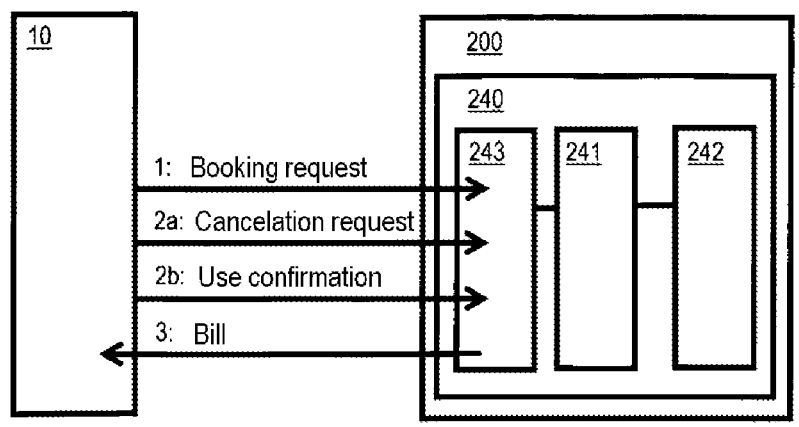

The central data processing device 200 according to FIG. 8*a* has a booking server 210, a cancelation server 220 and a consolidation server 240. The booking server 210 has a booking processor 211 and a booking web service 213 as an interface for the reception of booking requests by the toll switching point 30. The cancelation server 220 has a cancelation processor 221 and a cancelation web service 223 as an interface for the reception of cancellation requests by the toll switching point 30. The embodiment of the interfaces of the booking and cancelation servers 210 and 220 as web services 213 and 223 is suitable for a large number of enquiries by a multiplicity of toll switching points 30. In an extreme case, the number of toll switching points 30 corresponds to the number of navigation devices 10 in circulation.

The booking request for use authorizations of the freeway sections 7902 and 7903 to the booking web service 213 are processed by the booking processor 211 in that said booking processor 211 stores a first use authorization data record, relating to the vehicle 50, for the freeway section 7902 and a second use authorization data record, relating to the vehicle 50, for the freeway section 7903 in a booking memory area 242*a* of the data memory 242 of the consolidation server 240 (S 301 of FIG. 1*b*). The first and the second use authorization data records are linked to one another by means of an identical booking time data element, which makes it possible to track the relationship between the bookings.

A booking confirmation message for the two freeway sections 7902 and 7903 is fed back to the toll switching point 30 from the booking processor 211 via the booking web service 213, which toll switching point 30 transmits said booking confirmation message to the navigation device. At the position D in FIG. 2*b*, a display as illustrated in the plan view of the navigation device 10 in FIG. 6*d*, is presented to the driver on his navigation device 10. The vertically oriented rectangles as route sections of the freeway with the corresponding designations can be seen in the OLED display 15. A use authorization of the respective route section for the vehicle 50 is present in the toll control center 20 for rectangles which are colored black, and for rectangles which are kept white in content there is no use authorization of the respective route section present for the vehicle 50 in the toll control center 20. The white ellipse on the route section 7901 indicates the current position of the vehicle 50. The displaying of this information indicates to the driver that at the following connection point 792 (FIG. 2*b*), he is authorized to carry on driving on the following route section 7903 or alternatively to turn and use the route section 7902 for a return journey in the opposite direction.

Since the reception of the booking confirmation for the route sections 7902 and 7903 by the toll control center 20, the toll switching program of the toll switching point 30 interprets the position data received by the navigation device 10 as second position data corresponding to the step S400 in FIG. 1*b*. As long as the toll switching program cannot detect an intersection point of a driving line of the vehicle with a detection line which can be reached subsequently from the position D, the detection of second position data by the central switching data processing device 300 is continued.

According to the route profile illustrated in FIG. 2*b*, the driver decides, at the connection point 7902, to continue his journey in the original direction of travel on the freeway section 7903 (position E). The position data which are transmitted between the positions E and F to the central switching data processing device 300 have second position data of the vehicle 50 for which the toll determining program detects crossing of the collection line arranged between the positions E and F. Crossing of this detection line is interpreted by the toll determining program on the basis of the freeway section data records available to it as a confirmation of the use of the freeway section 7903 (S 502 in FIG. 1*b*). The alternative possibility of use of the freeway section 7902, instead of which the freeway section 7903 was used, is interpreted by the toll switching program as a cancelation requirement of the use authorization for the unused section 7902.

As a result, the toll switching program instructs the switching central data processing device 300 to direct a cancelation request to the cancelation web service 223 of the cancelation server 220 of the central data processing device 200 of the responsible toll point 200 (FIG. 8*a*). The cancelation request for the use authorization of the freeway section 7902 to the cancelation web service 223 is processed by the cancelation processor 221 in that it stores a cancelation data record, relating to the vehicle 50, for the freeway section 7902 in a cancellation memory area 242*b* of the data memory 242 of the consolidation server 240 (S 602 of FIG. 1*b*).

By means of the consolidation processor 241, the consolidation server 240 accesses the booking memory area 242*a* and the cancelation memory area 242*b* of the data memory 242 periodically or on an event-controlled basis in order to compare use authorization data records (abbreviated as booking data records) with cancelation data records which have the same vehicle identification data element and the same freeway section data element. In the course of this comparison, the consolidation server 240 extracts the booking data record of the used freeway section 7903, which is linked to the booking data record of the canceled freeway section 7902. Said booking data record of the used freeway section 7903 is provided with a toll and stored in the use memory area 242*c* for the toll data records for which the use of a freeway section counts as confirmed. The consolidation server 240 calls periodically or on an event-controlled basis the collected toll data records, relating to the vehicle 50, from the use memory area 242*c* in order to debit the sum of the tolls either directly from an account of the vehicle keeper or user or, as illustrated in FIG. 8*a*, to bill them from the toll switching point 30 by a transmission to the toll switching processor 311 or another payment data processor (not illustrated) of the toll switching point 30. In the event of the toll switching point 30 being included in the mobile radio control center of a mobile radio operator administration or in the control center of a manufacturer of the navigation device 10, or connected thereto, the mobile radio operator/manufacturer can debit the received toll amount from the account of the navigation device owner which is linked to the mobile radio number of the navigation device 10 and stored in a customer database, and pass on the bill to the navigation device owner who is as a rule identical to the driver.

After the association of the second position data of the vehicle 50, the switching central data processing device 300 checks whether the possible imminent use of a further section is connected to the confirmed use of the section 7903. This information can be obtained from a database in which traffic area collection data records are stored and which links a traffic area data element B, whose use has been confirmed, to further traffic area data elements V1, . . . Vi which may be imminent with respect to a use owing to the use of the traffic area B. For the freeway section 7903 (confirmed use), these are the freeway sections 7904 and 7905 (possible imminent use, S 700 in FIG. 1*b*). For these sections 7904 and 7905, the switching central data processing device 300 transmits a booking request to the booking server 210 of the toll control center 20 (S301 in FIG. 1*b*).

Consequently, the second position data which have led to the detection of the use of the freeway section 7903 are to be evaluated according to some embodiments, with respect to the detection of a possible imminent use of the freeway sections 7904 and 7905, as first position data, for whose confirmation of a use and/or non-use of second position data of the vehicle 50 have to be acquired again.

If the vehicle exits the freeway A 79 at the connection point 792 on an alternative route (not illustrated), its path leads via one of the two detection lines toward the west and east of the connection point 792. If the second position data which are received by the toll switching point 30 cannot be associated with the use of the section 7903 or 7902, the toll switching program next checks whether the second position data can correspond to a distance of the vehicle from both booked sections 7902 and 7903 (without having traveled on them previously) (S 501 in FIG. 1*b*). This would be the case if a driving line of the vehicle which is derived from the second position data were to intersect one of the two detection lines to the east and west of the connection point 792. If this is the case, the toll switching program associates the second position data with a non-use of the first section 7902 and of the second section 7903. In this case, the switching central data processing device 300 makes a cancelation request to the cancelation server 220 of the toll control center for both sections 7902 and 7903 which the cancelation server correspondingly deals with by storing two cancelation data records in the cancelation memory area 242*c* of the data memory 242 of the consolidation server 240, which for its part nullifies the cancelations of the corresponding bookings with the cancelations by deleting the use authorizations for the sections 7902 and 7903 from the booking memory area 242*a*.

On the freeway section 7903, the vehicle 50 passes under a checking bridge 25 before the detection of the use of the freeway section by the switching central data processing device 300 has taken place, which checking bridge 25 records and evaluates an image of the vehicle 50 with an image recording and evaluating device 26 for the, in order to acquire the identification feature of the vehicle license plate number B-TC 123 from the recording of the license plate number 51 and to make an enquiry to the booking server 210 of the central data processing device 200 as to whether a use authorization for the section 7903 is present for the vehicle registered under the vehicle license plate number B-TC 123. Alternatively, the request can be made to a separate checking server (not illustrated) which has access to the booking memory area 242*a*. If the booking server or the checking server confirms the existence of the use authorization, all the data acquired and derived from the vehicle 50 by the image recording and evaluating device 26 are deleted by the checking bridge 25.

Third Exemplary Embodiment

FIGS. 2*c*, 6*a*, 6*e*, 7*c*, 8*b* and 8*c* serve to explain the third exemplary embodiment.

According to the route of the second exemplary embodiment (FIG. 2*c*), a driver approaches, as in the first and second exemplary embodiments, the start of the four-lane freeway A 79 from the south on the two-lane federal highway B 631, with his vehicle 50 (FIG. 7*c*).

In order to determine route sections which are subject to tolls and which relate to the position of the vehicle, the driver carries a mobile phone 10 (FIG. 6*c*) with him, the principle design of which is illustrated schematically in FIG. 6*a* and has already been explained in the first exemplary embodiment. The cryptographic data memory 18 is provided by means of a SIM card of the mobile radio provider. The mobile phone 10 is embodied as a mobile radio device through the presence of a mobile radio transceiver 13. The processor 11 of the mobile phone 11 executes position detection, association and interrogation software which is referred to as a "toll program", in English slang a "toll app", and which the user has downloaded from a central database, for example a sales point for programs (known in English jargon as an "app store") into the data read-only memory 16 of a mobile phone 10. The toll program comprises a route section database with route section data records of detection objects in the form of detection lines which are defined by in each case two end points with in each case two location coordinates (degrees longitude and degrees latitude) and one or more route sections which are subject to tolls in the form of a section number assigned in each case to the detection line. The route section which firstly follows the detection line in the route section data record is that for which the detection line represents an actual use; all the following route sections are route sections which are to be booked or canceled. In the case of detection lines outside route sections which are subject to tolls (for example those on federal highways), the first route section place in the route section data record remains empty. In the case of detection lines which serve only for the use confirmation, only the first route section place in the route section data record is occupied and the others are empty. A last data element in the route section data record can characterize a point 20 (toll operator 1) or 20' (toll operator 2) which is authorized to collect tolls for the respective detection line or the respective route section and whose URL for booking and/or canceling a use authorization for the respective route section is stored in a separate database (see FIG. 7*c*).

The processor 11 is enabled, through the execution of the toll program, to periodically receive position data, updated every second, from the GPS receiver 12 and to buffer them in the data read-write memory 17 in order to compare driving lines of the vehicle 50 which are derived from the position data of the mobile phone 10 with detection lines which are stored in the data read-only memory 16, to determine whether a point of intersection is present between the driving line and a detection line. If the position data can be associated in this way with a route section which is subject to tolls, the processor checks, by means of the toll program, whether the driving line intersects the detection line in a positive direction of travel toward the route section or in a negative direction of travel away from the route section. This can be determined easily on the basis of a convention which conceives of the detection line as a vector from the first end point to the second end point, and of the driving line as a vector from the older driving position A to the more recent driving position B, on condition that for a positive direction of travel, an angle between the detection line vector and the driving line vector is between 0° and 180°, and for a negative direction of travel an angle between the detection line vector and the driving line vector is between 180° and 360°. The latter means that the driving line vector is rotated at an angle between 0° and 180° in the clockwise direction with respect to the detection line vector. For this purpose, the detection lines in FIG. 2c are illustrated as vectors which are oriented in the direction of travel toward a connection point 791, 792 or 793 of the freeway from the left-hand side to the right-hand side of the road.

The implementation of a routine for determining route sections, whether those for possible imminent use, those for confirmed use or those for confirmed non-use, from position data of the vehicle 50 on the mobile phone 10 makes the mobile phone 10 a "thick client" which takes over the association process from a central data processing device and executes it in a decentralized fashion in the vehicle 50.

First position data between the positions A and B correspond according to some embodiments to a positive direction of travel, the detection of which causes the toll program to direct a booking request, with the stipulation of a user identifier (for example of the vehicle license plate number) for the route section 7901 to the booking server 210 of a central data processing device 200 of a toll collection point 20 for the first route section 7901 which is subject to tolls, and which is associated with the first position data, via the mobile radio transceiver 13 under the web address, (for example the URL http://www.toll-collect.de/buchung/) of a booking web service 213 (FIG. 7c and FIG. 8b). If the toll program has determined another toll collection point 20', which would be authorized to collect tolls for the route section 7901 instead of the first-mentioned toll collection point 20, said toll collection point 20' would have selected the other booking web server which is provided by this toll collection point 20' at the central data processing device 200' thereof.

The booking request, which is made by the mobile phone 10 to the booking web service 213, is processed by the processor 211 of the booking server 210 and stored in the form of a booking data record for the route section 7901 which is assigned to the vehicle 50, as a use authorization in the the booking data memory 212 of the booking server. The processor 211 instructs the booking web service 213 subsequently to transmit a message about the confirmation of the booking of the use authorization to the mobile phone 10 or to make it available to be accepted by the mobile phone 10. The booking confirmation for the route section 7901 lying ahead is displayed to the driver by means of the TFT screen 15 by his mobile phone 10 at the vehicle position B so that he can travel onto the freeway 79 at the connection point 791 with a good conscience.

A booking confirmation which fails to occur, after the expiry of a certain period after the transmission of the booking request, causes the mobile phone to output an alarm signal by means of its loudspeaker 15b.

The mobile phone 10 detects second position data between the vehicle positions C and D, which second position data are associated with the use of the route section 7901 by the toll program. Said toll program subsequently transmits a use authorization message for the route section 7901 under its user identifier via a connection to http://www.toll-collect.de/nutzung/ to the use web service 233 of the use server 230 of the central data processing device 200. This message is stored by the use processor 231 of the use server 230 in the use data memory 232 as a use data record for the vehicle 50 on the route section 7901. Subsequently, the consolidation server 240 is requested to compare the vehicle-specific use data of the use data memory 232 with the vehicle-specific booking data of the booking data memory 211 and to store a toll data record, relating to the vehicle 50 and the route section 7901, in the toll data memory 242 of the consolidation server 240. In addition, the consolidation server 240 is requested a) to check for a cancelation requirement for further route sections which are booked together with the route section 7901, and b) for a booking requirement for new route sections which adjoin the route section 7901. As a result, the consolidation processor 241 of the consolidation server 240 detects that a) no cancelation is possible because in addition to the used route section 7901 no further route section has been booked, and b) there is a booking requirement for the route sections 7903 and 7902. For these two route sections, the consolidation processor subsequently produces corresponding use authorizations, relating to the vehicle 50, in the booking data memory 212. It subsequently instructs the use server 230 to transmit a booking confirmation for the two route sections 7903 and 7902 to the mobile phone 10. The second position data now count as new first position data with respect to the booking of new route sections, which is derived from the use confirmation.

At the position D, it is indicated to the driver on the TFT screen 15 of his mobile phone 10, as illustrated in FIG. 6e, that he is located on the route section 7901 and has a use authorization for said route section 7901. For the section 7903 which follows in the direction of travel he also has a use authorization, as he does for the section 7902 in the opposite direction. For the section 7905 which is subsequent to the section 7903 in the direction of travel he still does not have a use authorization. For the section 7907 which is the next but one to the section 7903 in the direction of travel he does not have a use authorization either.

With this information on the display 15 of his mobile phone 10, the driver knows that he is authorized to carry on driving at the connection point 792 on the section 7903. There he passes a checking bridge 25 which records and evaluates an image of the vehicle 50 with an image recording and evaluating device 26 for the, in order to acquire the identification feature of the vehicle license plate number B-TC 123 from the recording of the license plate 51 and to make a request to the consolidation server 240, which has access to the booking data memory 212, of the central data processing device 200 as to whether a use authorization, for the vehicle registered under the vehicle license plate number B-TC 123, is present for the section 7903. If the consolidation server 240 confirms the existence of the use authorization, all the data which are acquired and derived from the vehicle 50 by the image recording and evaluating device 26 are deleted from the checking bridge 25 and the booking data record of the section 7903 is consolidated to form a toll data record in the toll data memory 242. Furthermore, the checking data which are received by the checking bridge at the route section 7903 are interpreted by the consolidation server 240 a) as a request for cancellation of route sections booked in relation to the confirmed section 7903 for alternative use, and b) as a request for a use authorization for following route sections which are directly connected to the route section 7903. By accessing the booking data memory 212, the consolidation processor 241 determines that a booking of a use authorization for the route section 7902 is present, which booking is an alternative to the section 7903. For this section, the consolidation processor 241 enters a cancelation data record, relating to the vehicle 50, in the cancelation data memory 222 of the cancelation server 220. By interrogation in a route section database, which contains data records of route sections which are linked to one another, the consolidation processor detects a booking requirement for the route sections 7905 and 7904 and produces the associated booking data records, relating to the vehicle 50, in the booking data memory. The vehicle data which are transmitted to the toll collection point 20 by the checking bridge 25 are to be conceived of as being related to this booking process as first position-related data of the vehicle 50 because they connect the vehicle 50 to the position of the checking bridge.

A submission of these new use authorizations which are produced automatically by the central data processing device 200 can be triggered manually or automatically at any time by the mobile phone 10 via the booking web service 213 independently of a booking requirement which could arise from the association of first position-related data with route sections with respect to an imminent use, for example, requested at the position E. With a centrally initiated booking it is advantageously possible to prevent a lack of satellite signal reception of the GPS receiver 12 or a lack of a mobile radio communication link 41a in the course of the path followed by the vehicle 50.

On the section 7903, the driver realizes that he has passed the exit 792 which he actually wanted to use. He decides therefore to turn back to the connection point 793 and to travel back on the opposite roadway (section 7904) to the exit 792 (FIG. 2c). Since he also has a use authorization for this section 7904 as an alternative to the section 7905, his selection is legally unproblematic. His mobile phone 10 detects, on the way to the position F, the use of the section 7904 and signals this to the use server 230 (FIG. 8b). The central data processing device 200 consolidates the signaled use with the booking to form a toll data record, cancels the alternative section 7905 and books use authorizations for the sections 7902 and 7903 which it communicates to the mobile phone 10.

At the exit 792, the driver leaves the freeway A 79 onto a country road towards the west. On approaching the position G, the driving line derived from second position data of the vehicle 50 crosses the detection vector (a2-a1, b2-b1) between the location coordinates (a1, b1) of the point 1 and the location coordinates (a2, b2) of the point 2 which is contained in the route section data record (a1, b1, a2, b2, 0, 7902, 7903, 0, 0, 1) (FIG. 2c). The orientation of the direction of travel with respect to the detection vector yields a cancelation requirement for the unused booked sections 7902 and 7903. For these sections the mobile phone 10 makes a cancelation request to the cancelation web service 223 by calling the address http://www.toll-collect.de/stornierung/. Cancelation data records relating to the vehicle 50 are stored in the cancelation database 222 of the cancelation server 220 for the route sections 7902 and 7903. The consolidation processor 241 subsequently searches, in the booking database 212, for booking data records which match the cancelation data records and deletes said booking data records both from the cancelation database 222 and from the booking database 212 when their relatedness and plausibility have been detected. A cancelation confirmation is transmitted from the cancelation server 220 to the mobile phone 10 which correspondingly clears the display of the use authorizations in the TFT screen 15.

After the travel on a route with obligatory tolls has therefore come to an end for the driver, toll data records relating to the vehicle 50, for the route sections 7901, 7903 and 7904, are therefore present in the toll data memory 242. The computing processor 251 of a computing server 250 accesses the toll data memory in order to produce a bill in response to a request for billing under a user identifier for the vehicle 50 to the computing web service 253, and transmits the bill with a listing of all the route sections traveled on in the sequence of their use to the driver or vehicle keeper. The request for the submission of a bill can be made, as illustrated in FIG. 8b, from the mobile phone and/or by another data processing device (not illustrated).

For a variant of the third exemplary embodiment, another central data processing device 200 is shown in FIG. 8c, which data processing device 200 has just a single system web service 243 for receiving booking requests, cancelation requests, use confirmations and requests for billing, which system web service 243 is controlled by a system processor 241 of a system server 240. Use authorizations are booked by the system processor 241 with the storage of a use authorization data record together with a provisionality marker in the system memory 242. Cancelations are carried out by the system processor 241 by deleting the corresponding use authorization data record from the system memory 242. Use confirmations are registered by the system processor 241 by removing the provisionality marker in the corresponding use authorization data record in the system memory. Toll data records are produced for use authorization data records without a provisionality marker by the system processor 241 and stored in the system memory 242. The toll data records are compiled to form a bill on a user-specific basis.

A comparison with the central data processing device 200 from FIG. 8b shows that, in order to form a system web service 243 in FIG. 8c, the booking server 210, the cancelation server 220, the use server 230 and the computing server 250 can be integrated into the consolidation server 240 which forms the system server in such an integration, and provides a system web service 243 with the functionalities of the booking web service 213, of the cancelation web service 223, of the use web service 233 and of the computing web service 253, and a system memory 242 which comprises the data of the booking data memory 212, of the cancelation data memory 222 and alternatively or cumulatively with respect thereto, of the use data memory 232 individually and/or in a consolidated form as in the consolidation data memory 242 of FIG. 8b.

For the following exemplary embodiments, any of the mobile devices of the first exemplary embodiment (toll collection device 10), of the second exemplary embodiment (navigation device 10) or third exemplary embodiment (mobile phone 10) can be used in the corresponding system configuration (first exemplary embodiment: decentralized toll collection; second exemplary embodiment central toll collection with switching point for a thin client; third exemplary embodiment: central toll collection for a thick client) for collecting tolls.

Fourth Exemplary Embodiment

According to the route of the fourth exemplary embodiment (FIG. 3a), a driver approaches from the east, with his vehicle, a connection point 792 from which the freeway A 79 can optionally be traveled on in the southerly direction on the freeway section 7902, or in the northerly direction on the freeway section 7903.

A driving line which is derived from the first position data of the vehicle between the positions A and B is associated, via its intersection with a detection line which is linked to the freeway sections 7903 and 7902, with the freeway sections 7903 and 7902 with respect to a possible imminent use of these sections by the vehicle. For these sections 7903 and 7902, in each case a use authorization relating to the vehicle is booked, which use authorization is present at the moment at which the vehicle passes the position B. At the connection point 792, the driver crosses the freeway A 79 with his vehicle without traveling on said freeway.

A driving line which is derived from second position data of the vehicle between the positions C and D is associated, via its section with a detection line which is linked to the freeway sections 7903 and 7902, with the freeway sections 7903 and 7902 with respect to a confirmed non-use of these sections by the vehicle. The booked use authorizations are subsequently canceled for these sections 7903 and 7902.

Fifth Exemplary Embodiment

According to the route of the fifth exemplary embodiment (FIG. 3*b*), a driver approaches from the east a connection point 792 with his vehicle as in the fourth exemplary embodiment, from which connection point 792 the freeway A 79 can optionally be traveled on in a southerly direction on the freeway section 7902 or in a northerly direction on the freeway section 7903.

A driving line which is derived from the first position data of the vehicle between the positions A and B is associated, via its section with a detection line linked to the freeway sections 7903 and 7902, with the freeway sections 7903 and 7902 with respect to a possible imminent use of these sections by the vehicle. For these sections 7903 and 7902, in each case a use authorization relating to the vehicle is booked, said use authorization being present at the moment at which the vehicle passes the position B. At the connection point 792 the driver drives onto the freeway A 79 in the northerly direction using the section 7903.

A driving line which is derived from second position data of the vehicle between the positions C and D is associated, via its section with a detection line linked to the freeway section 7903, with the freeway section 7903 with respect to a confirmed use of this section by the vehicle. For the section 7902 which is booked as an alternative to the section 7903, the booked use authorization is subsequently canceled. In addition, the detection line is linked to a multiplicity of sections which can be traveled on with respect to an imminent use subject to the section 7903. However, the sections 7905 and 7907 which follow in the direction of travel are so short that a use identifier and detection of further sections which follow in the direction of travel and are subject to possible imminent use does not permit booking of a use authorization for these sections in good time. The same applies to the sections 7906 and 7908 lying in the opposite direction. For this reason, the crossing of the detection line between the positions C and D is associated with a booking requirement for the sections 7904, 7905, 7906, 7907, 7908 and 7909 and the booking of the use authorizations for these sections is completed. Collection gaps, which can occur on the short sections, are therefore prevented at a decentralized location.

At the connection point 794, the driver leaves the freeway after he has traveled on the section 7905. In the course of passing the detection line between the vehicle positions E and F, a comparison of sections 7904, 7905, 7906, 7907, 7908 and 7909 which are linked to this detection line is made with the booking data record produced last for use authorizations 7904, 7905, 7906, 7907, 7908 and 7909 and the use confirmed last of the section 7903 using an algorithm which takes into account, for this second detection line and the previously passed first detection line, the arrangement of the sections with respect to one another and in relation to the respective detection line. As a result of this comparison, it is clear that starting from the first detection line on the section 7903 the driver can only proceed and pass through the second detection line in a direction of travel which leads away from the connection point if said driver has previously used the section 7905—and only the section 7905. The use confirmation which relates to the section 7905 is compared by a processor with the booked use authorizations and results in cancelation of the use authorizations for all the sections 7904, 7906, 7907, 7908 and 7909 booked last, with the exception of the section 7905.

Sixth Exemplary Embodiment

The sixth exemplary embodiment illustrates with reference to FIG. 3*c* a booking and cancelation scenario for the case in which the driver does not leave his route on the freeway A 79 at the connection point 794 but rather carries on on the freeway A 79 in the direction of the freeway intersection between A 79 and A 78.

At the position B, after the passage through the first detection line at the section 7903 between the vehicle positions A and B, the booking confirmation for the section 7903 and the preventively booked use authorizations for the sections 7904, 7905, 7906, 7907, 7908 and 7909 are present. The second detection line, directly following the freeway intersection in the direction of travel, between the connection point 795 and the vehicle position C corresponds to a use confirmation for the section 7909. The comparison with the constellation of the sections at the first detection line of the bookings made last reveals that after the use of the section 7903, the sections 7905 and 7907 have to be traveled on in order to arrive at the section 7909 which is directly confirmed with respect to use. The use of the sections 7905 and 7907 is therefore directly confirmed and results in a cancelation of the sections 7904, 7906 and 7908 which have in this respect been demonstrably not traveled on.

Seventh Exemplary Embodiment

Figure 4:
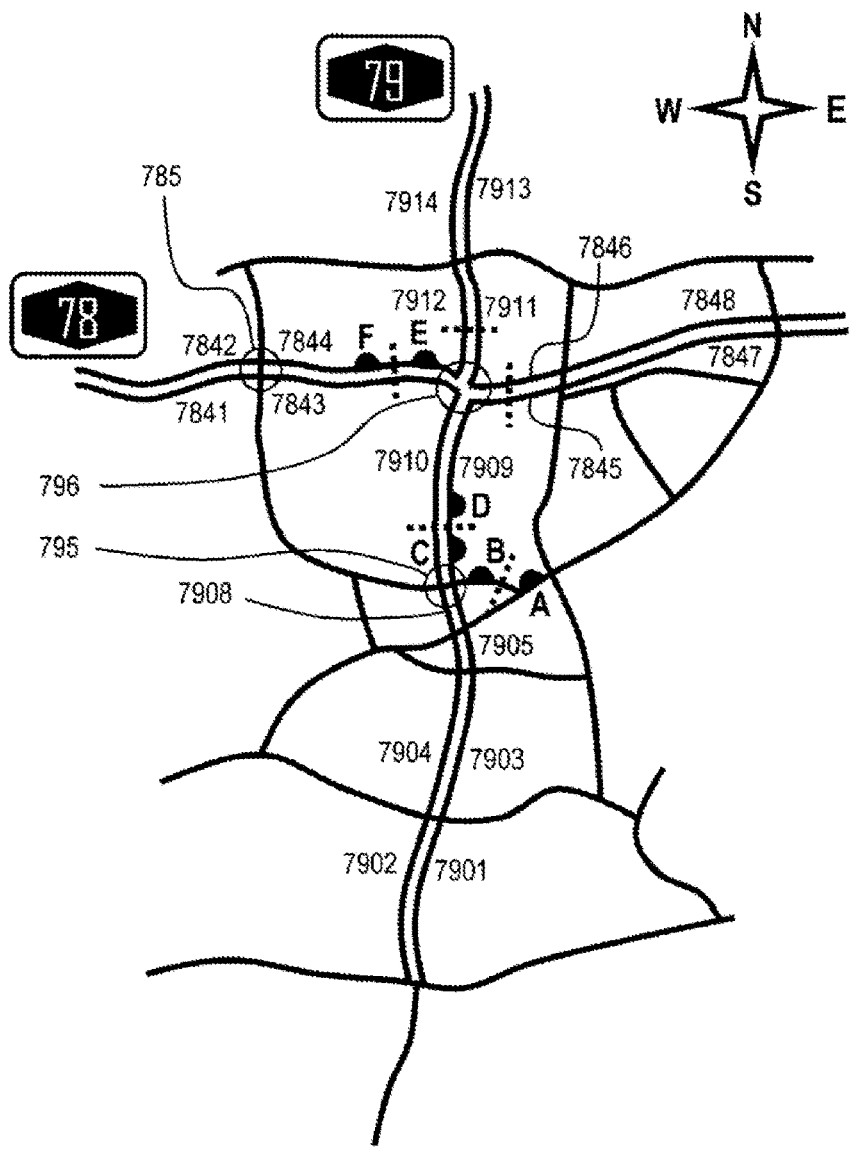
FIG. 4 shows a seventh map in which the profile of a seventh route of a vehicle in a seventh exemplary embodiment is illustrated.

The seventh exemplary embodiment illustrates with reference to FIG. 4 a booking and cancelation scenario in the course of the passage through a freeway intersection, formed in this case by the intersection of the freeways A 79 and A 78, which is constructed in such a way that a driver can travel onward or back from any direction (N, S, W, E) and in any direction (N, S, W, E).

The driver drives at the connection point 795 onto the freeway 79 in a northerly direction by traveling on the section 7909 with authorization because previously, as a result of passing through the detection line between the positions A and B, a use authorization for the section 7909 in the northerly direction of travel and for the section 7908 in the southerly direction of travel was booked. The use of the section 7909 is confirmed by the passage through the detection line between the positions C and D, which leads to cancelation of the use authorization of the alternatively usable section 7908, and entails booking of use authorizations for further freeway sections which can be traveled on starting from section 7909. These are the section 7911 in a northerly direction of travel on the A 79, the section 7910 in the southerly opposing direction of travel to the section 7909, the section 7845 on the A 78 in the easterly direction of travel, and the section 7844 in the westerly direction of travel on the A 78. At the freeway intersection, the driver leaves the A 79 and continues driving on the A 78 in a westerly direction using the section 7844. The use of this section is confirmed by the passage through the detection line between the positions E and F. In the course of this use confirmation, the cancelation of the three alternatively usable, but unused, sections 7910, 7911 and 7845 is carried out.

Eighth Exemplary Embodiment

Figure 5:
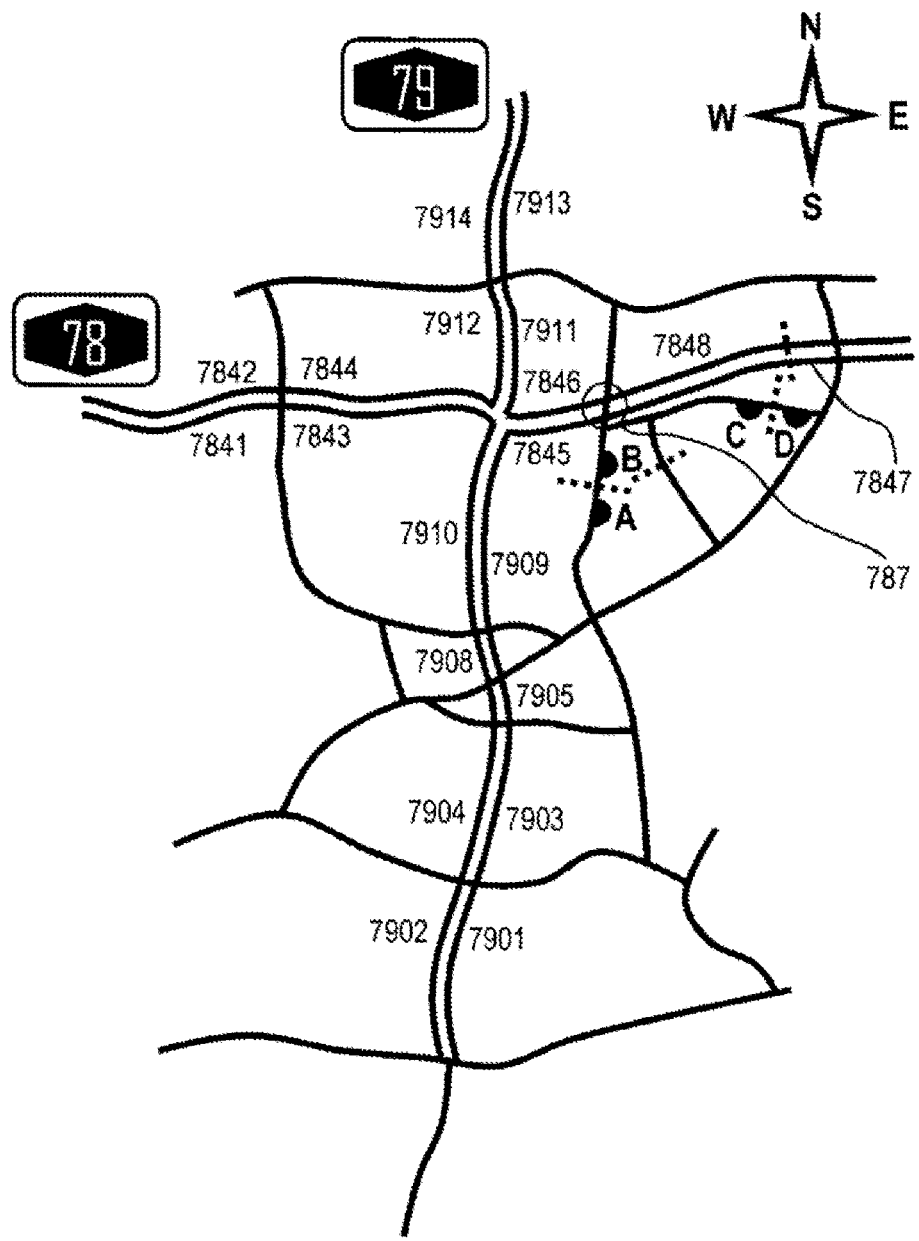
FIG. 5 shows an eighth map in which the profile of an eighth route of a vehicle in an eighth exemplary embodiment is illustrated.

The eighth exemplary embodiment illustrates with reference to FIG. 5 a booking and cancelation scenario in the course of partial parallel travel with respect to a route section with obligatory tolls on a road which does not have obligatory tolls: the driver approaches with his vehicle from the south the connection point 787 of the freeway A 79 on a toll-free road. The passage through the detection line between the positions A and B brings about a booking of use authorizations for the sections 7846 in the westerly direction of travel, and 7847 in the easterly direction of travel. Just before the connection point 787 to these sections, the driver turns off with his vehicle in an easterly direction onto a toll-free road which extends in certain places at a distance of less than 100 meters parallel to the section 7847 of the A 78. Detection of the use or non-use of the section 7847 with obligatory tolls is not reliably possible over a length of half of the section by means of the position determining and association device which is carried along. Being dependent on a use authorization, the driver would travel on the section 7847 without the preventative booking along half the length of the section 7847 without a use confirmation which authorizes for the use of the section 7847 according to the conventional collection method. Checking on the first half of the section would therefore 100% find the driver to be a toll dodger in the conventional method if incorrect collections for vehicles are to be avoided on the parallel toll-free road. However, according to some embodiments the driver has a corresponding use authorization before possible travel on the section 7847, even if it becomes apparent later that he would have in fact not required one.

The detection line for confirmation of the use of the section 7847 is located in the second half of the section 7847; the detection line for confirmation of the non-use of the section 7847 is located in the second half of the toll-free road which runs in its first half too close to the section 7847 which has an obligatory toll. Between the positions C and D, the non-use of the section 7847 is confirmed by the passage of this non-use detection line. As a result, both the use authorization of the section 7847 and that of the section 7846 are deleted.

These exemplary embodiments prove in various ways the numerous advantageous possibilities of use of one or more embodiments of the invention in a system for collecting tolls for the use of traffic areas which are subject to tolls. The scope of protection of the patent claims extends over all the exemplary embodiments and over all the combinations of features of the exemplary embodiments which can be devised to satisfy the inventive concept and without contradicting the inventive concept, including omission, replacement, addition and reproduction.

LIST OF REFERENCE SYMBOLS

10 Vehicle device, mobile radio device
11 Decentralized processor
12 Position-determining device
12*a* GNSS receiver
12*b* GNSS receiving antenna
12*c* GNSS satellite
13 Mobile radio or DSRC transceiver (on vehicle side)
13*b* Mobile radio or DSRC antenna (on vehicle side)
14 Clock
15 Display device
15*a* Light emitting diode
15*b* Loudspeaker
16 Data read-only memory
17 Data read-write memory
18 Cryptographic data memory
19 Rechargeable battery
19*a* Power supply connection
19*b* On/off switch
20 First control center
20' Second control center, alternative to the first control center
25 Checking point, checking bridge
26 Image recording and evaluating device
27 Road-side DSRC transceiver
28 DSRC communication link
30 Toll switching point
41 Base station of a mobile radio network
42 Base station of a mobile radio network
41*a* Wireless mobile radio communication link
45 Switching point of a mobile radio network
50 Vehicle
51 Vehicle license plate
78 Freeway 78
79 Freeway 79
200 First central data processing device of the first control center
200' Second central data processing device of the second control center 20'
210 First server of the first central data processing device 200
211 Processor of the first server 210
212 Data memory of the first server 210
213 Web service of the first server 210
220 Second server of the first central data processing device 200
221 Processor of the second server 220
222 Data memory of the second server 220
223 Web service of the second server 220
230 Third server of the first central data processing device 200
231 Processor of the third server 230
232 Data memory of the third server 230
233 Web service of the third server 230
240 Further server of the first central data processing device 200
241 Processor of the further server 240
242 Data memory of the further server 240
242*a* First memory area of the data memory 242
242*b* Second memory area of the data memory 242
242*c* Third memory area of the data memory 242
250 Additional server of the first central data processing device 200
251 Processor of the additional server 250
253 Web service of the additional server 250
300 Switching central data processing device of the toll switching point 30
310 Toll switching server of the switching central data processing device 300
311 Processor of the toll switching server 310
312 Data memory of the toll switching server 310
631 Federal highway B 631 as a southerly connection of the freeway A 79
632 Federal highway B 632 as a west-east crossing of the connection point 791

7841, 7843, 7845, 7847 Route sections of the freeway A 78 in an easterly direction of travel
7848, 7846, 7844, 7842 Route sections of the freeway A 78 in a westerly direction of travel
7901, 7903, 7905, 7907,
7909, 7911, 7913 Route sections of the freeway A 79 in a northerly direction of travel
7914, 7912, 7910, 7908,
7906, 7904, 7902 Route sections of the freeway A 79 in a southerly direction of travel
791, 792, 793, 794, 795 Connection points of the freeway A 79
796 Freeway intersection of freeway A 78 and freeway A 79
785, 787 Connection points of the freeway A 78
A First location of a vehicle
B A second location of the vehicle following the first location A
C A third location of the vehicle following the second location
BD A fourth location of the vehicle following the third location C
D A fourth location of the vehicle following the third location C
E A fifth location of the vehicle following the fourth location D
F A sixth location of the vehicle following the fifth location E
G A seventh location of the vehicle following the sixth location F

The invention claimed is:

1. A method comprising:
detecting by at least one position-determining device carried by a vehicle, in a first data detection phase, first position-related data of the vehicle;
first associating by at least one first processor configured for processing position-related data, in a first association phase, the first position-related data with (i) a possible imminent use of at least a first road section that is subject to tolls by the vehicle and (ii) at least one possible imminent use of a second road section that is subject to tolls by the vehicle, whereby a possible imminent use of the second road section is alternative to the possible imminent use of the first road section, wherein the first road section and the second road section share a common node of a road network, and wherein the first road section and the second road section represent different directions of travel, said first associating being based on identifying a detection object corresponding to a first position-related data band being linked to the first traffic road section and the second a road section;
booking in a booking phase:
a first use authorization relating to the vehicle for the first route section by storing a first booking data record representing the use authorization of the first road section in at least a first data memory, and
a second use authorization relating to the vehicle for the second route section by storing the first booking data record, which also represents the use authorization for the second road section, or a second booking data record, which represents separately the use authorization for the second road section, in the first data memory;
detecting by the at least one position-determining device, in a second data detection phase, second position-related data of the vehicle;
second associating by at least one of the first processor and a second processor configured for processing position related data, in a second association phase, the second position-related data with a confirmed non-use of the first road section, said second associating being based on either
a) identifying a detection object corresponding to the second position-related data, being linked to the second road section and confirming the use of the second traffic area or
b) determining that a maximum distance from the first road section is less than a distance between (i) the first road section and (ii) a position of the vehicle indicated by the second position-related data; and
canceling in a cancelation phase,
at least the first use authorization for the first road section by at least one of (i) generating a cancelation data record for the first road section in the first data memory or a second data memory and (ii) changing or deleting the first booking data record in the first data memory.

2. The method of claim 1, wherein:
in the booking phase:
i) the first use authorization is booked by storing a first booking data record representing the use authorization in at least a first data memory, and
ii) the second use authorization is booked by storing the first booking data record, which also represents the use authorization for the second a road section, or a second booking data record, which represents separately the use authorization for the second road section, in the first data memory;
in the cancelation phase, the first use authorization is canceled by at least one of (i) generating a cancelation data record for the first road section in the first data memory or a second data memory and (ii) changing or deleting the first booking data record in the first data memory or the second data memory.

3. The method of claim 1, wherein:
the first position-related data comprise at least one of a first position and a first collection of first positions of the vehicle that are determined in the first data collection phase by a position-determining device that is carried by the vehicle; and
in the first association phase, the first position-related data is associated with at least one of the first road section and the second road section,
at least one of the first road section and the second road section can be reached with the vehicle, starting from at least one of (i) the first position or (ii) a position of the first collection of first positions, and proceeding directly via a path that does not have any other road section that is subject to tolls and (i) for which there is no use authorization relating to the vehicle or (ii) that is provided for association with the first position-related data.

4. The method of claim 1, wherein:
the first use authorization is booked by the collection of a first toll for the first road section,
the second use authorization is booked by the collection of a second toll for the second road section, and
the first use authorization is canceled by an at least partial refund or cancelation of the collected first toll.

5. The method of claim 1, wherein, in the second association phase, the second position-related data are associated with a confirmed use of the second road section by the vehicle, wherein the confirmed non-use of the first road section results from a comparison of an alternative possibility using the first and second road sections with the confirmed use of the second road section,
wherein the method further comprises collecting a toll for the use of the second road section after the first association phase.

6. A vehicle device comprising:
at least one position-determining device;
at least one processor configured for receiving and processing position data of the position-determining device; and
at least a first data memory;
wherein the processor is configured for:
receiving and processing first position data determined by the position-determining device in a first position-determining phase,
first associating the received first position data with (i) a possible imminent use of at least a first road section that is subject to tolls and (ii) a possible imminent use of a second road section that is subject to tolls as an alternative to the use of the first road section whereby a possible imminent use of the second road section is alternative to the possible imminent use of the first road section, wherein the first road section and the second road section share a common node of a road network, and wherein the first road section and the second road section represent different directions of travel said first associating being based on identifying a detection object corresponding to a first position-related data band being linked to the first road section and the second road section,
registering both a first use authorization for a first route section by storing a first use authorization data record in the first data memory and a second use authorization for the second road section by storing a second use authorization data record in the first data memory or a second data memory,
receiving and processing second position data determined by the position-determining device in a second position-determining phase following the first position-determining phase,
second, associating in a second associating phase, the received second position data with a non-use of the first road section, said second associating being based on either
a) identifying a detection object corresponding to the second position-related data, being linked to the second road section and confirming the use of the second traffic area or
b) determining that a maximum distance from the first road section is less than a distance between (i) the first road section and (ii) a position of the vehicle indicated by the second position-related data; and
canceling, in a cancelation phase, the first use authorization by performing at least one of
(i) generating a cancelation data record for the first road section in the first data memory or a second data memory and (ii) changing or deleting the first booking data record in the first data memory.

7. A mobile radio device comprising:
at least one processor; and
at least one position-determining device configured for providing first position data to the processor in a first data detection phase and providing second position data to the processor in a second data detection phase,
wherein the processor is configured for:
detecting, on the basis of the first position data, the possible use of at least a first road section that is subject to tolls and the possible use of a second road section that is subject to tolls as an alternative to the use of the first road section, wherein the first road section and the second road section share a common node of a road network, and wherein the first road section and the second road section represent different directions of travel, the detection made before a vehicle uses either the first road section or the second road section;
configuring a communication interface of the mobile radio device for:
(i) contacting at least one of a first web service and a second web service,
(ii) requesting at least one of a booking of a first use authorization and a collection of a first toll for the first road section to the first web service, and
(iii) requesting at least one of a booking of a second use authorization and a collection of a second toll for the second road section to at least one of the first web service or the second web service,
detecting, on the basis of the second position data, a non-use of the first road section, said detecting being based on either
a) identifying a detection object corresponding to the second position-related data, being linked to the second road section and confirming the use of the second traffic area or
b) determining that a maximum distance from the first road section is less than a distance between (i) the first road section and (ii) a position of the vehicle indicated by the second position-related data; and
configuring a communication interface of the mobile radio device for:
(i) contacting at least one of the first web service and the second web service, and
(ii) requesting at least one of a cancelation of the first use authorization and at least a partial refund of the first toll for the first road section by the at least one of the first web service and the second web service.

8. The mobile radio device of claim 7, wherein the processor is further configured for:
determining, on the basis of the first position data, at least one information item for identifying the at least one of the first web service and the second web service; and
using the information item to contact the at least one of the first web service and the second web service via the communication interface.

9. The mobile radio device of claim 7, wherein the processor is further configured for deriving the non-use of the first road section from a use of the second road section, wherein the use of the second traffic area is determined based on the second position data.

10. A computer program product, comprising computer-executable instructions for performing operations comprising:
receiving first position-related data of a mobile radio device;
associating the first position-related data of the mobile radio device with a possible use of a first road section that is subject to tolls and a possible use of a second road section that is subject to tolls as an alternative to the use of the first road section, wherein the first road section and the second road section share a common node of a road network, and wherein the first road section and the second road section represent different directions of travel, the associating made before a vehicle carrying the mobile radio device uses either the first road section or the second road section;
transmitting at least one request to at least a first central data processing device, wherein the request is for:
i) at least one of booking a first use authorization and collecting a first toll for the first road section, and
ii) at least one of booking a second use authorization and collecting a second toll for the second road section;
receiving second position-related data of the mobile radio device;
associating the second position-related data of the mobile radio device with a non-use of the first road section; said second associating being based on either
a) identifying a detection object corresponding to the second position-related data, being linked to the second road section and confirming the use of the second traffic area or
b) determining that a maximum distance from the first road section is less than a distance between (i) the first road section and (ii) a position of the vehicle indicated by the second position-related data; and
transmitting, to at least one of the first central data processing device and a second central data processing device, at least one request for at least one of (i) a cancelation of the first use authorization and (ii) at least partial refund of the first toll for the first road section.

11. The computer program product of claim 10, wherein receiving the first and second position-related data of the mobile radio device comprising receiving the first and second position-related data from a position-determining device that is included in the mobile radio device,
wherein transmitting the request comprises configuring a communication interface of the mobile radio device for transmitting the request.

12. The computer program product of claim 10, wherein receiving the first position-related data comprises receiving a first message that has been output by the mobile radio device into a mobile radio network to a communicating central data processing device and that contains the first position-related data,
wherein receiving the second position-related data comprises receiving a second message that has been output by the mobile radio device into the mobile radio network to the communicating central data processing device and that contains the second position-related data,
wherein transmitting the request comprises configuring a communication interface of the communicating central data processing device for transmitting the request.

13. A system comprising:
at least one central data processing device having at least a first central processor and at least a first central data memory; and
at least one electronic device that is configured to be carried by a vehicle and comprising:
at least one position-determining device,
at least one decentralized processor configured for receiving and processing position data of the position-determining device, and
at least one decentralized communication device configured for at least partially wireless communication with the central data processing device; wherein the decentralized processor is configured for:
receiving and processing first position data determined by the position-determining device in a first position-determining phase, wherein the first position-determining phase comprises the decentralized processor providing the decentralized communication device with (i) at least one of first data items of the first position data and first data items derived from the first position data (ii) a user identifier for transmission to the central data processing device, and
receiving and processing second position data determined by the position-determining device in a second position-determining phase, wherein the second position-determining phase comprises the decentralized processor providing the decentralized communication device with (i) at least one of second data items of the second position data and second data items derived from the second position data (ii) a user identifier for transmission to the central data processing device; and
wherein the first central processor is configured for:
receiving and processing the user identifier and first data received from the electronic device,
registering a first use authorization, assigned to the user identifier, for a first road section that is subject to tolls by storing a first use authorization data record in the first central data memory, wherein the first use authorization is associated with or identifiable from the first data, and
registering a second use authorization, assigned to the user identifier, for a second road section that is subject to tolls by storing a second use authorization data record in the first central data memory, wherein the second road section is an alternative to the first road section, and further wherein the first road section and the second road section share a common node of a road network and wherein the first road section and the second road section represent different directions of travel,
wherein the second use authorization is associated with or identifiable from the second data; wherein the first road section and the second road section are unused by the vehicle at the time of receiving and processing first position data;
wherein at least one of the first central processor and a second central processor of the central data processing device is configured for receiving and processing the second position data and the user identifier transmitted to the central data processing device by the electronic device, wherein the at least one of the first central processor and the second central processor is configured for
detecting, on the basis of the second position data, a non-use of the first road section, said detecting being based on either
a) identifying a detection object corresponding to the second position-related data, being linked to the second road section and confirming the use of the second traffic area or
b) determining that a maximum distance from the first road section is less than a distance between (i) the first road section and (ii) a position of the vehicle indicated by the second position-related data;
and
canceling the first use authorization by at least one of (i) deleting the first use authorization data record from the first data memory, (ii) linking the first use authorization data record to an invalidity marker, marking the first use authorization as in invalid by storing a first cancelation data record for the first road section in at least one of the first central data memory and a second central data memory of the central data processing device.

14. The system of claim 13, further comprising:

a control device positioned at or near a road section that is subject to tolls and comprising an image recording and evaluating device configured for recording and evaluating images of vehicles that use the road section and for acquiring vehicle data for identifying these vehicles from these images;

wherein the use authorization data records of the central data processing device comprise vehicle data, wherein at least at certain times a communication link exists between the control device and the central data processing device for communicating vehicle data between the central data processing device and the control device;

wherein at least one of the control device and the central data processing device is configured for:

checking the vehicle data for linking to a use authorization data record that is assigned to the road section; and generating at least one signal based on whether checking the vehicle data for linking with the use authorization data record yields a positive or negative result.

15. A data processing device comprising a processor configured to execute:

a first web service for receiving at least one booking request from a mobile device for at least one of a first road section and a second road section that are subject to tolls, the first road section and the second road section unused by a vehicle carrying the mobile device at time of the booking request, wherein the first road section and the second road section share a common node of a road network, and wherein the first road section and the second road section represent different directions of travel, and wherein the booking request is determined in a position-dependent manner by the mobile device, wherein the booking request is linked to a first user identifier; and a second web service for receiving at least one cancelation request from the mobile device and associated with the first user identifier and canceling the booking request for the first road section associated with the first user identifier.

* * * * *